(12) United States Patent
Hayes

(10) Patent No.: US 8,346,753 B2
(45) Date of Patent: Jan. 1, 2013

(54) SYSTEM AND METHOD FOR SEARCHING FOR INTERNET-ACCESSIBLE CONTENT

(76) Inventor: Paul V Hayes, Union City, NJ (US)

(*) Notice: Subject to any disclaimer, the term of this patent is extended or adjusted under 35 U.S.C. 154(b) by 147 days.

(21) Appl. No.: 11/939,819

(22) Filed: Nov. 14, 2007

(65) Prior Publication Data

US 2008/0114739 A1 May 15, 2008

Related U.S. Application Data

(60) Provisional application No. 60/859,034, filed on Nov. 14, 2006, provisional application No. 60/921,794, filed on Apr. 4, 2007.

(51) Int. Cl.
*G06F 7/00* (2006.01)
(52) U.S. Cl. ......... 707/709; 707/711; 707/722; 707/748
(58) Field of Classification Search .................. 707/709, 707/711, 722, 748
See application file for complete search history.

(56) References Cited

U.S. PATENT DOCUMENTS

| | | | | |
|---|---|---|---|---|
| 6,282,548 B1* | 8/2001 | Burner et al. | ............. | 707/104.1 |
| 6,976,053 B1* | 12/2005 | Tripp et al. | .................... | 709/202 |
| 2002/0062300 A1* | 5/2002 | Asadov et al. | .................... | 707/1 |
| 2003/0046098 A1* | 3/2003 | Kim | .................. | 705/1 |
| 2003/0184582 A1* | 10/2003 | Cohen | .......................... | 345/736 |
| 2008/0195601 A1* | 8/2008 | Ntoulas et al. | .................... | 707/5 |

FOREIGN PATENT DOCUMENTS
WO WO 2008/061121 A2 5/2008

OTHER PUBLICATIONS

"Brain Breakthrough 'Can Read Intentions'" article from http://www.smh.com/au/news/world/brain-breakthrough-can-read-intentions/2007/02/10/1170524342871.html, Feb. 11, 2007 (1 page).
International Search Report of the International Searching Authority mailed Jul. 31, 2008, issued in connection with International Patent Appl. No. PCT/US07/84636 (2 pages).
Written Opinion of the International Searching Authority mailed Jul. 31, 2008, issued in connection with International Patent Appl. No. PCT/US07/084636 (5 pages).
Kim, et al. "Ranking Web Documents with Dynamic Evaluation by Expert Groups" CAiSE 2003, LNCS 2681, 2003 (12 pages).

* cited by examiner

*Primary Examiner* — Cheyne Ly

(57) ABSTRACT

A system and method for searching and voting on Internet-accessible content is presented. HTML-linked content on one or more Internet host servers is indexed and stored on associated meta servers. Non-HTML content and dynamic HTML content from the deep web, is processed by the present invention into HTML content, indexed, and stored on the meta servers. Each meta server includes a local search engine. The present invention also includes a central repository which tracks user votes, query language progressions, and information about content on each of the meta sites. The present invention also provides a plurality of enhancement plug-ins for standard web robots, including a toolbar for conventional web browsers. The toolbar can be used to securely solicit and authenticated user votes from standard web sites, while preserving the privacy of the voter. The plug-ins facilitate interoperability between existing Internet software (and technology) and the present invention.

50 Claims, 37 Drawing Sheets

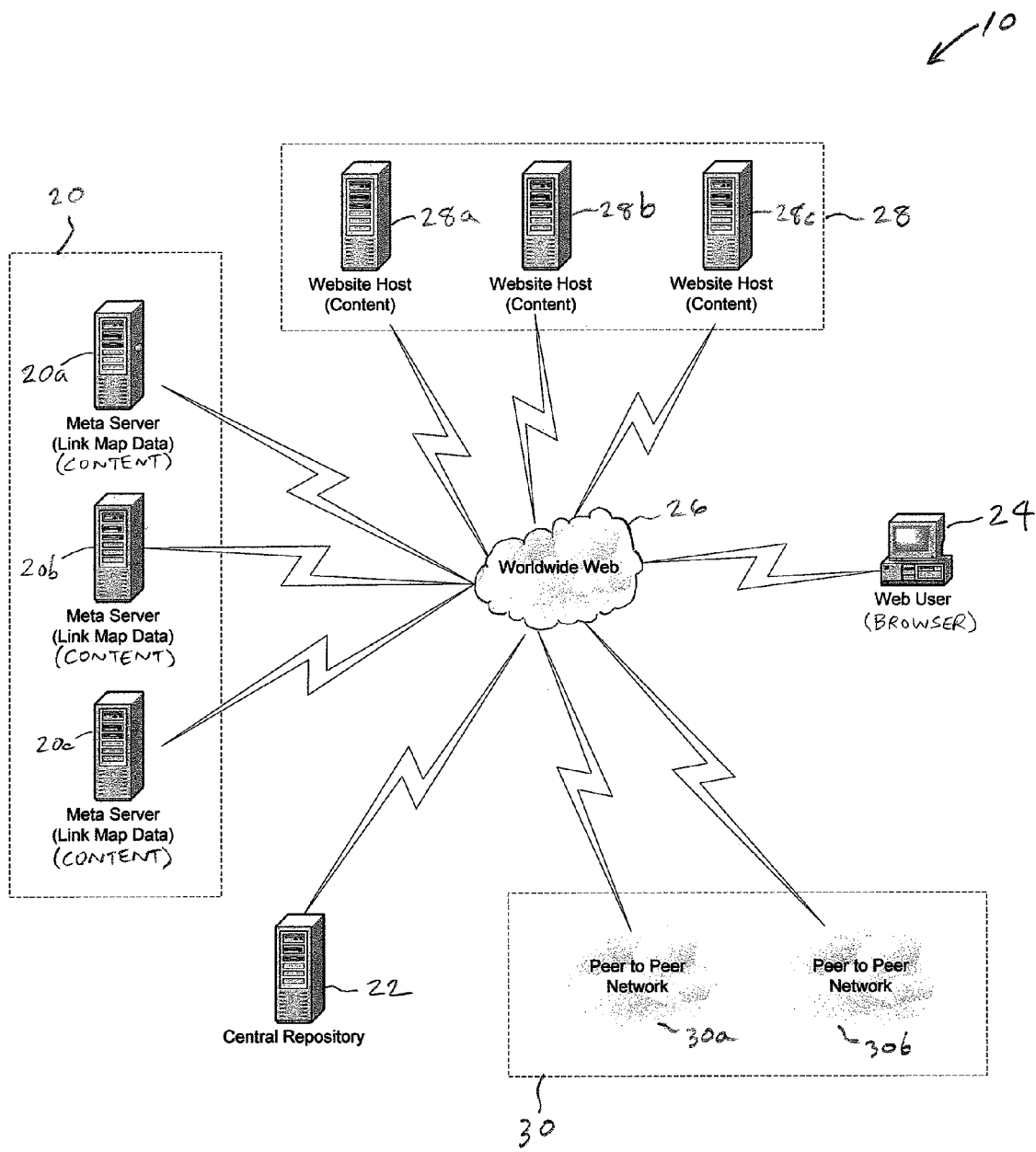

| United States Patent | 7,058,524 |
| --- | --- |
| Hayes, Paul V. | June 6, 2006 |

Electrical power metering
Abstract
[Abstract Text Here]

}  34a

— 37a

Inventors: Hayes, Paul V. (Union City, NJ), ...
Assignee: Hudson Bay Wireless LLC(Union City, NJ)
Appl. No.: 10/280,533
Filed: October 25, 2002

} — 34b

Related U.S. Patent Documents

| Application Number | Filing Date | Patent Number | Issue Date |
| --- | --- | --- | --- |
| 126794 | Dec., 1987 | 4899217 | |

Current U.S. Class: 702/62; 340/870.01; 379/106.03; 700/1; 702/57; 709/217
Current International Class: G06F 19/00 (20060101)
Field of Search: 702/57,60-62,189,190 340/870.01 709/100,222 379/90.01,73

} — 34c

References Cited[Referenced By] — 36a

U.S. Patent Documents
36b — 5481259    January 1996    Bane
     2001/00010490    January 2003    Ellis
36c — Foreign Patent Documents
     0094927    May, 1984    JP
Other References
Thumaty et al. Development of Low-IF Receiver and a Fixed Wireless Utility Network Mar. 2002, IEEE, pp. 935-938 .quadrature..quadrature.. cited by examiner.

— 37b

Primary Examiner:Hoff; Marc S.
Assistant Examiner:Desta; Elias
Attorney, Agent or Firm:McCarter & English, LLP } 34d

Parent Case Text

This is a continuation of application Ser.No. ....

Claims

What is claimed is....

```
<HTML><HEAD>
<BASE TARGET="_top"><TITLE>United States Patent: 7058524</TITLE></HEAD>
<BODY BGCOLOR="#FFFFFF"><a name="top"></a> ....<HR>
<TABLE WIDTH="100%"> <TR><TD ALIGN="LEFT" WIDTH="50%"><B>United States Patent
</B></TD><TD ALIGN="RIGHT" WIDTH="50%"><B>7,058,524</B></TD></TR> <TR><TD ALIGN="LEFT"
WIDTH="50%"><b><B><I>Hayes</I></B> ,   et al.</B></TD><TD ALIGN="RIGHT" WIDTH="50%">
<B>June 6, 2006</B></TD></TR></TABLE> <HR><font size="+1">Electrical power metering
        system</font><BR><BR><CENTER><B>Abstract</B></CENTER><P>A wireless ......<HR>
<TABLE WIDTH="100%"> <TR><TD VALIGN="TOP" ALIGN="LEFT" WIDTH="10%">Inventors: </TD><TD
        ALIGN="LEFT" WIDTH="90%"> <B> Hayes; Paul V.
        </I></B></B> (Union City, NJ)<B>, ... </TD></TR><TR> <TD VALIGN="TOP" ALIGN="LEFT"
        WIDTH="10%">Assignee:</TD> <TD ALIGN="LEFT" WIDTH="90%"><B>Hudson Bay Wireless,
LLC</B>
(Union City, NJ)<BR></TD></TR><TR><TD VALIGN="TOP" ALIGN="LEFT" WIDTH="10%"
NOWRAP>Appl. No.:</TD><TD ALIGN="LEFT" WIDTH="90%"> <B>10/280,533</B></TD></TR><TR><TD
VALIGN="TOP" ALIGN="LEFT" WIDTH="10%">Filed: </TD><TD ALIGN="LEFT" WIDTH="90%">
<B>October 25, 2002</B></TD></TR></TABLE><HR><p><TABLE WIDTH="100%">
    <TR><TD VALIGN=TOP ALIGN="LEFT" WIDTH="40%"><B>Current U.S. Class:</B></TD><TD
        VALIGN=TOP ALIGN="RIGHT" WIDTH="80%"><B>702/62</B> ; 340/870.01; ....702/57;
709/217</TD></TR>
<TR><TD VALIGN=TOP ALIGN="LEFT" WIDTH="40%"><B>Current International Class: </B></TD>
<TD VALIGN=TOP ALIGN="RIGHT" WIDTH="80%">G06F 19/00 (20060101)</TD></TR>
<TR><TD VALIGN=TOP ALIGN="LEFT" WIDTH="40%"><B>Field of Search: </B></TD>
<TD ALIGN="RIGHT" VALIGN="TOP" WIDTH="80%">702/57 ...</TD></TR></TABLE>
    <HR><CENTER><B>References Cited <a
    href="/netacgi/nph-Parser?Sect1=PTO2&Sect2=HITOFF&p=1&u=%2Fnetahtml%2Fsearch-
adv.htm&r=0&f=S&l=50&d=PALL&Query=ref/7058524">[Referenced By]</A></B></CENTER><HR>
<CENTER><b>U.S. Patent Documents</b></CENTER><TABLE WIDTH="100%"> <TR><TD> </TD>
<TD></TD><TD></TD><TD></TD><TD></TD></TR> <TR> <TD ALIGN="left"></TD><TD
align=left><a
    href="/netacgi/nph-
Parser?Sect2=PTO1&Sect2=HITOFF&p=1&u=%2Fnetahtml%%2FPTO%%2Fsearch-
bool.html&r=1&f=G&l=50&d=PALL&RefSrch=yes&Query=PN%2F5481259">5481259</a></TD><TD></TD><T
D align =left>January 1996</TD><TD></TD><TD align=left> Bane</TD></TR><TR><TD align=left> </TD><TD
align=left><a ....
        href="http://appft1.uspto.gov/netacgi/nph-Parser?TERM1=20010010490&Sect1= PTO1&Sect2=
HITOFF&d=PG01&p=1&u=%2Fnetahtml%2FPTO%2Fsrchnum.html&r=0&f=S&l=50"
target="_blank">2001/0010490</a></TD><TD></TD><TD align =left>August 2001</TD><TD></TD><TD
align=left>Bellin</TD></TR><TR><TD align=left></TD><TD align=left><a </TD></TR> </TABLE>
        <TABLE WIDTH="90%"> <BR> <CENTER><B>Other References</B></CENTER>
        <TR><TD><ALIGN=LEFT><BR>Thumaty et al., Development of Low-IF Receiver and a Fixed
Wireless
Utility Network , Mar. 2002, IEEE, pp. 935-938 .quadrature..quadrature..cited by examiner
...</TD></TR></TABLE> <BR>
        <I>Primary Examiner:</I> Hoff; Marc S.<BR>
<I>Assistant Examiner:</I> Desta; Elias<BR>
<I>Attorney, Agent or Firm:</I> <coma>McCarter & English, LLP<BR><HR>
    <CENTER><B><I>Claims</B></I></CENTER> <HR> <B><BR>What is claimed is: ...<BR><BR>
    <CENTER><B><I> Description</B></I></CENTER>
<HR> <BR><BR>BACKGROUND OF THE INVENTION
<BR><BR>1. Field of the Invention ...
<BR><BR>2. Related Art ....
<BR><BR>SUMMARY OF THE INVENTION ...
<BR><BR>BRIEF DESCRIPTION OF THE DRAWINGS ...
<BR><BR>DETAILED DESCRIPTION OF THE INVENTION ....
<BR><BR><CENTER><B>* * * * *</B></CENTER><HR> ...
</center></BODY></HTML>
```

\# *Conversion of Dynamically Generated HTML to Surface HTML*
\# *The USPTO requires and supports direct access to patents (primary key) only by URL*
Dynamic_anchor_delimiters   \#      How to find the dynamic links to be replaced
   "U.S. Patent Documents\*\*\*href="/                  \#      Leading unique string
   dynamic_link[1]">patent_number[1]<\*\*\*href="/  \#   dynamic link & 1st patent no.
   dynamic_link[2]">patent_number[2]<\*\*\*href="/
   dynamic_link[3]">patent_number[3]<\*\*\*href="/  \# dynamic link & 3rd patent no.
   ....any number of links later....
   dynamic_link[n]">patent_number[n]<\*\*\*href="http  \#   last patent & unique end
Surface_anchor_delimiters   \#      What URL to replace the "/dynamic_link[x]" with
   http://patft1.uspto.gov/netacgi/nph-Parser?patentnumber=patent_number[1]
   http://patft1.uspto.gov/netacgi/nph-Parser?patentnumber=patent_number[2]
   http://patft1.uspto.gov/netacgi/nph-Parser?patentnumber=patent_number[3]
   .... \#
   http://patft1.uspto.gov/netacgi/nph-Parser?patentnumber=patent_number[n]
\# *Co-inventor Citation Network*
Latent_anchor_delimiters    Network-1
   "Inventors:\*\*\*<B>"               \#   Leading unique string delimiter
   inventor[1] "</B> (\*\*\*)<B>,"     \#   1st Inventor and delimiter
   inventor[2] "</B> (\*\*\*)<B>,"     \#   2nd Inventor (if present) and delimiter
   inventor[3] "</B> (\*\*\*)<B>,"     \#   3rd Inventor (if present) and delimiter
   " ..."       "</B> (\*\*\*)<B>,"    \#   Any number of inventors – same pattern
   inventor[n] "</B> (\*\*\*)<B>"      \#   Last inventor (n) and unique ending string
Href_lookup   Network-1   inventor[1], inventor[2], inventor[3], ... , inventor[n]  \#
HTML_source_anchor   Network-1
   <A href="uri[1]">inventor[1]</A>  \#   URI and Name for HTML anchor links
   <A href="uri[2]">inventor[2]</A>  \#   Inventor names sent to URI Generator
   <A href="uri[3]">inventor[3]</A>  \#   URI's returned from URI Generator
   ...
   <A href="uri[n]">inventor[n]</A>  \#   href inserted inline into original char strings
\# *Non-patent Reference Citation Network*
Latent_anchor_delimiters   Network-2
   "<B>Other References</B>\*\*\*""     \#   """ = "tic is a single or double quote"
   title[1] "",\*\*\*<BR>\*\*\*""        \#   "", " = "tic comma"
   title[2] "",\*\*\*<BR>\*\*\*""
   title[3] "",\*\*\*<BR>\*\*\*""
   ...
   title[n] "",\*\*\*</TABLE>"         \#   end of other reference delimiter
Href_lookup   Network-2   title[1], title[1], title[1], ... , title[1]  \#
HTML_source_anchor   Network-2
   <A href="uri[1]"> title[1]</A>  \#   URI and Name for HTML anchor links
   <A href="uri[2]"> title[2]</A>  \#   reference titles sent to URI Generator
   <A href="uri[3]"> title[3]</A>  \#   URI's returned from URI Generator
   ...
   <A href="uri[n]"> title[n]</A>  \#   href inserted inline into original char string

```
Robot-version:  Version 3.0           # Includes added directives for this invention
User-agent: all-bad-bots
Disallow: *                           # tell your favorite list of bad robots to go away
User-agent: all-good-bots
Disallow: /any/private/directories    # tell good robots not to access private directories
Allow: /all/the/rest                  # tell good robots where to find good content
#             Eastern Standard Time
Visit-time:  22:00 – 07:00            # Let robots work the graveyard shift (9hrs)
Request-rate:  1/10s 22:00 – 23:00    # (6 patents/min x 60min x 1hr) = 360 patents
Request-rate:  1/5s 23:00 – 05:00     # (12 patents/min x 60min/hr x 6hr) = 4320 patents
Request-rate:  1/10s 05:00 – 07:00    # (6 patents/min x 60min x 2hr) = 720 patents
# Direct robot to USPTO query form for patent number input
Query_form_allow: http://patft.uspto.gov/netahtml/PTO/srchnum.htm
# Primary key location on the query form and its range
Primary_key: input "TERM1" 1:7100211  # utility patent no. 7100211 was issued 9/5/06
Plug_in: http://www.hudsonbaywireless.net/plug-ins/uspto.exe
Configuration_file: http://www.hudsonbaywireless.net/config-files/uspto.cfg
Comment: Denial of service rules at:  http://www.uspto.gov/patft/help/notices.htm
Comment: Contact information at -http://www.uspto.gov/main/contacts.htm
```

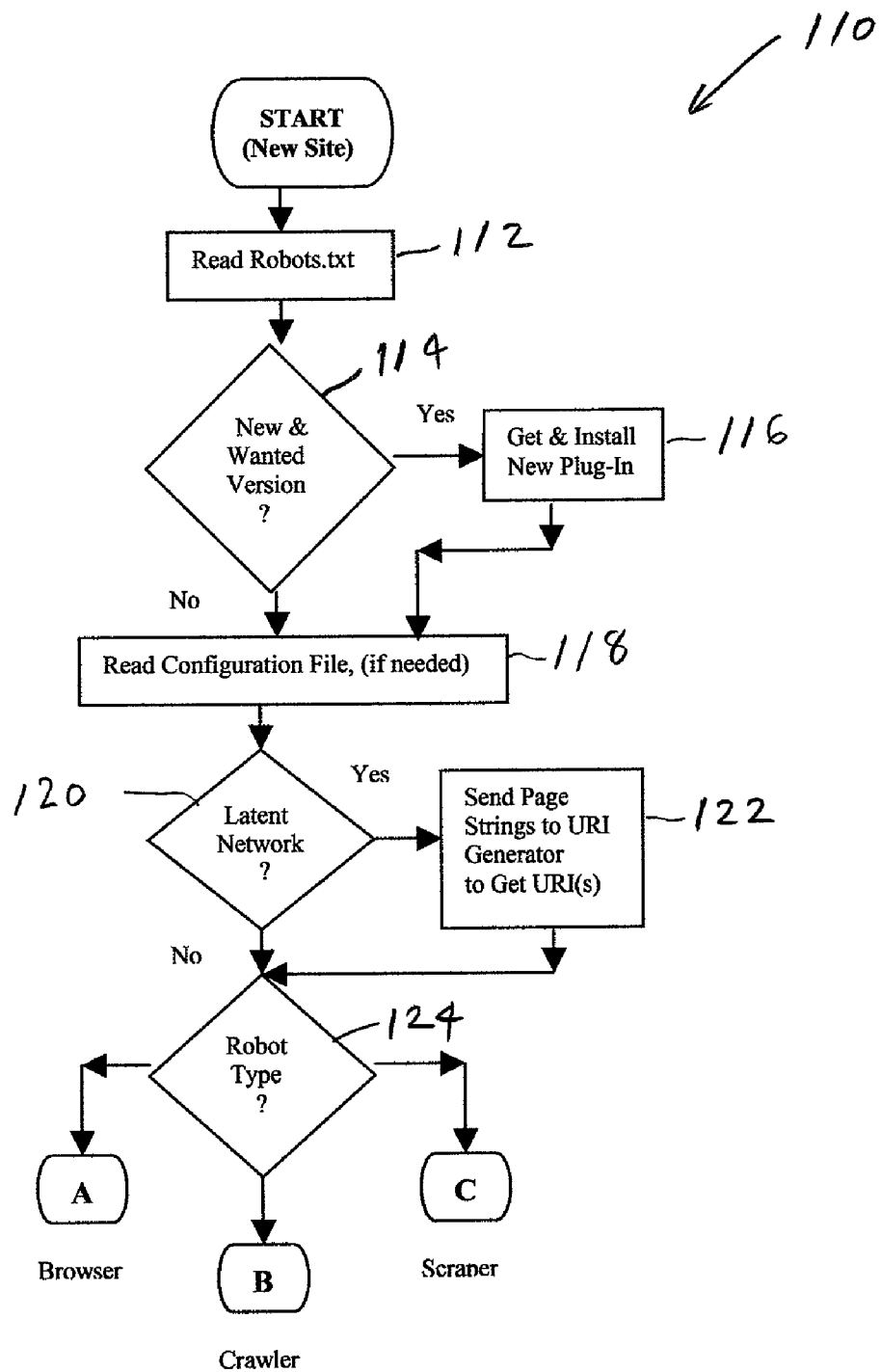

FIG. 22
280
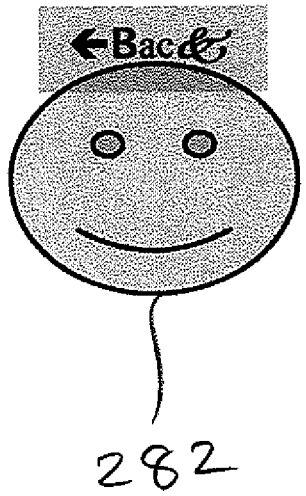
282
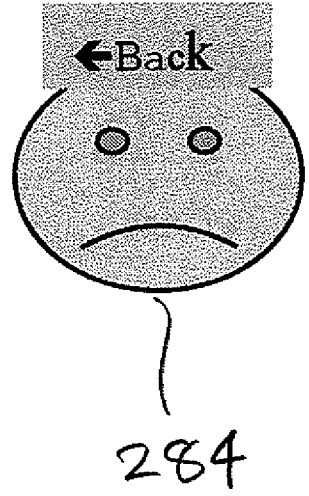
284

| United States Patent | 7,058,524 |
| --- | --- |
| Hayes, Paul V. | June 6, 2006 |

Electrical power metering

Abstract

[Abstract Text Here]

Inventors: Hayes, Paul V. (Union City, NJ), ...

292

Assignee: Hudson Bay Wireless LLC(Union City, NJ)
Appl. No.: 10/280,533
Filed: October 25, 2002

Related U.S. Patent Documents

| Application Number | Filing Date | Patent Number | Issue Date |
| --- | --- | --- | --- |
| 126794 | Dec., 1987 | 4899217 | |

Current U.S. Class: 702/62; 340/870.01; 379/106.03; 700/1; 702/57; 709/217
Current International Class: G06F 19/00 (20060101)
Field of Search: 702/57,60-62,189,190 340/870.01 709/100,222 379/90.01,73

References Cited[Referenced By]

U.S. Patent Documents
| | | |
| --- | --- | --- |
| 5481259 | January 1996 | Bane |
| 2001/00010490 | January 2003 | Ellis |

Foreign Patent Documents
| | | |
| --- | --- | --- |
| 0094927 | May, 1984 | JP |

Other References

Thumaty et al., "Development of Low-IF Receiver and a Fixed Wireless Utility Network", Mar. 2002, IEEE, pp. 935-938 .quadrature..quadrature.. cited by examiner.

294

*Primary Examiner:* Hoff; Marc S.
*Assistant Examiner:* Desta; Elias
*Attorney, Agent or Firm:* McCarter & English, LLP

Parent Case Text

This is a continuation of application Ser.No. ....

*Claims*

What is claimed is....

504

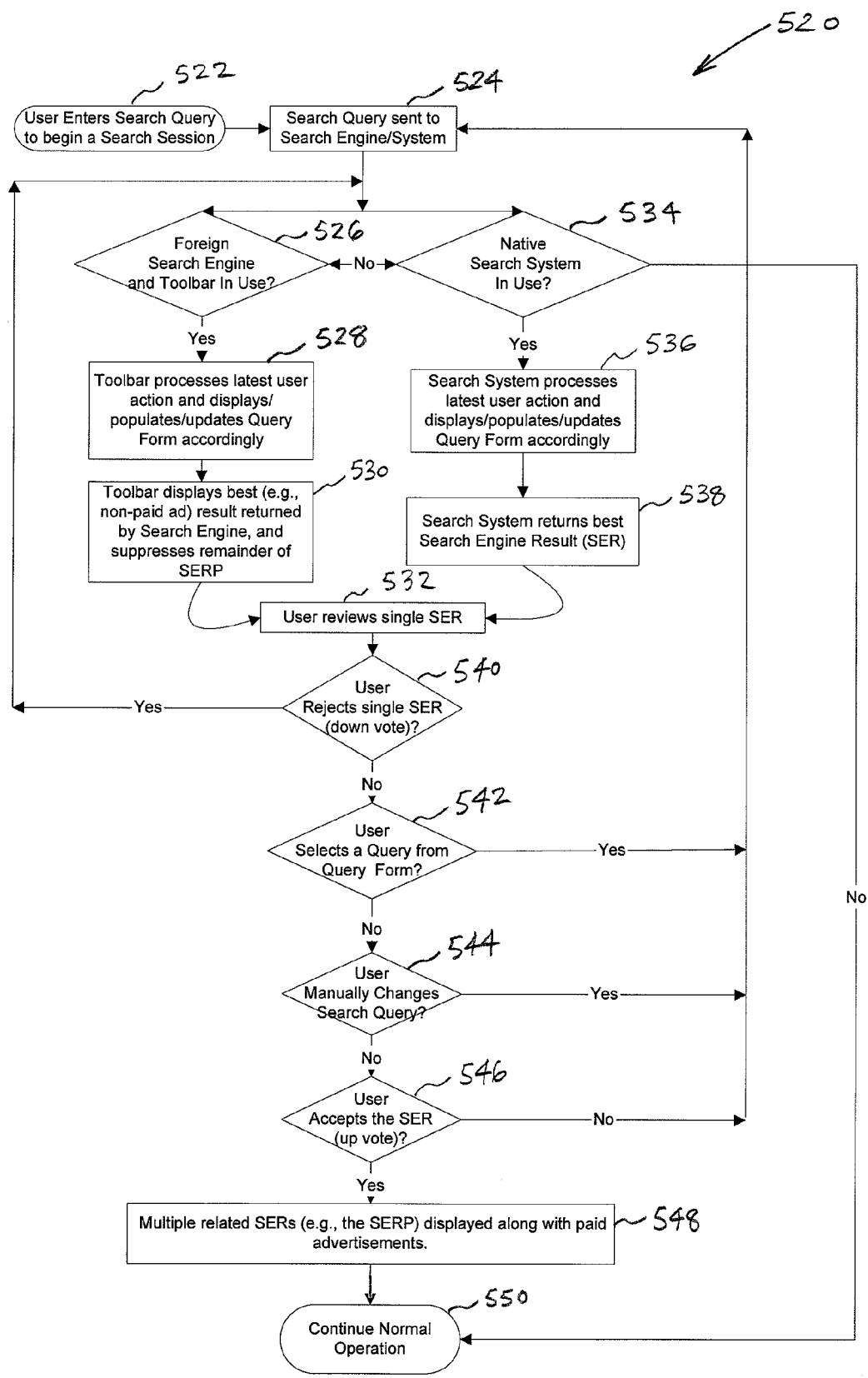

SYSTEM AND METHOD FOR SEARCHING FOR INTERNET-ACCESSIBLE CONTENT

RELATED APPLICATIONS

This application claims the benefit of U.S. Provisional Application Ser. No. 60/859,034, filed Nov. 14, 2006, and U.S. Provisional Application Ser. No. 60/921,794, filed Apr. 4, 2007, the entire disclosures of which are both expressly incorporated by reference.

BACKGROUND OF THE INVENTION

1. Field of the Invention

The present invention relates to searching for content on computer systems and networks. More particularly, the present invention relates to a system and method for searching for Internet-accessible content.

2. Related Art

The Internet represents the largest interconnected network of computer systems and smaller networks presently in existence. Since its inception, the number of nodes connected to the Internet has increased dramatically. As a result, a tremendous amount of content is currently available on the Internet, and is hosted by a multitude of websites. Collectively, these websites comprise the worldwide web (a.k.a., the "web").

The ability to quickly locate relevant content on the Internet is a paramount concern for many users. To address this need, various web search engines have been implemented, each utilizing proprietary search methodologies and algorithms. One example is a search engine which includes a web crawler and associated technology to traverse, collect, parse, index, compress, and store content from the web. Users can query the search engine using one or more search terms, and are presented with links to websites offering content that the search engine determines as being relevant. The search results are generated using the "PageRank" algorithm, wherein the search results are generated by simple text matching and are prioritized according to the number of websites that link to a given website, thus indicating the popularity of a website. In the PageRank algorithm, pages of content on a website, and, sometimes, intra-page content, are represented as nodes in the network forming the web. The more incoming links (or connections) that a node has, the higher the rank that is associated with the node. The search engine also allows a user to view its cache of content for a particular website. Using the cache, the search engine highlights portions of retrieved content that match the user's search string query. This allows users to quickly scroll down through the page and to find areas of interest.

As web page sizes have grown, it has become increasingly difficult to locate a search string in the search results returned by existing search engines. Often, a user is forced to do a secondary search using local web browser's search capability. Further, content cached by search engines is often outdated by several days or weeks. Since existing search engines rely on a repository of cached content which may be out of date, search results often do not accurately represent all relevant content available on the web. Moreover, existing search engines cannot adequately access "dynamic" content, which includes content that is not stored ("static") on a website and which is created when a user visits a website. Still further, existing search engines cannot adequately access "deep" content, e.g., database content that is accessible on the web, but is not stored in hypertext markup language (HTML) format. The content in such databases is typically accessed by manual generation of the user query. In response to the user query, an on-demand web page is then dynamically generated and presented to the user. This page may or may not have HTML links to other content deep in the database. Since these pages do not exist prior to the query, nor do they survive long thereafter, they present special problems for automated web "crawling" algorithms implemented in most search engines. As a result, the content is essentially invisible to popular search engines.

Another shortcoming of existing search engines is their inability to adequately track user feedback, and in particular, user satisfaction with search results. One attempt to track user feedback is a toolbar that can be installed for use with a web browser, and which allows for "click-through" measurement of user activities. This system also allows users to vote on the page being viewed. In particular, toolbars track user browsing habits by tracking the websites that users select after being presented with a webpage of search results by a search engine. However, existing toolbars suffer from a number of drawbacks, such as a lack of secure communications when votes are cast, as well as inadequate communication and interaction with the user as to the subject being voted on.

The collection of user information by search engines is known in the art. However, what is often not made clear to users is the specific data being collected, when it is collected, how it is transmitted, where and to whom it is transmitted, how it is used, and how long it is stored for potential future reference. Among other drawbacks, each user search query is recorded along with the user's IP address. Increasingly, users around the world are concerned about privacy while surfing the Web (including, for example, the collection of personally-identifiable information).

Other techniques for tracking user feedback are known in the art. One example is the "cookie," which consists of a file generated by a website and stored locally on the user's machine after visiting the site. The cookie stores information about a user's web browsing activities, and can later be accessed by the same website, which stored the cookie on the user's system. Unfortunately, cookies do not allow a search engine provider to adequately gauge users' satisfaction and feedback regarding search results. Another technique for tracking user feedback involves allowing a user to save or bookmark sites that have been visited, and tracking such bookmarked information as an indication of the user's satisfaction with certain types of content. Still another technique relates to "click-through" measurement, wherein a user selects a specific search result, clicks on it, and this action is measured as an indication of relevance. However, these approaches rely on inferences as to the user's judgment based on browsing behavior, which is often inaccurate and incomplete.

Existing peer-to-peer networks also suffer from significant drawbacks. In particular, these networks require better search query routing abilities, and they presently lack the ability to permanently cache content at a local server (to help improve content availability and to avoid excessive file transfer times and bandwidth consumption). Additionally, there is a general need to provide an integrated search capability across the worldwide web, structured query language (SQL) based relational databases (e.g., the "deep" web), and peer-to-peer networks. At present, there is an excessive reliance in existing search engines on a single indication of relevance (e.g., PageRank), combined with a nearly myopic view of the worldwide web, which causes new, quality content to stay hidden from search engines for too long. As a result, it is almost necessary for webmasters to "game" the system to gain visibility for new content, while, at the same time, it is easier for low-quality content to spam the Internet. As a result, older, existing content that has had time to collect incoming links is given an advantage (several orders of magnitude) over new, potentially higher-quality content that no one has seen. Therefore, no one has link to such newer content, and it has no discernable PageRank. This self-fulfilling characteristic of PageRank offers a skewed, non-quality-based view of the web to users. This, combined with the difficulty that search engines have in adequately crawling the rapidly-growing Web, leaves room for improvement.

Accordingly, what would be desirable, but has not yet been provided, is a system and method for searching Internet-accessible content, which addresses the foregoing limitations of existing search engines.

SUMMARY OF THE INVENTION

The present invention relates to a system and method for searching for Internet-accessible content. The invention includes one or more meta servers or sites which store information, in the form of link map data, about the structure and location of content on one or more Internet host servers (e.g., website host servers) or one or more peer-to-peer networks. The meta servers also store processed content provided by the one or more Internet host servers, such that content on the one or more Internet host servers is indexed and stored by the present invention at the meta servers. Content on the Internet host servers that is not in HTML format is converted by the present invention into HTML content, indexed, and stored at the one or more meta servers. The indexed and stored content, as well as and link map data, of each meta site allows for a plurality of different types of content, including static content, dynamically-generated content, "deep" content (e.g., content not stored in HTML format), and content on peer-to-peer networks to be searched, in real time. The content stored on the one or more Internet host servers is also linked to the indexed and stored content on the meta servers, and is accessible to users of the present invention. Crawlers and/or scrapers associated with each meta site mine the one or more Internet host servers and/or peer-to-peer networks for content, so that up-to-date information about Internet-accessible content can be indexed and stored at the meta sites.

Each meta server includes a local search engine (i.e., a search engine dedicated to a particular meta server) that can be queried by a user, and the user is provided with search results which point to relevant content on one or more of the meta servers of the present invention. After viewing the content, the user can cast votes relating to the user's satisfaction with the search results. An enhanced web browser provided in accordance with the present invention allows for the browsing of non-HTML content stored on the one or more website host servers, as well as for the conversion of such content into HTML content. Web browsers can be enhanced in accordance with the present invention using a plug-in which includes a toolbar. The plug-in provides an otherwise standard web browser with the ability to securely authenticate the identity of voters, to securely collect user votes, and to securely transmit user information and votes to a central repository for secure storage. Further, the toolbar-enhanced web browsers have the ability to present a vote-based re-ordering of search engine results presentation page from other popular search engines, in real-time, thus motivating users to install, vote with, and use the toolbar.

Crawlers and/or scrapers enhanced in accordance with the present invention also allow for the conversion of non-HTML content stored on the one or more Internet host servers into HTML content that can be indexed and stored on the one or more meta servers of the present invention.

The present invention also includes a central repository which tracks user votes and query progressions. The central repository also receives each meta site's link map and processes same to provide a global rank of nodes (NodeRank). NodeRank can be distributed back to each meta site to provide access to a "global" NodeRank. Any meta site is capable of becoming a central repository, thus providing redundancy, fault tolerance, and tracking of information about content on each of the other meta sites by the present invention. A plurality of different types of queries can be conducted by the user, including local queries, global queries, and peer-to-peer network queries. Additionally, a "best effort" query can be conducted, wherein the present invention automatically implements a local, global, or peer-to-peer network query. Queries issued by the user over time can be tracked ("query language progression") by the present invention, so as to assist the user in formulating new queries.

The present invention also provides a method for improving search results generated by a search engine and reducing unwanted advertising associated with search results. A search query is sent to a search engine/system (which could include a conventional search engine/system or the search system of the present invention), and a single search result representing the best result (e.g., a result which is not linked to a paid advertisement) is displayed to the user while remaining search results are suppressed. The user then votes on the single search result, either rejecting or accepting the result. If the result is accepted, the remaining search results are displayed to the user, along with paid advertisements. The method allows for the convenient "previewing" of search engine results by a user to determine whether the results are likely to be relevant, without requiring the user to read through all search results, as well as improving the relevancy of advertisements to search results.

BRIEF DESCRIPTION OF THE DRAWINGS

The foregoing features of the invention will be apparent from the following Detailed Description of the Invention, taken in connection with the accompanying drawings, in which:

FIG. 1 is a diagram showing the searching system of the present invention;

FIG. 2 shows a sample web page generated by the meta server of the present invention;

FIG. 3 shows hypertext markup language (HTML) code corresponding to the web page shown in FIG. 2;

FIG. 4 shows a configuration file according to the present invention for converting dynamically-generated HTML code to surface HTML code, as well as for converting dynamically-generated latent network content (i.e., in non-HTML format) into HTML-based content;

FIG. 6 shows sample code for instructing a conventional web robot to operate with the present invention;

FIGS. 11A-11B are flowcharts showing overall processing steps of the system of the present invention for browsing, crawling, and/or scraping content on the Internet;

FIG. 22 is a diagram showing sample "emoticons" according to the present invention for collecting user feedback regarding the quality of a search result;

FIG. 23 is a sample web page including dynamic content that has been processed by the present invention into HTML-based ("surface") content;

FIG. 27 is a flowchart showing processing steps according to the present invention for providing improved search results in response to a user's query while reducing advertisements provided to users with search results.

DETAILED DESCRIPTION OF THE INVENTION

Figure 5:
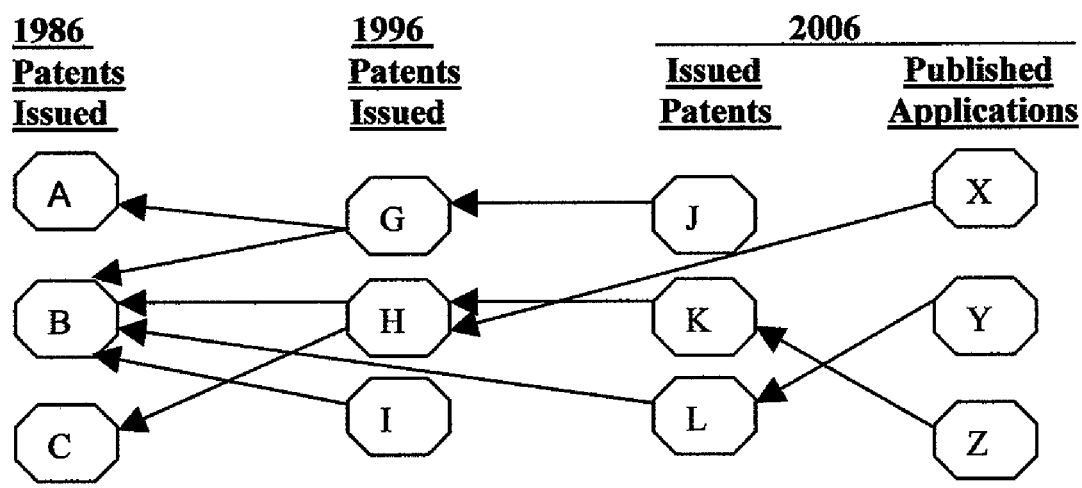
FIG. 5 is a diagram showing a hypothetical citation network between published patent applications and issued patents, which can be searched by the present invention.

The present invention relates to a system and method for searching for Internet-accessible content. One or more meta servers or sites store information about the structure and location of content on one or more Internet host servers, including web servers and peer-to-peer networks, as well as content from the Internet host servers which is indexed and stored on the one or more meta servers for subsequent searching. HTML-linked content on the one or more Internet host servers is indexed by the present invention and stored on the one or more meta servers, for subsequent searching by users. Non-HTML content stored on the Internet host servers is converted by the present invention into HTML content and is indexed and stored on the one or more meta servers. Each meta server includes a local search engine that can be queried by a user. A plurality of different types of queries can be conducted by the user, including local queries, global queries, and peer-to-peer network queries. The user is provided with search results which point to relevant content on one or more of the website host servers. After viewing the website content, the user can cast votes relating to the user's satisfaction with the search results. The present invention also includes a central repository which tracks user votes, query progressions, and information about content on each of the meta sites of the present invention.

FIG. 1 is a diagram showing the searching system of the present invention, indicated generally at 10. As used herein, the term "web" refers to the worldwide web of the Internet. The present allows web content, as well as non-web content, including content stored on peer-to-peer networks and other types of networks, to be seamlessly searched and accessed. The system 10 includes one or more meta servers 20, a central repository 22, and a web user 24 running a local web browser. The web browser could be a conventional web browser operated in conjunction with the one or more meta servers 20, or a web browser modified in accordance with the present invention and operated without the one or more meta servers 20 to allow for dynamic, non-HTML (latent) content to be searched and accessed using the enhanced browser. The meta servers 20 could include any number of meta servers, such as meta servers 20a-20c, each of which stores content from the Internet host servers 28 that has been processed for storage on the meta servers 20a-20c, as well as link map data corresponding to such content. Specifically, HTML-linked content on the Internet host servers 28 is indexed and stored on the meta servers 20a-20c, and non-HTML content on the Internet host servers 28 is processed by the present invention into HTML content, indexed, and stored on the meta servers 20a-20c. The Internet host servers 28 could include any number of website or Internet-accessible servers on the Internet having content stored therein, such as servers 28a-28c.

The present invention generates link map data for the content gathered from the Internet host servers 28a-28c and stored on the meta servers 20a-20c, and stores the link map data on the meta servers 20a-20c. As used herein, the term "link map data" refers to data, in the form of a directed graph or other suitable representation, which indicates the location of content on one or more nodes of the Internet (e.g., on the meta servers 20a-20c and/or one or more of the website host servers 28a-28c), as well as any existing relationships (links) between such content. The meta servers 20a-20c thus store information about the structure and location of content on the Internet host servers 28-28c and the meta servers 20a-20c, as well as content from the Internet host servers which has been selectively converted to HTML format and indexed for storage. The meta servers 20a-20c thus store the HTML or network "skeletons" of the Internet host servers 28a-28, while the "bulk" of content remains on the Internet servers 28a-28c. It should be noted that a single meta server could be utilized, or any combination thereof. The Internet host servers 28a-28c are in communication with the meta servers 20a-20c via the Internet worldwide web 26.

The meta servers 20a-20c each include search engines for allowing users to query, in real-time, for information about the structure and location of content on the meta servers 20a-20c and/or Internet host servers 28a-28c, including "surface" content (e.g., information stored only in HTML pages accessible via the Internet), "static" content (e.g., information stored in HTML pages that is not likely to change rapidly over time), "dynamic" content (e.g., information generated by a website host when the host is visited by a user, and which often is deleted by the host after the user leaves the website), and "deep" content (e.g., information stored on a website host in non-HTML format, such as in a database system). As such, the meta servers 20a-20c provide a distributed, easily accessible, and up-to-date index or "characterization" of content stored on the Internet host servers 28a-28c. The meta servers 20a-20c thus contain content from the Internet host servers 28a-28c that has been selectively processed into "surface" HTML content, and which can be easily indexed, stored, and searched. Bandwidth-intensive content, such a video files, audio files, and other large content, can remain on the Internet host servers 28a-28c.

The central repository 22 of the present invention is in communication with the meta servers 20a-20c via the web 26. Each of the meta servers 20a-20c pre-sorts (i.e., using the PageRank algorithm or the NodeRank algorithm of the present invention) and transmits a copy of the link map data stored therein to the central repository 22, so that the central repository 22 contains updated versions of the link map data, in real time. At the central repository 22, the link map data is processed using the MergeSort sorting algorithm known in the art, to produce a ranked listing of nodes ("TNodeRank"). Copies of the NodeRank information are then sent back to the meta servers 20a-20c, which can be quickly searched by web users to locate content stored on the meta servers 20a-20c and the Internet host servers 28a-28c, including surface content, static content, dynamic content, and deep content. The link map data could also be processed using the known PageRank algorithm. By processing the link map data generated by each of the meta servers 20a-20c at the central repository 22, the central repository 22 stores information, in real time, about the location of content at all of the meta servers 20a-20c, as well as the Internet host servers 28a-28c. Further, by copying the NodeRank information to the meta servers 20a-20c, each meta server also provides information about the location and content of all of the meta servers 20a-20c, as well as the Internet host servers 28a-28c. As such, a high degree of redundancy is provided, such that if one of the meta servers 20a-20c becomes inoperative, the remaining meta servers will continue to function. Additionally, existing nodes in the system of the present invention can automatically nominate one of the meta servers to function as a central repository, after a brief transition phase (which is transparent to the users of other meta sites).

The web user 24 executes any suitable web browser known in the art to issue a search query. The web user 24 is provided with a search page (which could be supplied by one of the meta servers 20a-20c or the central repository 22), in which to enter queries. The queries are then transferred to one of the meta servers 20a-20c, whereupon the server queries an index (e.g., a list) of content stored at the meta servers to generate a list of potential results. The NodeRank data of a respective meta server (i.e., a meta server handling the query) is the applied to the list, in addition to ResultRank (discussed below) and procedures for determining the age ("freshness") of content, to refine the list and to present a search engine results page (SERP) for a user. For a global search, the query is sent to the central repository 22, where it is re-routed based on site characterizations stored at the central repository 22 to appropriate sites (e.g., one or more of the meta servers 20a-20c). Each receiving site then executes a proxy local search and sends the results back to the originating site for fusion and formulation of the SERP.

The results are then transmitted to the web user 24, and the user can then click to view the relevant content pointed to by the links. The central repository 22 monitors the content viewed by the web user 24 to track user browsing habits. As will be discussed hereinbelow in greater detail, the web browser executed by the web user 24 allows a user to cast a vote regarding the user's satisfaction with the search results. The web browser 24 could be a conventional web browser which communicates with one or more of the meta servers 20a-20c, or a web browser enhanced in accordance with the present invention as disclosed hereinbelow. The search engines of the present invention communicate with a meta server to coordinate vote prompting and collection. Should the user select a link that leaves the meta site, and before some maximum amount of time, try to return to the SERP, the user's vote on the initial result is still collected prior to providing the original SERP.

Each of the meta servers 20a-20c implement "query language progression" during searches performed by the web user 24. Query language progression allows for tracking of a history of related queries issued by a user (compiled by remote and local users in many different sessions and updated automatically), as well as for the suggestion of alternate queries which may be helpful to the web user 24. The central repository 22 also collects and processes query language progressions from each of the meta servers 20a-20c, to produce a global version which can be re-directed to the meta servers 20a-20c.

The system 10 also allows content on one or more peer-to-peer networks 30, such as the peer-to-peer networks 30a-30b, to be indexed or characterized by the meta servers 20a-20c, and to be searched by the web user 24. The peer-to-peer networks 30a-30b could store multimedia information, such as audio files, video files, documents, etc., which can be search by the present invention. In such circumstances, the content of the peer-to-peer networks 30a-30b is scraped by the meta servers 20a-20c. The web user 24 can perform a local search (e.g., a search for content on a specific host, such as on one of the Internet host servers 28a-28c), a peer-to-peer search (e.g., a search for content on peer-to-peer networks, such as the peer-to-peer networks 30a-30b), a global search (e.g., a search for content across all nodes of the web 26, regardless of type), and a "best effort" search, wherein the system 10 determines and executes the most suitable type of search for content. As can be readily appreciated, the system 10 thus allows for various types of searches to be formed, across numerous hosts and network types connected to the web 26.

FIG. 2 is a sample web page generated by the meta servers of the present invention, indicated generally at 32, which is capable of being viewed, indexed, and searched by the present invention. As mentioned above, the meta servers (or sites) of the present invention allow for dynamic content to be indexed and characterized (i.e., using local "experts"—users who have previously searched for content at one or more of the meta servers), so that dynamic content can be searched. The page 32 contains information about an issued U.S. patent. The page 32 contains dynamic information fields 34a-34d which are created by the USPTO website when a user clicks on the link to the dynamic page 32. The page 32 also includes conventional hypertext links, such as links 36a-36c. Content fields 37a-37b also represent dynamic information that is created when the page 32 is loaded, such that the information is stored in non-HTML (latent) format. As discussed hereinbelow in greater detail, the enhanced web browser of the present invention, as well as a conventional web browser operated in conjunction with a meta server, allows a user to access and search dynamic content, such as the dynamic page 32, by automatically converting latent (non-HTML) content to HTML-based content, without requiring the use of the meta servers of the present invention. The web page 32 can be viewed using an enhanced web browser of the present invention (as discussed hereinbelow), or by pointing a conventional web browser to one of the meta servers of the present invention. Normally, the fields 37a-37b do not appear as HTML links. After processing by the present invention, the fields 37a-37b appear as HTML links (see FIG. 23, discussed below), thus allowing latent (non-HTML) content to be easily and quickly accessed by the user.

FIG. 3 shows HTML code, indicated generally at 38, corresponding to the web page 32 of FIG. 2. The code 38 includes links 40 to dynamic content that is generated when the web page 32 of FIG. 2 is displayed. The links 40 represent HTML-linked networks within the web page 32 of FIG. 2.

As mentioned above, the meta servers of the present invention store "surface" content corresponding to dynamically-generated content, so that such content can be searched by a user. This is enabled through the installation of configuration files which instruct a web robot, including a web crawler or a web scraper configured in accordance with the present invention as discussed hereinbelow, how to convert dynamically-generated HTML data to "surface" HTML data. FIG. 4 shows such a configuration file (Configuration.txt), indicated generally at 42. Such a file could be provided from an arbitrary site, generated manually by a programmer, or otherwise provided. The configuration file contains information that tells the robot:

1. How to convert dynamically-generated HTML links into links that can subsequently be accessed directly from the surface, as required and if supported by the database. The USPTO, for example, does not allow simulated query string access by robots, but requires use of a specific URL structure;
2. How to convert a latent, non-HTML network structure into an HTML-based network structure;
3. How to recognize non-HTML network anchors links;
4. What character string to send to the Uniform Resource Identifier (URI) Generator of the present invention (described below) for conversion of the non-HTML anchor link into an HTML anchor link; and
5. How to build the new HTML link, combining the URI Generator return value and information already in the existing page. It is assumed that the resulting target anchor also is or soon will be an HTML anchor link.

The configuration file 42 contains one entry per line. The configuration file supports the conversion of multiple dynamic link types to static or surface-useable links. The configuration file supports the conversion of multiple latent network types to HTML networks. Two types of delimiters for the configuration file 42 can be defined: dynamic_anchor_delimiters and surface_anchor_delimiters. Dynamic_anchor_delimiters instruct a robot on how to find a dynamically-generated URL. Surface_anchor_delimiters instruct a robot how to convert a dynamically-generated URL to a URL useable from the surface for subsequent navigation. Conversion of a latent network to an HTML network is supported with three entries in the configuration file, namely: Latent_anchor_delimiters, Href_lookup, and HTML_source_anchor. Other sites may require additional entry types, motivated by either the nature of the content, or the rules of robot site engagement. The configuration file 42 is configured for operation with the USPTO's "PatFT" online patent database. Information needed for conversion of a single type of dynamically-generated HTML link, into a surface-useable HTML link, is shown. These dynamically-generated HTML links are those provided to navigate to other referenced patents. The resulting surface links are useable later by standard web browsers, for example. In addition, information necessary for conversion of two latent networks into HTML networks is shown. The first latent network is the co-inventor citation network. The second latent network is non-patent reference citation network. Wildeard character strings are indicated by "***" and continuation-of-pattern strings are indicated by "...." Delimiters are in double quotes. Arrays are lower case and are indexed "1" through "n." Comments are delimited by "#" and end-of-line characters.

FIG. 5 is a diagram showing a hypothetical citation network between patents and published patent applications, which can be searched by the present invention. As can be seen, the patent citation network, like many citation networks, is different than the web's HTML link network. One difference is that older patents cannot link to newer patents. In contrast, any web page is free to link to any other web page regardless of which one was created first. "Link exchanges" occur when two web sites agree to link to each other. Links on the web imply popularity or preference, while links in the USPTO databases imply relevance. Unlike the web, citation references made in USPTO databases are not based on popularity.

The resulting PageRank order (highest to lowest) of the network shown in FIG. 5 is: B, H, C, A, G, K, L, (I, J, X, Y, Z). Patent H references patents B and C; while patent H is referenced by patent K and patent application X. As can be seen, older patents have an advantage when it comes to collecting links. However, the typical term of a patent is 20 years. After the term of a patent expires it typically becomes much less important. Patent citation links can be treated as bi-directional. This can be effected through the use of reciprocal entries in the Configuration.txt file specifying "mirror" anchor links for non-HTML networks.

FIG. 6 show sample code, indicated generally at 44, for instructing a web robot (e.g., a web browser, a web scraper, or a web crawler) how to collect information about content on a website host. The code 44 can be stored as a "Robots.txt" file in the root directory of the file system of the website host (e.g., on the website hosts 28a-28c of FIG. 1). Additionally, such a file could be provided from an arbitrary site, generated manually by a programmer, or otherwise provided. The Robots.txt file shown in FIG. 6 is configured to allow for the periodic collection of information about content on the USPTO website. The value "TERM1" in the field "Primary_key" identifies the input field for the primary key in the query form presented at http://patft.uspto.gov/netahtml/PTO/srchnum.htm. The source HTML extract is <input size="40" name="TERM1">, and the range of patents to comprehensively traverse in the USPTO database is 1 to 7100211. The Robots.txt file also instructs a robot as to:

1) Where to access a deep web database robot query form;
2) How to efficiently and comprehensively navigate the database in terms of its primary key(s) and/or by examples entries;
3) Where to locate a robot plug-in; and
4) Where to locate a configuration file.

Figure 7:
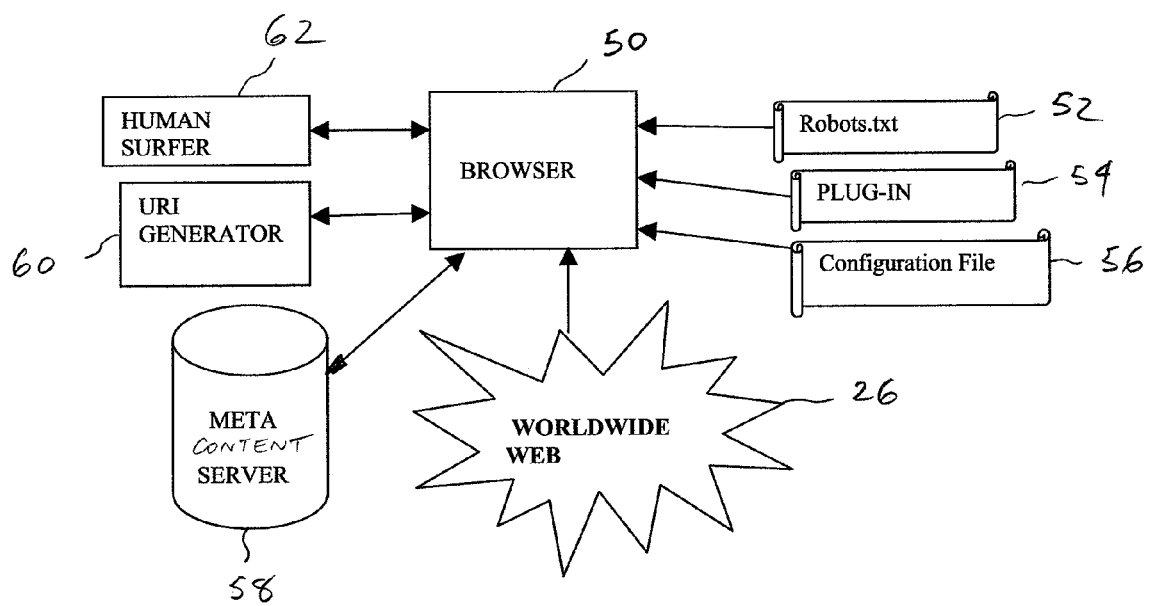
FIG. 7 is a diagram showing a web browser and associated components configured in accordance with the present invention.

FIG. 7 is a diagram showing a web browser and associated components configured in accordance with the present invention. The web browser, indicated at 50, allows a human surfer 62 to browse the web 26. A meta content server database 58 stores NodeRank data corresponding to content on one or more website hosts, as well as content from the website hosts processed in accordance with the present invention, and is queried using a search query issued by the human surfer 62. The meta content server database 58 also stores global NodeRank, local NodeRank, local ResultRank, global ResultRank, local and global query language progressions, site characterizations, and peer-to-peer files popular enough to trigger local caching and download by other systems. The meta content server database 58 could be stored on one or more of the meta servers 20a-20c of FIG. 1. The browser 50 reads a Robots.txt file 52 stored on a website host (e.g., on one of the web hosts 28a-28c of FIG. 1), which instructs the browser in the manner described above. Any required plug-ins for operating the browser 50 with a given website, such as the plug-in 54, are installed in the browser 50. The plug-in 54 is dedicated to a particular type of robot, such that the robot must have an appropriate Applications Interface (API) in order to be compatible with the plug-in. The plug-in tells the web browser:

1) How to use the extended directives in the Robots.txt files;
2) How to use the recognition and conversion information in the configuration files;
3) How to communicate with the URI generator 60; and
4) How to navigate the latent non-HTML network.

The configuration file 56, such as the Configuration.txt file described above, is also provided to the browser 50. The URI generator 60 takes as input a normal text string from the browser 50, and uses this string to look up and/or generate an appropriate HTML link. Links can also be looked up utilizing a remote database over the Internet, or local databases. Links can be automatically generated depending on settings in the configuration file 56. Additionally, the is browser 50 could also convert non-HTML content into HTML or "surface" content for storage on one or more of the meta servers of the present invention.

Figure 8:
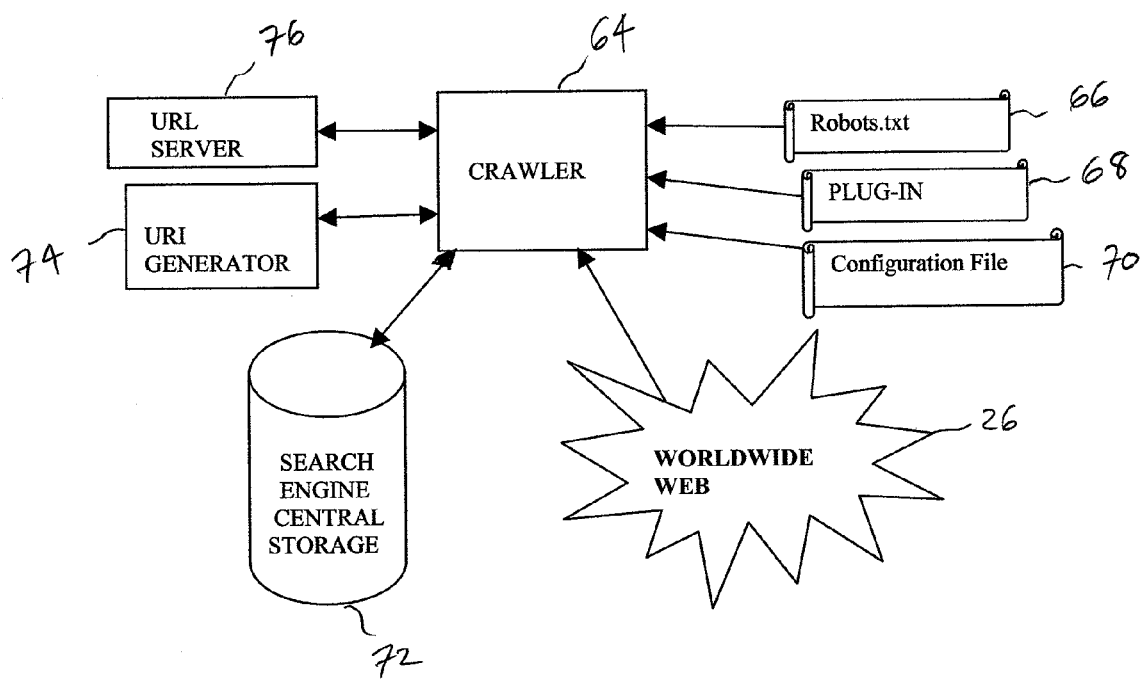
FIG. 8 is a diagram showing a web crawler and associated components configured in accordance with present invention.

FIG. 8 is a diagram showing a web crawler and associated components configured in accordance with the present invention. As mentioned previously, a web crawler can operate as a type of robot for gathering information about content stored on websites. The web crawler, indicated at 64, allows a URL server 76 to direct the crawler 64 to a website host on the worldwide web 26. The crawler 64 reads a Robots.txt file 66 stored on the website host (e.g., on one of the website hosts 28a-28c of FIG. 1), which instructs the crawler in the manner described above. Any required plug-ins for operating the crawler 64 with a given website, such as the plug-in 68, is provided to the crawler 64. The plug-in 68 is dedicated to a particular type of robot, such that the robot must have an appropriate Applications Interface (APT) in order to be compatible with the plug-in. The configuration file 70, such as the Configuration.txt file described above, is also provided to the crawler 64. When content from a website is retrieved by the crawler 64, it is sent back to a conventional search engine's servers for processing. Additionally, content retrieved by the crawler 64 is parsed, indexed, and stored in the search engine central storage database 72 to support analysis of subsequent search queries.

Figure 9:
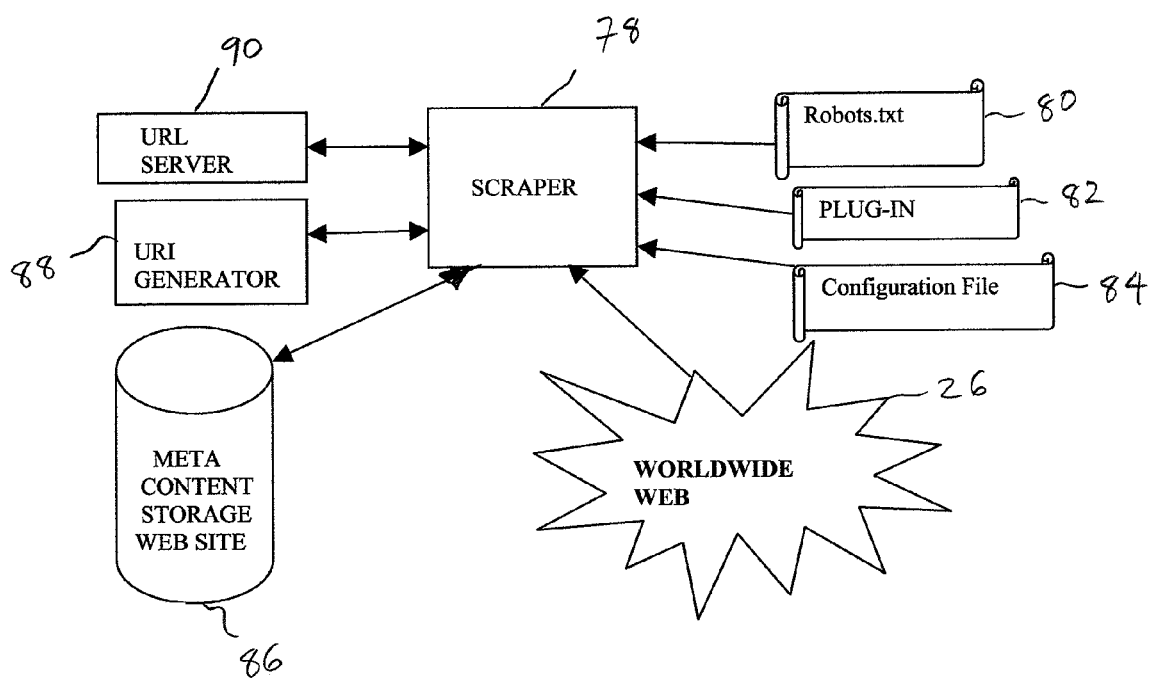
FIG. 9 is a diagram showing a web scraper and associated components configured in accordance with the present invention.

FIG. 9 is a diagram showing a web scraper and associated components configured in accordance with the present invention. As mentioned previously, a web scraper can operate as a type of robot for gathering information about content stored on websites. The web scraper, indicated at 78, allows a URL server 90 to direct the scraper 78 to one or more desired websites on the worldwide web 26. The scraper 78 reads a Robots.txt file 80 stored on a web host (e.g., on one of the web hosts 28a-28c of FIG. 1), which instructs the scraper in the manner described above. Any required plug-ins for operating the scraper 78 with a given website, such as the plug-in 82, are provided to the scraper 78. The plug-in 82 is dedicated to a particular type of robot, such that the robot must have an appropriate Applications Interface (API) in order to be compatible with the plug-in. The configuration file 84, such as the Configuration.txt file described above, is also provided to the scraper 78. When content from a website is retrieved by the scraper 78, it is processed by the scraper 78 and a Uniform Resource Indicator (URI) generator 90 to create a link map of the content. The scraper 78 also converts non-HTML content into HTML or "surface" content for storage on one or more meta servers. The scraper 78 can execute on a meta server (such as the meta servers 20a-20c of FIG. 1) to periodically mine newly-added content from a web host, in order to maintain the meta server. The scraped content is then sent to a meta content storage web site 86, which could reside on one or more of the meta servers 20a-20c of FIG. 1.

Figure 10:
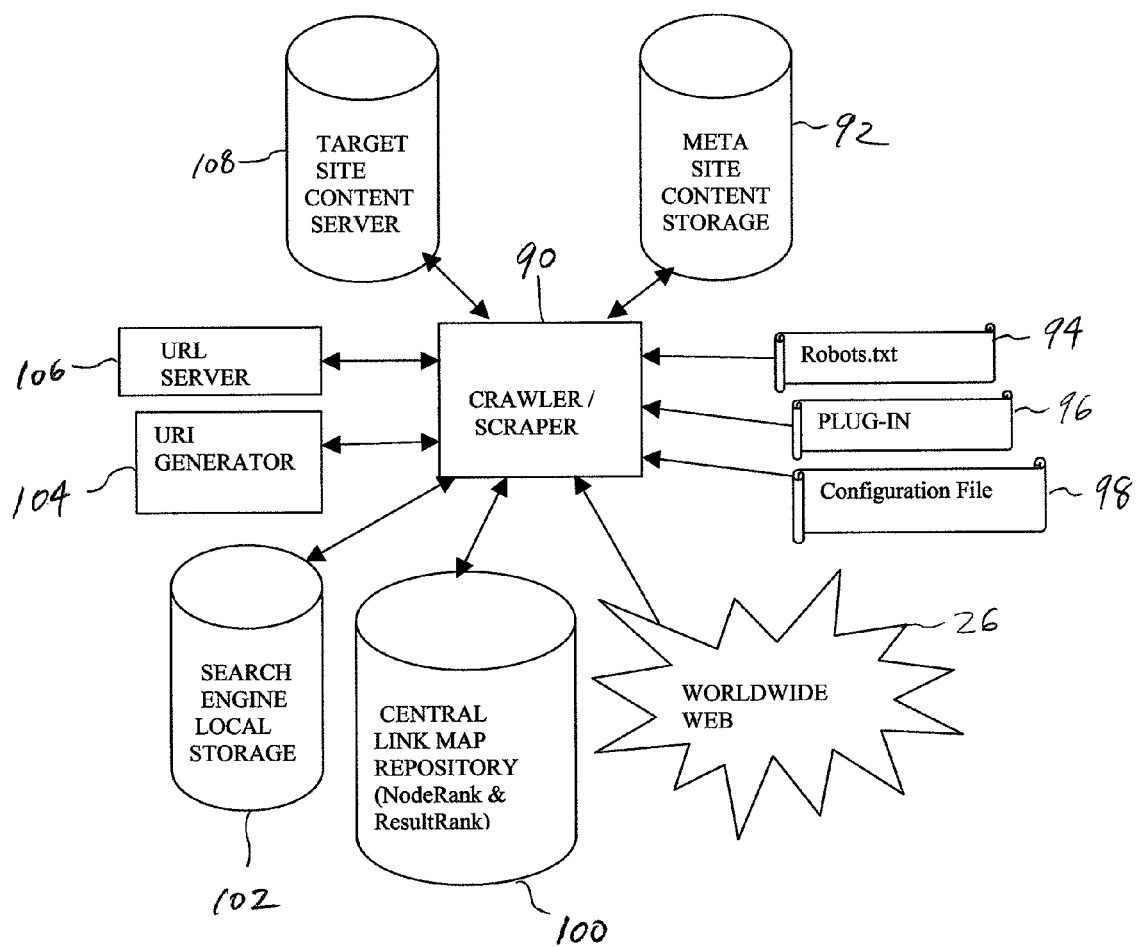
FIG. 10 is a diagram showing a web crawler or a web scraper and associated components configured in accordance with the present invention.

FIG. 10 is a diagram showing a web crawler or a web scraper and associated components configured in accordance with the present invention. The web crawler or scraper, indicated at 90, allows a URL server 106 to direct the crawler or scraper 90 to one or more desired websites on the worldwide web 26. The crawler or scraper 90 reads a Robots.txt file 99 stored on a web host (e.g., on one of the web hosts 28a-28c of FIG. 1), which instructs the crawler or scraper in the manner described above. It should be noted that robots are not dependent on the Robots.txt file 99, or configuration files, as they can be manually or otherwise configured for the same functionality. Any required plug-ins for operating the crawler or scraper 90 with a given website, such as the plug-in 96, are installed in the crawler or scraper 90. The plug-in 96 is dedicated to a particular type of robot, such that the robot must have an appropriate Applications Interface (API) in order to be compatible with the plug-in. The configuration file 98, such as the Configuration.txt file described above, is also provided to the crawler or scraper 90.

When content from a website is retrieved by the crawler or scraper 90 (i.e., from a target site content server database 108), it is processed by the crawler or scraper 90 and the Uniform Resource Indicator (URI) generator 104 and stored on a meta server. The crawler or scraper 90 also converts non-HTML content into HTML or "surface" content for storage on one or more meta servers. The crawler or scraper 90 can execute on a meta server (such as the meta servers 20a-20c of FIG. 1) to periodically mine newly-added content from a web host, in order to maintain the meta server. The content in the target site content server 108 could be stored on a meta site content storage database 92 (i.e., at an Internet host website). The content on the meta site is then crawled, to index it and to produce link map data. The link map data is then pre-sorted prior to being sent to a central link map repository database 100 (e.g., at the central repository 22 of FIG. 1), whereupon the link data is processed (e.g., using MergeSort) to provide a global NodeRank analysis. All of the vector (or, at least a portion of the resulting vector, depending on the available bandwidth) that is relevant to each search engine on the meta servers of the present invention (i.e., meta servers 20a-20c) is sent back to the meta servers. Additionally, content retrieved by the crawler or scraper 90 is parsed, indexed, and stored in the search engine central storage database 102 to support analysis of subsequent search queries. Each search engine of each meta server thus has access to local NodeRank information, as well as global NodeRank information. Local ResultRank information, discussed below, is also generated and stored at the meta server, as well as global ResultRank, query progressions, and site characterization lexicons.

Figure 11B:
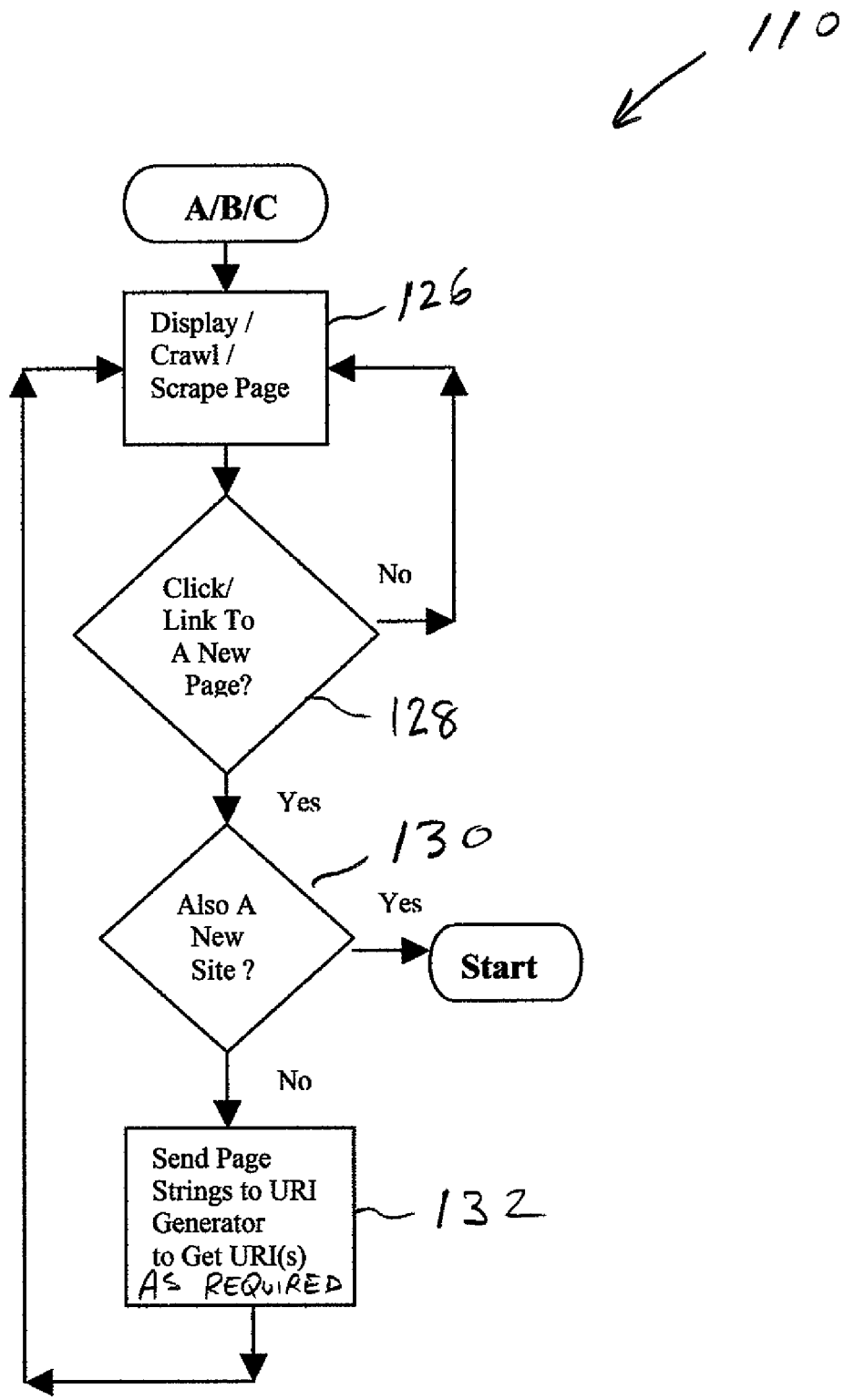

FIGS. 11A-11B depict a flowchart, indicated generally at 110, showing overall processing steps of the system of the present invention for browsing, crawling, and/or scraping the Internet for content. In step 112, a Robots.txt site on a website host is read. In step 114, a determination is made as to whether a new version of a Robots.txt file has been encountered. If so, step 116 is invoked, wherein a new plug-in is retrieved and installed, if desired and if available. In step 118, a configuration file, such as the Configuration.txt file described above, is read. In step 120, a determination is made as to whether the website host has content that contains one or more latent networks. If a positive determination is made, step 122 is invoked, wherein strings of the present web page are sent to the URI Generator of the present invention to generate URI's corresponding to each string. In step 124, a determination is made as to whether the robot visiting the website host is a browser, crawler, or scraper. In step 126, the page is either displayed, crawled, or scraped for content. In step 128, a determination is made as to whether the user has clicked or the crawler or scraper has linked to a new page. If a negative determination is made, step 126 is re-invoked. If a positive determination is made, step 130 is invoked, wherein a determination is made as to whether the new page corresponds to a new website host. If a positive determination is made, the processing of flowchart 110 is repeated. If a negative determination is made, step 132 is invoked, wherein strings of the new page are sent to the URI generator of the present invention, as required, to generate URI's corresponding to each string. Then, step 126 is re-invoked.

Figure 12:
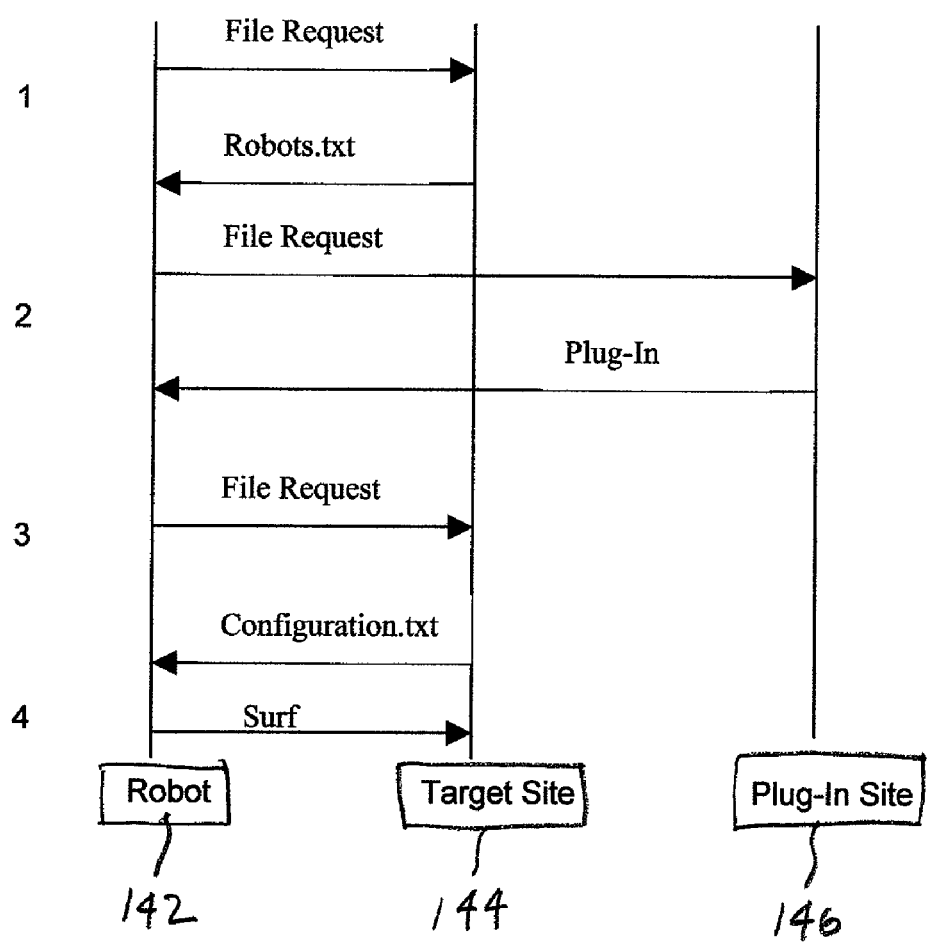
FIG. 12 is a sequence diagram showing steps for updating a standard web "robot" for use with the present invention.

FIG. 12 is a sequence diagram, indicated generally at 140, showing steps according to the present invention for enhancing a standard robot (e.g., a web browser, crawler, or scraper) with an appropriate API. In sequence 1, a robot 142 arrives at a target site 144 and reads a Robots.txt file. In sequence 2, the robot 142 locates and loads an appropriate plug-in from a plug-in site 146. In sequence 3, the robot 142 locates and loads a Configuration.txt file from the target site 144. In sequence 4, the robot 142 begins to navigate the target site 144.

Figure 13:
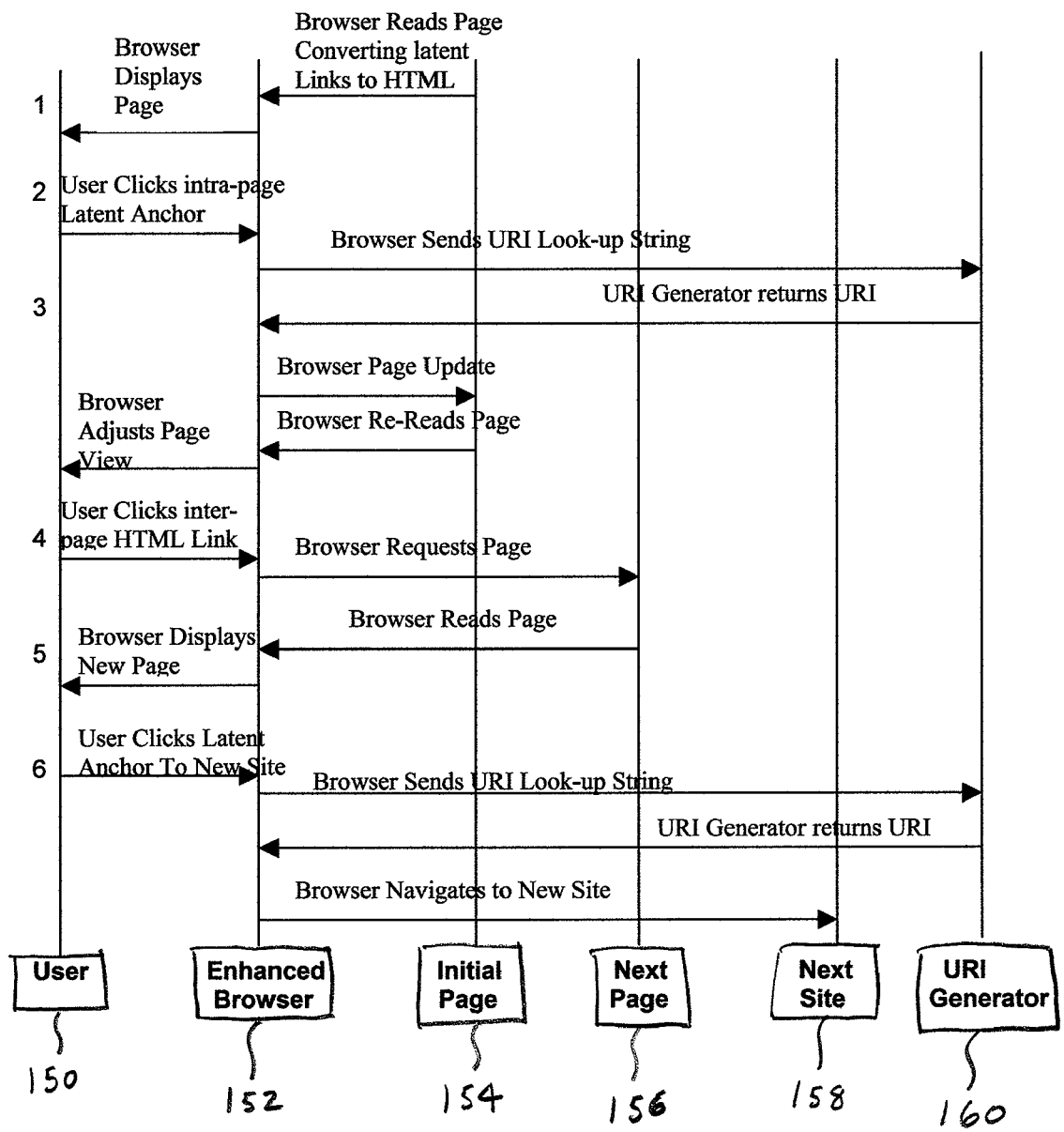
FIG. 13 is a sequence diagram showing steps according to the present invention for using an enhanced browser to browse conventional websites.

FIG. 13 is a sequence diagram, indicated generally at 148, showing steps according to the present invention for browsing a conventional website. In sequence 1, an initial web page 154 is read by an enhanced browser 152, which is displayed to a user 150. In sequence 2, the user 150 selects an intra-page, non-HTML link or latent anchor. In sequence 3, the browser 152 sends a URI look-up string to a URI generator 160, which returns a URI to the browser 152. The browser 152 loads a page update of the initial page 154, and re-reads the page. The browser 152 then adjusts the page view. In sequence 4, the user 150 clicks an inter-page HTML link, and the browser 152 requests the next page 156. In sequence 5, the browser 152 reads the next page 156, and displays it to the user 150. In sequence 6, the user clicks a latent anchor to a new site, and the browser 152 sends a URI look-up string to the URI generator 160. The URI generator 160 returns a URI to the browser 152, whereupon the browser 152 navigates to the next site 158.

Figure 14:
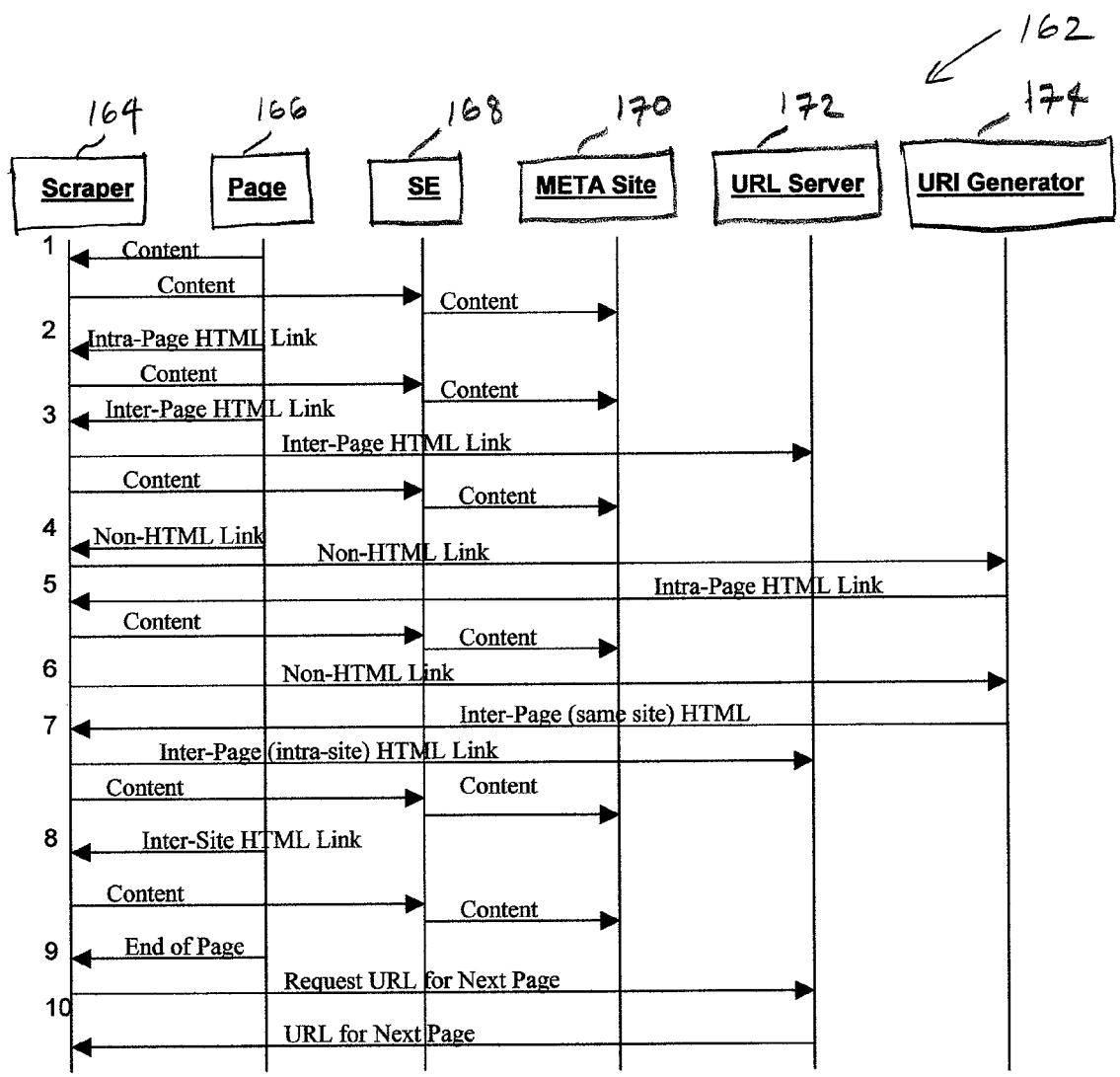
FIG. 14 is a sequence diagram showing steps according to the present invention for scraping content from a website and for converting latent (non-HTML) content to HTML-based (surface) content.

FIG. 14 is a sequence diagram, indicated generally at 162, showing steps according to the present invention for scraping content on a website and for converting latent (non-HTML) content to HTML-based (surface) content. In sequence 1, the scraper 164 begins to harvest a new page 166 for content, and sends the content to a search engine (SE) 168 at a meta site. In sequence 2, the scraper 164 encounters an intra-page HTML link from the page 166, and continues harvesting. In sequence 3, the scraper 164 encounters an inter-page HTML link and sends it to a URL server 172. In sequence 4, the scraper 164 encounters a non-HTML link and sends it to a URI generator 174. In sequence 5, the scraper 164 receives an intra-page HTML link from the URI generator 174 and continues harvesting content. In sequence 6, the scraper 164 encounters the next non-HTML link and sends it to the URI generator 174. In sequence 7, the scraper 164 receives an inter-page (but intra-site) HTML link and sends it to the URL server 172. In sequence 8, the scraper 164 receives an inter-site HTML link and continues harvesting. In sequence 9, the scraper continues harvesting to the end of the page. In sequence 10, the scraper 164 requests and receives a URL for the next page from the URL server 172.

Figure 15:
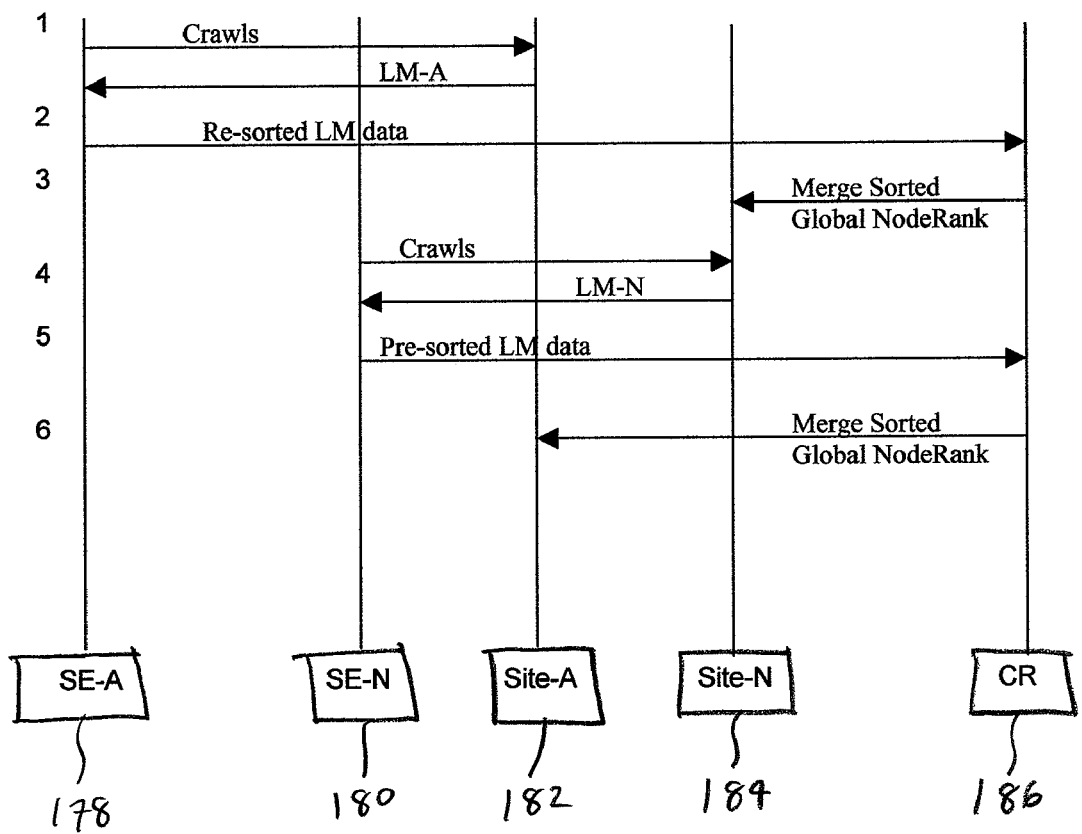
FIG. 15 is a sequence diagram showing steps according to the present invention for processing link map data, transmitting same to the central repository, generating a global NodeRank at the central repository, and transmitting same to one or more meta servers.

FIG. 15 is a sequence diagram, indicated generally at 176, showing processing steps according to the present invention for processing link map data, transmitting same to the central repository, generating a global NodeRank at the central repository, and transmitting same to one or more meta servers. In sequence 1, a first search engine (SE-A) 178 crawls website A 182 to update an existing link map A. In sequence 2, SE-A 178 re-sorts the link map A data and forwards it to a central repository (CR) 186 (e.g., the central repository 22). In sequence 3, the CR 186 applies the MergeSort algorithm to sort the link map A data with the existing link map data at the CR 186, to produce global NodeRank data which is sent to a second search engine N (SE-N) 180. In sequence 4, SE-N 180 crawls local website N 184 to initially prepare local link map N. In sequence 5, SE-N 180 pre-sorts the link map N data and then forwards it to the CR 186. In sequence 6, CR 186 applies the MergeSort algorithm to sort the link map N data with the existing link map data at the CR 186, to produce global NodeRank data that is sent to SE-A 178.

Figure 16:
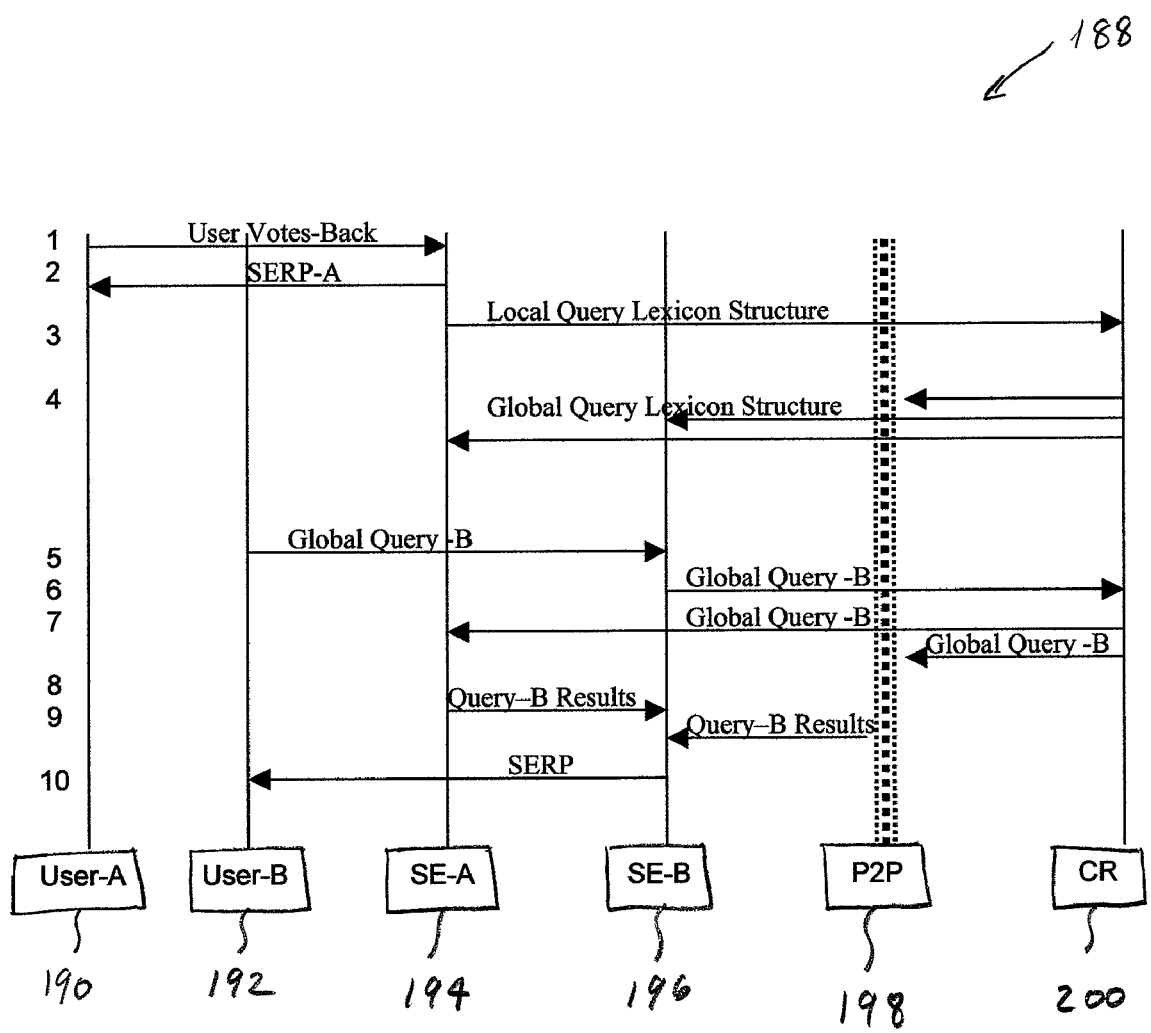
FIG. 16 is a sequence diagram showing processing steps according to the present invention for creating local query lexicons, forwarding same to the central repository, merging the local query lexicons with other query lexicons, and distributing the merged local query lexicons to one or more meta servers.

FIG. 16 is a sequence diagram, indicated generally at 188, showing processing steps according to the present invention creating local query lexicons, forwarding same to a central repository (CR) 200 (such as the central repository 22 of FIG. 1), merging the local query lexicons with other query lexicons, and distributing the merged local query lexicons to one or more meta servers. The query lexicons of the present invention provide a high-level description or characterization of the content of a meta server. In sequence 1, a first user A 190 enters a query at a search engine A (SE-A) 194, is provided with a search engine results page A (SERP-A), reviews same, makes a click-through choice, and then votes on the search results. SE-A 194 also categorizes the user A 190 as an assumed domain expert. In sequence 2, SE-A 194 processes the user's query, adds it to a local query lexicon structure, and periodically forwards the local lexicon structure to the CR 200. In sequence 3, CR 200 periodically creates (by merging query lexicons) and distributes a global lexicon structure to search engine participants. The global lexicon structure can be used to route global search queries. In sequence 4, user B 192 surfs to a local search engine B (SE-B) 196 and enters a global query at SE-B 196. In sequence 5, SE-B 196 routes the query to CR 200. In sequence 6, CR 200 statistically matches the query to lexicon associated with SE-A 194, and forwards the query to SE-A 194. In sequence 7, CR 200 statistically matches the query to a participating search engine peer, and forwards the query to a peer-to-peer (P2P) network 198. In sequence 8, SE-A 194 prepares results and forwards the results to search engine B (SE-B) 196. In sequence 9, the search engine peer in P2P network 198 prepares results and forwards the results to SE-B 196. In sequence 10, SE-B 196 prepares a search engine results page (SERP) and forwards it to user B 192.

Figure 17:
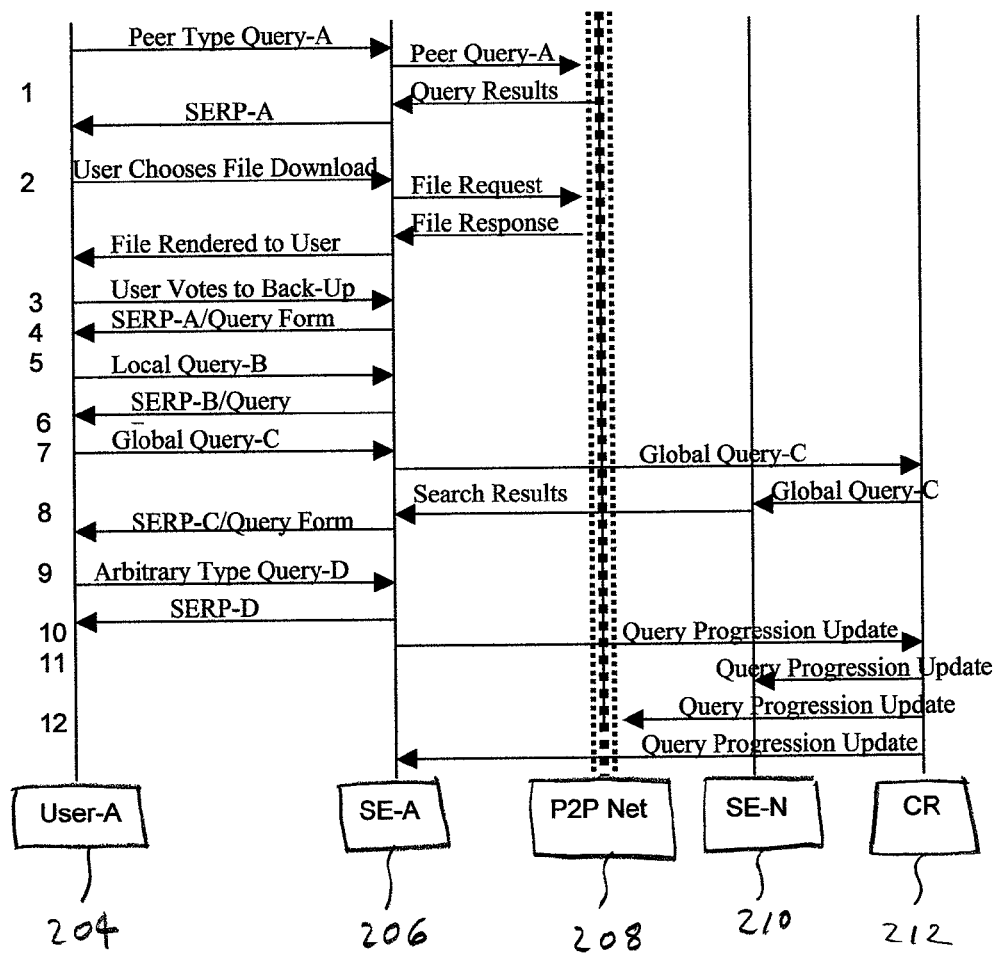
FIG. 17 is a sequence diagram showing processing steps according to the present invention for allowing a user to issue local, global, and peer-to-peer search queries, and for creating query language progressions that can be collected at the central repository, processed, and distributed to one or more meta sites of the present invention.

FIG. 17 is a sequence diagram, indicated generally at 202, showing processing steps according to the present invention for harvesting local, peer, and global query language progression (QLP) sequences, i.e., sequences of queries that have been issued by a user, over time, which can assist the user in formulating future queries. Query language progressions can be collected at the central repository and distributed to one or more meta sites of the present invention. In sequence 1, user A 204 submits a query at search engine A (SE-A) 206 for a peer type of search (i.e., a search for content on a peer-to-peer network), and is returned with a search engine results (SERP) page A (SERP-A). In sequence 2, the user interacts with SERP-A, and chooses to download a file for examination. In sequence 3, after a time, the user votes and returns to SERP-A. In sequence 4, SE-A 206 records a query-vote pair, and presents the SERP-A and the query entry form to user A 204. In sequence 5, the user modifies an existing query and submits it for a local type of search (i.e., a search for content on a specific website host). In sequence 6, SE-A 206 detects initiation of a query progression and provides a SERP page B (SERP-B) to the user. In sequence 7, after a time, the user updates the query and submits it for a global type of search, i.e., a search amongst a plurality of host and network types. In sequence 8, SE-A 204 determines that the latest query is in progression, and provides SERP page C (SERP-C) to the user. In sequence 9, after a time, the user enters any out-of-progression query for any type of a search. In sequence 10, SE-A 204 determines whether a new query is not in progression, processes and stores the global progression just harvested, and provides a SERP page D (SERP-D). In sequence 11, SE-A 206 periodically forwards the newly-harvested query progression data to a central repository (CR) 212 (e.g., central repository 22 of FIG. 1), where it is merged for shared use. In sequence 12, the CR 212 periodically distributes the global query progression data to one or more search engines N (SE-N) 210, as well as to one or more peer-to-peer (P2P) networks 208.

Figure 18:
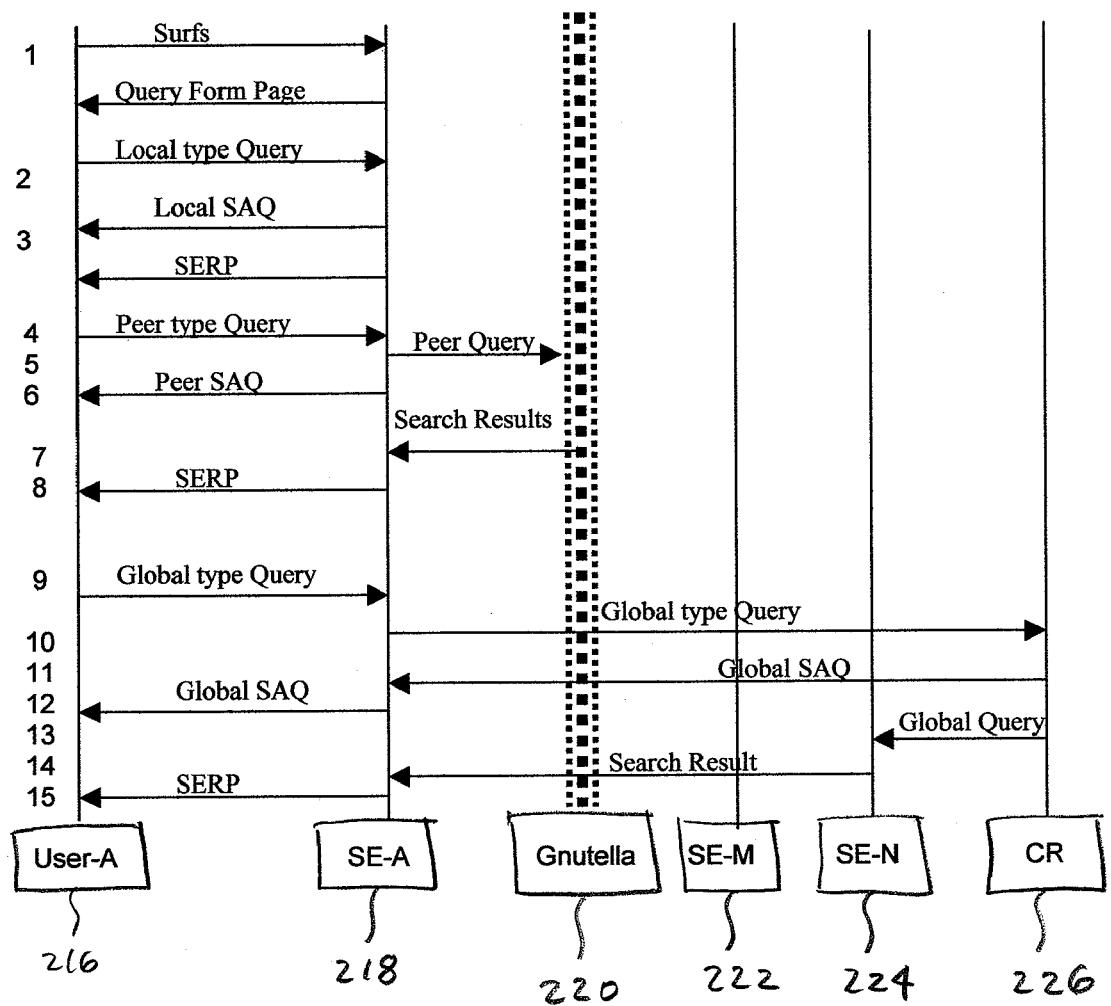
FIG. 18 is a sequence diagram showing processing steps according to the present invention for automatically creating and suggesting alternative search queries for a user.

FIG. 18 is a sequence diagram, indicated generally at 214, showing processing steps according to the present invention for processing search queries based upon the query entry and the type of search desired by the user, and for automatically creating and suggesting alternate search queries for a user. In sequence 1, the user 216 surfs to a search engine SE-A 218, and is presented with a query form page. In sequence 2, the user enters a local search query, i.e., a search for content associated with a specific website host. In sequence 3, SE-A 218 matches the query using local query progression, and provides a suggested alternate query (SAQ) in addition to a SERP. The SAQ can be provided in the query form shown in FIG. 21 and described below. In sequence 4, the user enters a peer-type query, i.e., a search for information on a peer-to-peer database. In sequence 5, SE-A 218 routes the query to a Gnutella peer-to-peer network 220, or other equivalent peer-to-peer network. In sequence 6, SE-A 218 matches the query to local query progression to provide a SAQ to the user 216. In sequence 7, the Gnutella network 220 provides search results to SE-A 218. In sequence 8, SE-A 218 merges and filters the received results and provides a SERP to the user 216. In sequence 9, the user 216 enters a global search query. In sequence 10, SE-A 218 routes the global query to the central repository (CR) 226 (e.g., the central repository 22 of FIG. 1). In sequence 11, CR 226 matches the query to a global query progression, and routes an SAQ back to SE-A 218. In sequence 12, SE-A presents a suggested alternative query to the user 216. In sequence 13, CR 226 routes the query to an alternate search engine SE-N 224. In sequence 14, SE-N 224 routes the search results to SE-A 218. This could be accomplished by routing the search results through an intermediate search engine SE-M 222. In sequence 15, SE-A 218 provides a SERP to the user.

Figure 19:
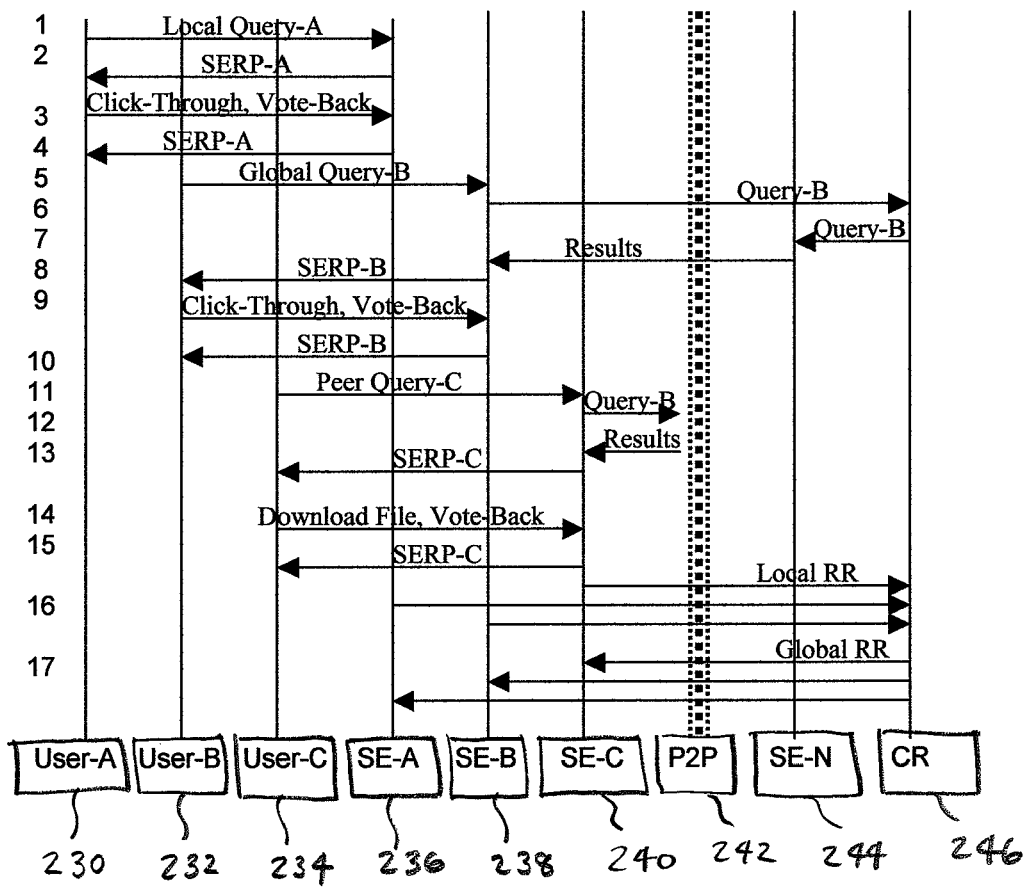
FIG. 19 is a sequence diagram showing processing steps according to the present invention for processing and ranking search results, forwarding same to the central repository, and processing and distributing same to one or more of the meta servers.

FIG. 19 is a sequence diagram, indicated generally at 228, showing processing steps according to the present invention for processing and ranking search results, forwarding same to the central repository, and processing and distributing same to one or more of the meta servers. This allows for the generation of a global rank of search results ("ResultRank"). In sequence 1, user A 230 surfs to a home query page provided by search engine SE-A 236 and enters a local query string. In sequence 2, SE-A 236 logs the local query and provides a SERP page A (SERP-A) to the user 230. In sequence 3, user A 230 clicks through to a result page, and upon returning from the page, votes positively. In sequence 4, SE-A 236 logs the vote, query, node, and search type choices and provides the SERP-A to the user 230. In sequence 5, user B 232 surfs to search engine SE-B 238, is provided with a query page, and enters a global query string. In sequence 6, SE-B 238 logs the global query and transmits same to the CR 246. In sequence 7, the CR 246 arbitrarily distributes the query to a search engine SE-N 244. In sequence 8, SE-B 238 receives results from SE-N 244, returns the results to SE-B 238, and SE-B 238 provides SERP page B (SERP-B) to user B 232. In sequence 9, user B 232 clicks through to a result page, then votes negatively before returning to SERP-B. In sequence 10, SE-B 238 logs the vote, query, node, and search-type choices and provides SERP-B to the user B 232. In sequence 11, user C 234 surfs to search engine SE-C 240, is presented with a search page, and enters a peer query string. In sequence 12, SE-C 240 logs the query and search type, and transmits the query to a peer-to-peer (P2P) network 242. In sequence 13, P2P network 242 returns results SE-C 240 and SE-C 240 provides a SERP page C (SERP-C) to user C 234. In sequence 14, user C 234 downloads a file, reviews its contents, and then votes positively before returning to SERP-C. In sequence 15, SE-C 240 logs the vote, query, node, and search-type choices, and provides SERP-C to the user. In sequence 16, SE-A 236, SE-B 238, and SE-C 240 process the user votes and context, pre-sort the local results to provide a ResultRank, and periodically updates the CR 246. In sequence 17, CR 246 merges the local ResultRank updates into a global ResultRank, and distributes the global ResultRank to the search engines 236, 238, and 240.

Figure 20:
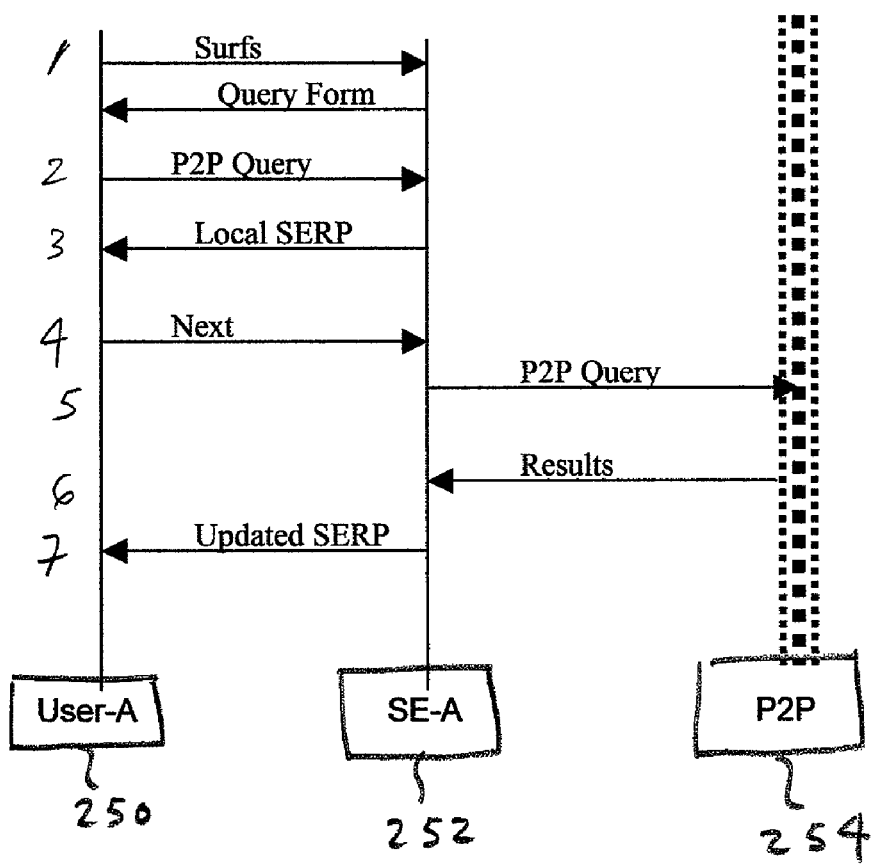
FIG. 20 is a sequence diagram processing steps according to the present invention for handling user queries directed to peer-to-peer systems.

FIG. 20 is a sequence diagram, indicated generally at 248, showing processing steps according to the present invention for routing queries to peer-to-peer networks and merging search results from such networks. In sequence 1, user A 250 surfs to search engine SE-A 252. In sequence 2, user A 250 enters a peer query at SE-A 252. In sequence 3, SE-A 252 provides a SERP page A (SERP-A) based upon a cached peer-to-peer content at the meta site hosting SE-A 252 In sequence 4, the user selects the next item (e.g., file) in the SERP-A. In sequence 5, SE-A 252 forwards the query to a peer-to-peer (P2P) network 254. In sequence 6, P2P network 254 begins returning results to SE-A 252 as they are discovered. In sequence 7, SE-A 252 filters redundant results, merges unique results dynamically in correct relevance order, updates SERP-A as required, and sends the updated SERP-A to user A 250.

Figure 21:
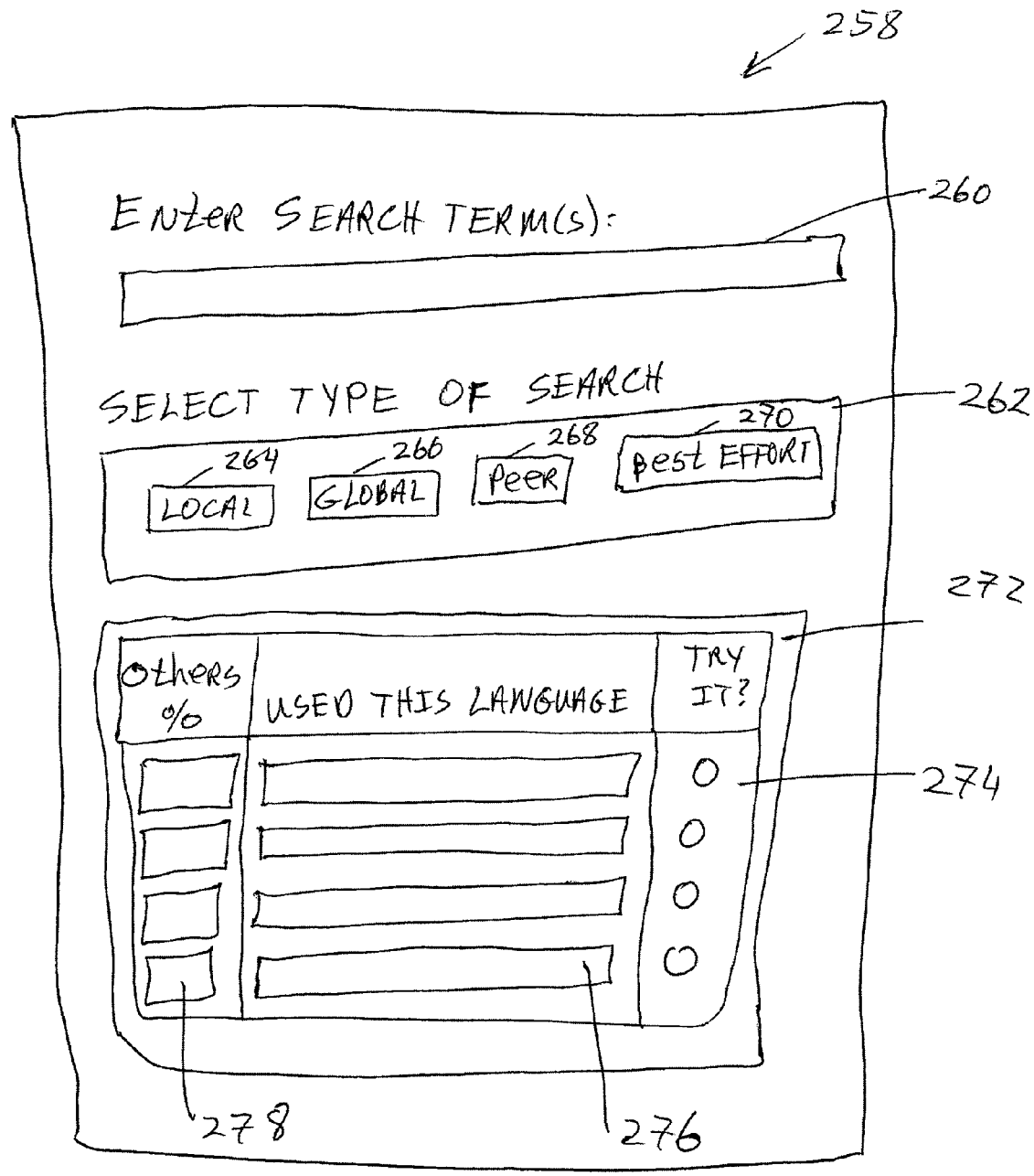
FIG. 21 is a diagram showing a user interface according to the present invention for allowing a user to enter a search query.

FIG. 21 shows a sample user query form 258 according to the present invention. The query form 258 includes an entry field 260 for allowing a user to enter a desired search query. Search selection buttons 262 allows the user to initiate a desired type of query. Buttons 262 include a local query button 264 for querying a specific website host using the query entered in field 260, global query button 266 for querying a plurality of host and network types using the query, peer-to-peer query button 268 for querying a peer-to-peer network using the search term, and a "best efforts" query button 270. The best efforts query button 270 selects one or more optimal query types for the user, based upon the search terms entered by the user or pre-defined criteria. An alternate query language suggestion field 272 is provided, wherein alternate query language that has been tried, in the past, is presented to the user in fields 276. For each of these fields 276, the user is also provided with percentage fields 278 which reflect the percentages of users which tried the respective alternate query, as well as buttons 274 which allow the user to try one or more of the alternate queries specified in the fields 276.

FIG. 22 shows sample emoticons 272 for allowing a user to vote after viewing a search result provided by the present invention. The emoticon 274 allows a user to indicate satisfaction with the search result. The emoticon 276 allows the user to indicated dissatisfaction with the search result. The emoticons 272 could be selectively displayed to the user before returning to a search results page. Specifically, the user is asked to vote on the quality or relevance of the page's content by clicking on one of two emoticons. The emoticons 272 could be continuously displayed, semi-transparently, toward the top of the user's content viewing window. The emoticons 272 could remain in view, could move around randomly, toward the top of the content window, and could "float" over the content as the user scrolls in any direction. The exact location, size, color, graphical content, shape, font, distortion, expression, etc., of the emoticons can vary from page to page in order to effect a reverse Turing test. This is done to discourage automated spamming attempts by robots, or attempts to game the ResultRank algorithm.

FIG. 23 shows a web page, indicated generally at 290, having latent (non-HTML) or dynamic content that has been converted by the present invention into HTML-based ("surface") content that can be quickly and conveniently searched by the present invention. In particular, the inventor citation fields 292 and the non-patent reference citation fields 294, which originally contained links to non-HTML (latent) content), have been converted by the present invention into HTML-based (surface) content that can be easily accessed and searched.

Figure 24:
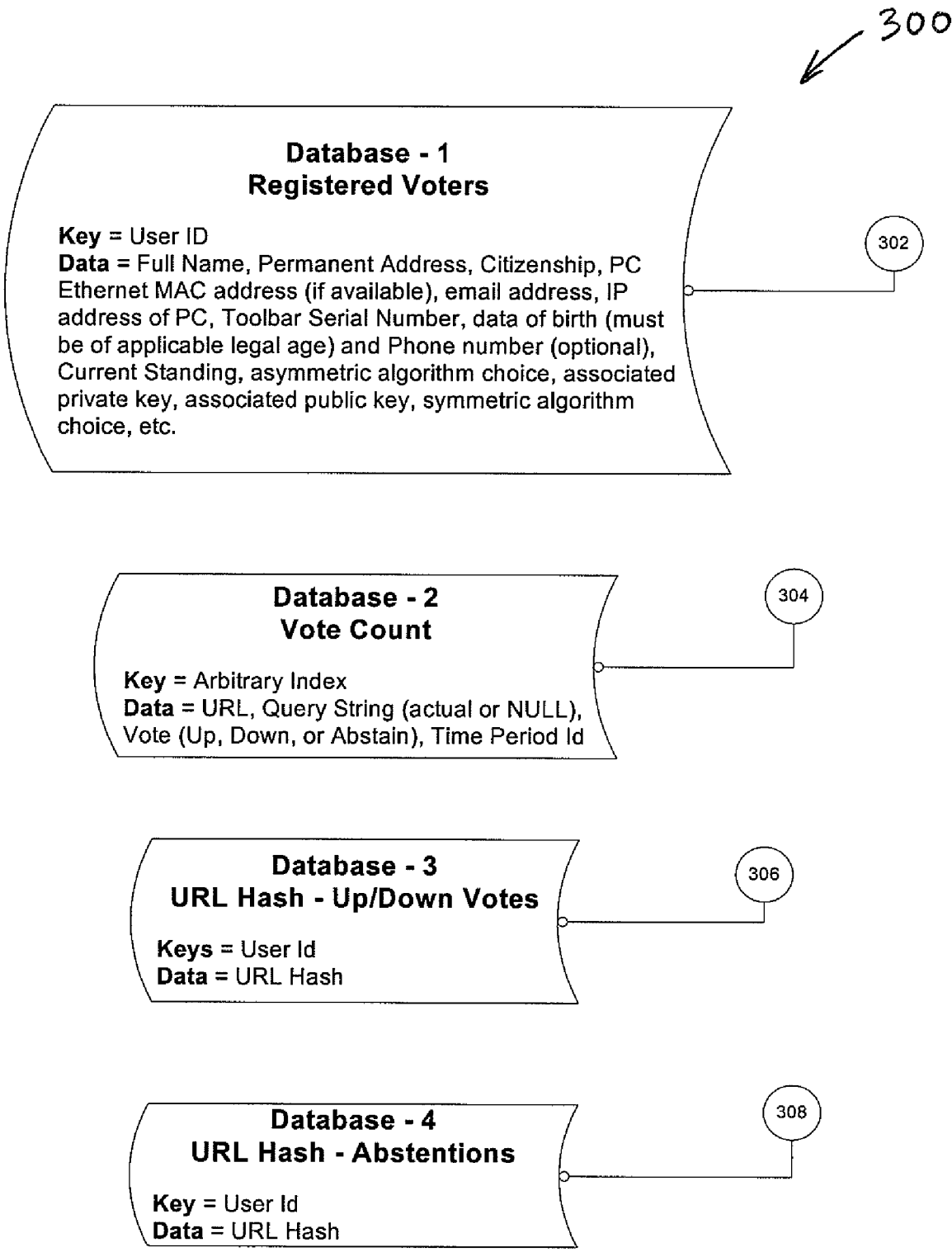
FIG. 24 is a diagram showing databases stored and maintained in the central repository of the present invention, which are updated and accessed through interaction with toolbar-enhanced web browsers.

FIG. 24 is a diagram showing the databases maintained by the central repository (CR) of the present invention, indicated generally at 300, for use in connection with a toolbar-enhanced web browser provided in accordance with the present invention, as well as user interactions therewith and ResultRank calculation. The votes from non-toolbar users are maintained and processed separately by the present invention in one or more databases not shown in FIG. 24. Separate databases are maintained in order to isolate user-identifying information from votes cast, thus optimizing user privacy. The databases 300 are updated through interaction with toolbar-enhanced web browsers in accordance with the present invention, as users navigate, vote on web pages, use supported search engines, and vote-check the SERPs returned by these search engines. Toolbar interaction with the databases 300 is discussed further in connection with FIGS. 25A-25E. Database 302, entitled "Registered Voters," is keyed by the field "User ID" and contains a variety of user information used to register and subsequently authenticate voters. Such information could include, but is not limited to, full user names, permanent addresses, citizenships, computer (PC) Ethernet hardware (MAC) addresses (if available), e-mail addresses, IP addresses of PCs, toolbar serial numbers, dates of birth (users may be required to be of legal age), and optional telephone numbers. Additionally, the user's current standing, asymmetric algorithm choices, associated private keys, associated public keys, and symmetric algorithm choices, could also be stored.

Database 304, entitled "Vote Count," is keyed by an arbitrary index and contains records each having a minimum of the following information: URL, user query string entered (either actual or NULL due to ballot timeout), the user vote (up, down, or abstain), and a timestamp or time period ID. Database 306, entitled "URL Hash—Up/Down Votes," is keyed by User Id and contains a one-way hash of the URLs the user has previously voted on (up or down) combined with a time period identifier (ID). The time period ID is incremented periodically and/or when the CR determines that the web page represented by the URL has undergone significant renovations. A cryptographic algorithm is used to hash the URLs, making it very difficult to work from the hash back to the original URL and thus enhancing user privacy. This database is necessary in order to preclude a single user from voting for the same web site multiple times, within a given period of time. Database 308, entitled "URL Hash—Abstentions," is keyed by User Id and contains much the same information as database 306, except that the user vote for the URLs represented by the hashes are abstentions. This data is maintained separately from the URLs that received up/down votes, since any number of abstentions are allowed for a given URL, by a given user, within a given time period.

FIGS. 25A-25E depict a flowchart, indicated generally at 320, showing the processing steps of the present invention for user interaction with the toolbar-enhanced web browser and related toolbar interaction with the CR. The flowchart 320 illustrates the manner in which votes are collected from a user. The user is assumed to be voting with a toolbar-enhanced web browser in accordance with the present invention. The toolbar communicates with a CR in order to authenticate voter identity, determine a user's right to vote on a particular URL within a given time period, to count the votes, and to vote-check search results returned by any supported Search Engine (SE). The CR maintains the databases 300 illustrated in FIG. 24. A hybrid crypto-system is employed (depending on a User's citizenship and location) to protect user privacy. Such a crypto-system could include one or more of the crypto-systems disclosed in the text by Schneider entitled "Applied Cryptography Protocols, Algorithms, and Source Code in C," second edition, 1996, John Wiley & Sons, which is expressly incorporated herein by reference in its entirety. When permitted by export laws, and at the time of toolbar installation/setup, the user selects from a plurality of supported public key asymmetric algorithms. Two sets of public/private keys are then generated for use in future voting sessions. With functionality built into the toolbar, a public and associated private key is be generated for the user-selected asymmetric encryption algorithm. The toolbar then sends the public key to the CR. The CR generates a second public/private key pair for the user-selected asymmetric algorithm, and sends the public key to the toolbar. The toolbar stores the private key it generated, as well as the public key received from the CR. Likewise, the CR stores the unique private key generated for this user and the public key received from the user's toolbar (both indexed by the user's IP address). Use of the public/private keys is described in detail below. In addition, during setup, the user selects from a plurality of supported symmetric encryption algorithms to be used in future voting and vote-check sessions with the CR. The symmetric algorithm choice is communicated to the CR via communications secured with the public and private keys, and is stored by the CR (indexed by user's IP address). Use of the symmetric algorithm is explained in detail below.

Figure 25A:
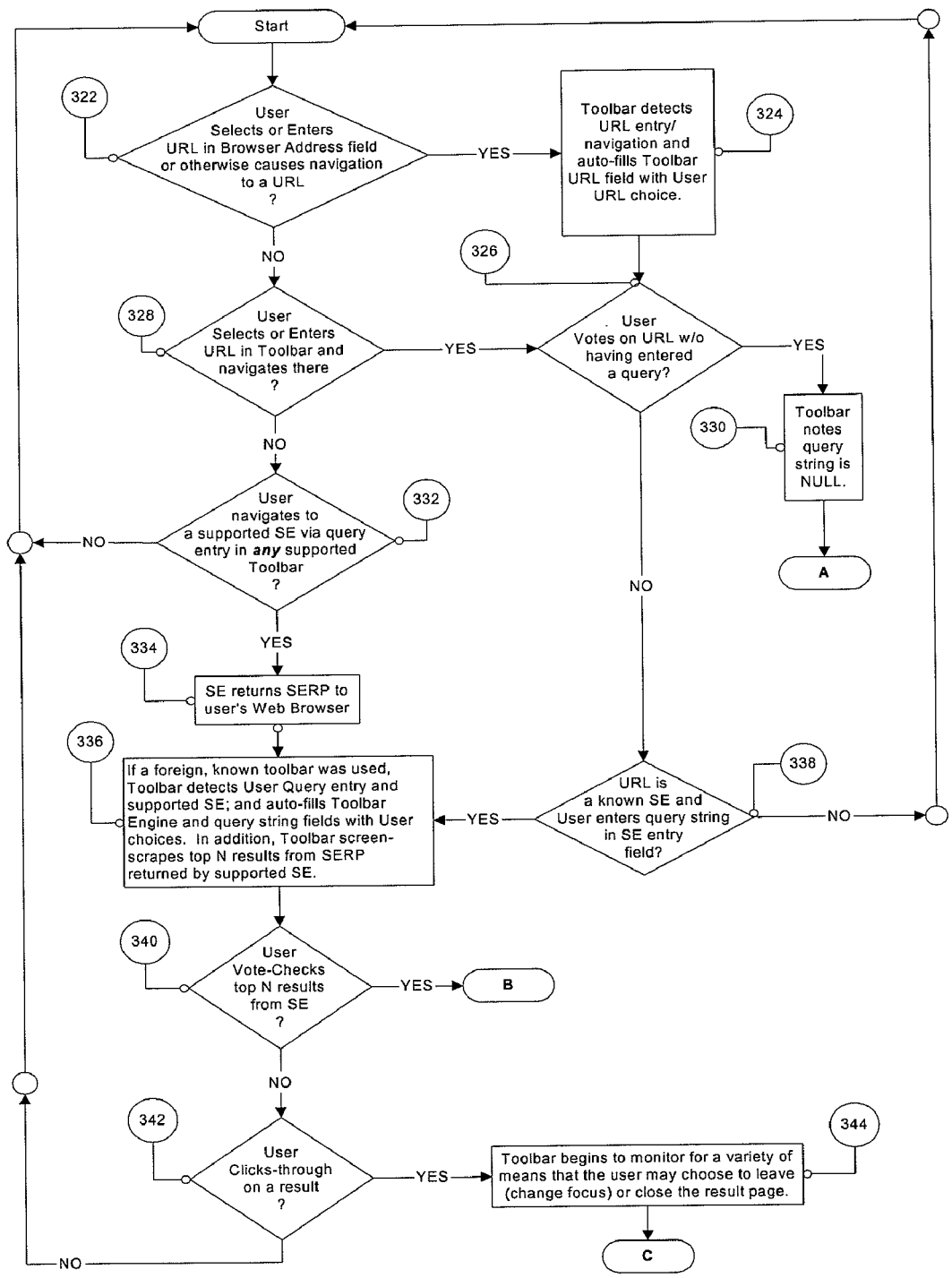
FIG. 25A-25E show a flowchart of processing steps according to the present invention for user interaction with a toolbar-enhanced web browser, as well as steps for toolbar interaction with the central repository of the present invention, evaluating search results (vote checking), and voting on content quality and/or relevance.
Figure 26A:
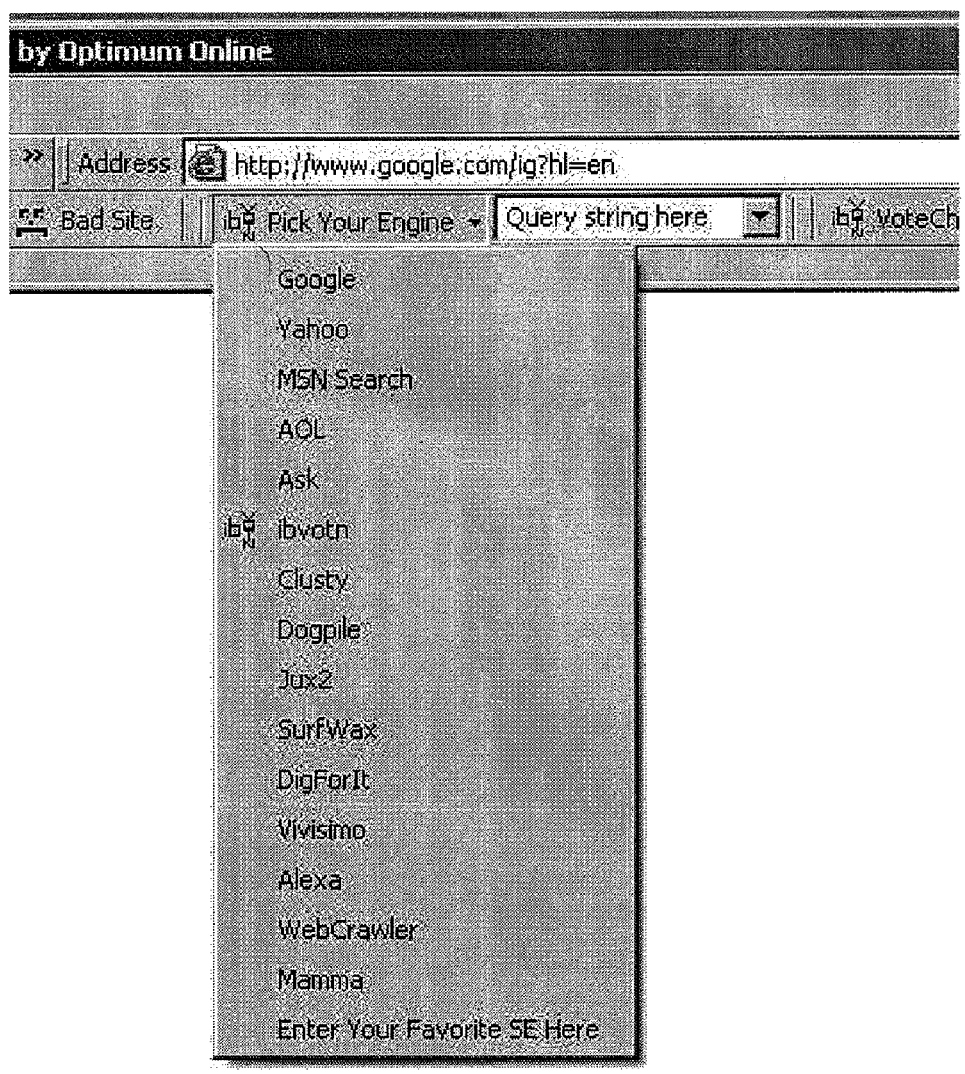
FIG. 26A-26F are computer screen "shots" showing the enhanced toolbar of the present invention which can be utilized by any suitable web browser.
Figure 26B:
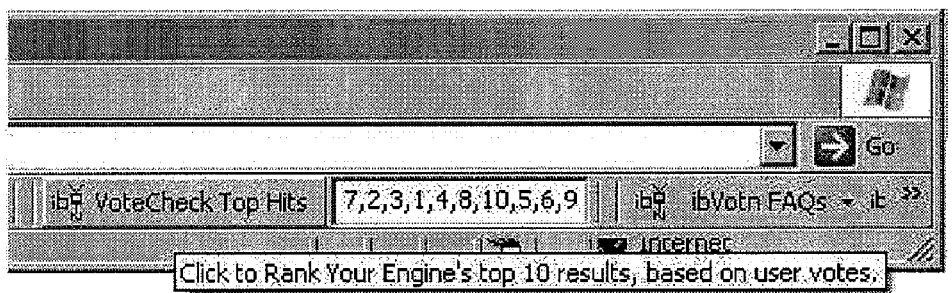
Figure 26C:
Figure 26D:
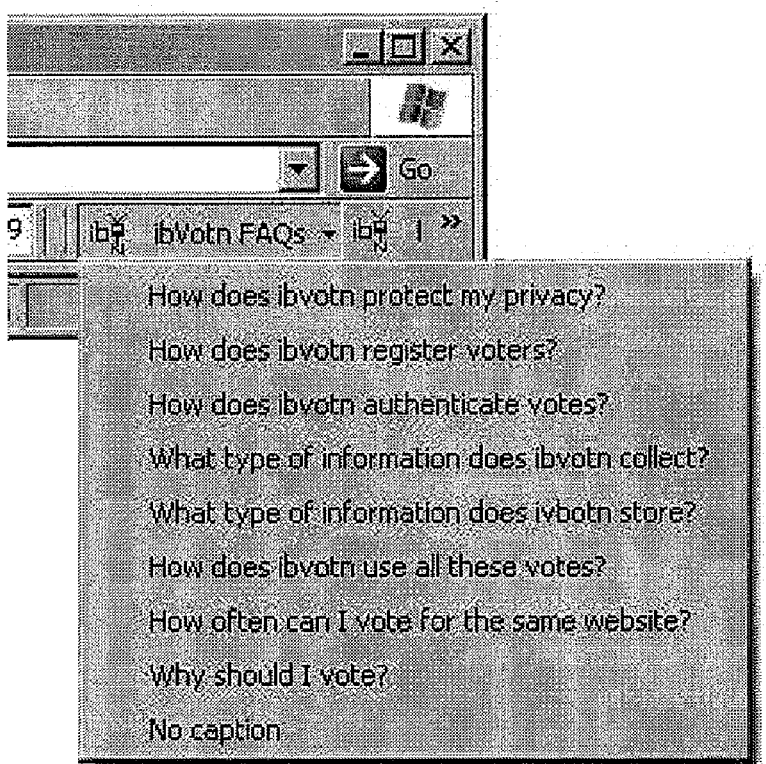
Figure 26E:

In FIG. 25A, at step 322, a determination is made as to whether the user has caused the web browser to navigate to a new URL via the standard browser address field, or through other means (i.e., by picking from a history list, following a link from a prior Web site, taking a bookmark, etc.). If so, then step 324 is invoked, wherein the toolbar auto-fills its own URL field with the new URL. In step 326 a determination is made as to whether the user has voted on the URL without having first issued a query to any Search Engine (SE). If a positive determination is made, then step 330 is executed, wherein the toolbar assigns a NULL value to the query string for future use. At step 328, a determination is made as to whether or not the user selected or entered a URL directly in the toolbar text field (see toolbar region 506 in FIG. 26C). If a positive determination is made, then step 326 is invoked. If a negative determination is made, then another determination is made at step 332, as to whether or not the user simultaneously navigated to any supported SE query entry page, while also causing that SE to search on an entered query string, by use of any other supported and installed toolbar in the user's web browser. If a positive determination is made, then step 334 is invoked, wherein the SE returns a Search Engine Results Presentation (SERP) page to the user's browser.

If a negative determination is made at 332, then processing is repeated from step 322. In step 336, a determination is made as to whether a foreign toolbar or an SE was used to navigate. If so, the toolbar detects the user query by screen-scraping the foreign toolbar or SE query form and auto-fills the corresponding toolbar field (see toolbar region 502 in FIG. 26A) with the name of the search engine and the user's query string. In addition, the toolbar screen-scrapes the top N results from the SERP for possible use.

At step 338, a determination is made as to whether or not the URL is also the query entry page for a known SE, and if so, whether the user has entered a query string at that location and initiated a search. If a positive determination is made, then step 336 is invoked. If a negative determination is made, then processing is looped to continue at step 322. A determination is made at step 340 as to whether or not the user has selected the "Vote-check" option from the toolbar. If a negative determination is made, then step 342 is invoked. If a positive determination is made, then step 422 (FIG. 25E) is invoked. A determination is made at step 342 as to whether or not the user has clicked-through on a search result. If a negative determination is made, processing loops back to continue from step 322. If a positive determination is made, step 344 is invoked, in which the toolbar begins to monitor for any indication that the user is either ready to, or has navigated away from, the result window, changed the focus away from the result window, or closed the result window.

Figure 25B:
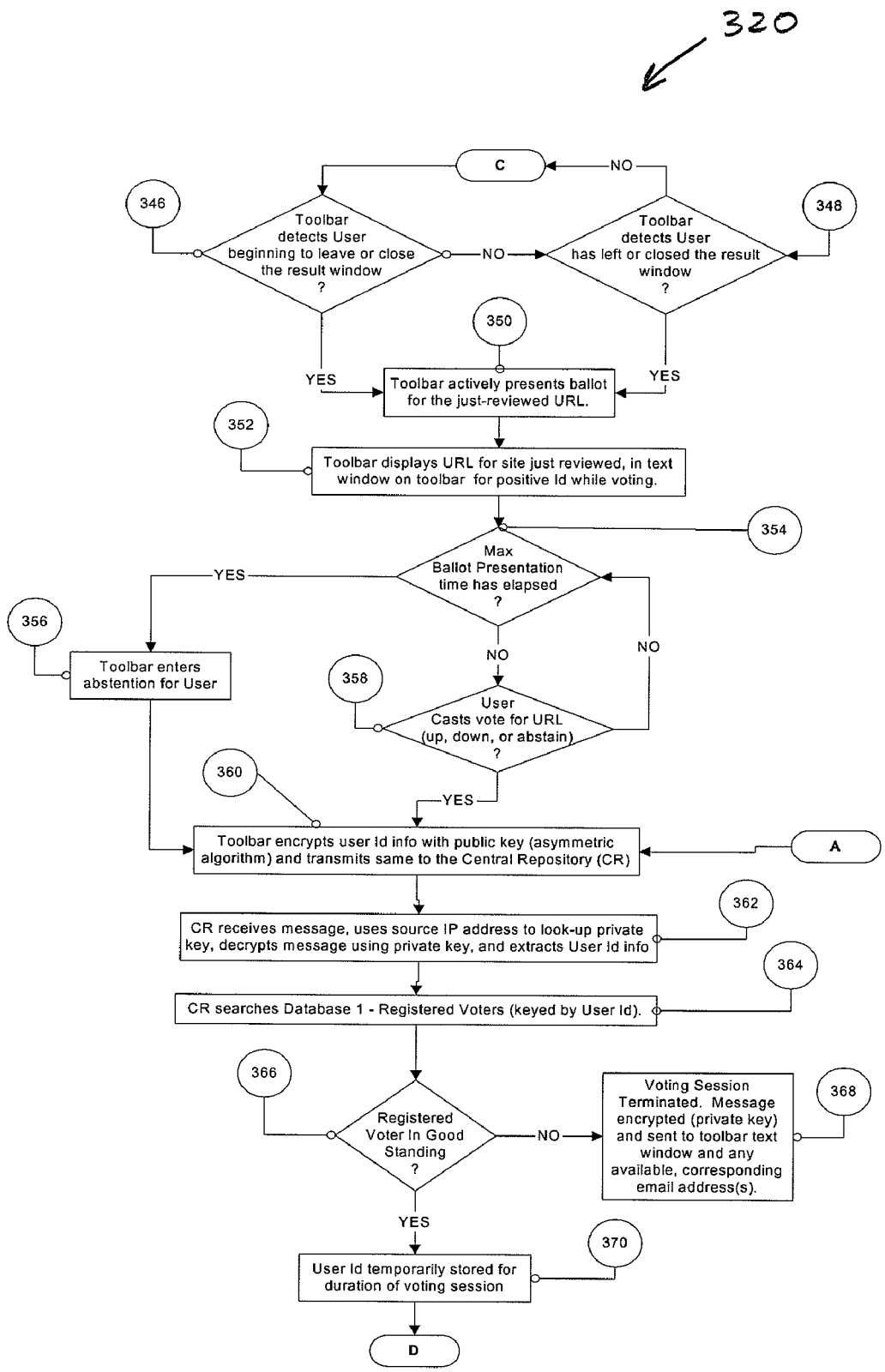

In FIG. 25B, at step 346, a determination is made as to whether or not the user is finished reviewing the search result and ready to leave that result. If a positive determination is made, then step 350 is invoked, wherein the toolbar actively presents the ballot to the user for the just-reviewed search result. If a negative determination is made, then step 348 is invoked. A related determination is made at step 348 as to whether or not the user has already left the result window. If a positive determination is made, then step 350 is invoked. If a negative determination is made then processing loops back to step 346. In step 352, the toolbar displays the URL for the site just reviewed, (in the text window on the toolbar near region 506 in FIG. 26C), for positive identification of the URL being voted on. In step 354 a determination is made as to whether or not the maximum time allowed for ballot presentation, prior to the user casting a vote, has expired. If a positive determination is made, then step 356 is executed, in which the toolbar automatically enters an abstention for the user, for this URL. If a negative determination is made then step 358 is executed, wherein another determination is made as to whether or not the user has actively cast any vote (up, down, or abstention). In the event of a positive determination, then step 360 is invoked.

In the event of a negative determination, execution loops to repeat from step 354. In step 360, the toolbar uses an asymmetric algorithm and a public key from the CR to encrypt the user ID information and sends same to the CR. In step 362, the CR receives the message, extracts the source IP address of the sending PC and uses this to lookup the private key for this user. The CR then uses the same asymmetric algorithm and the private key to decrypt the message and extract the user ID information. In step 364 the CR conducts a search of the database of registered voters (see database 302 of FIG. 24), looking for a match with the user ID information. A determination is made at step 366 as to whether or not the user is a registered voter and in good standing. If a positive determination is made, then step 370 is invoked, wherein the user ID is retained by the CR for the duration of the voting session. If a negative determination is made then step 368 is invoked, wherein the voting session is terminated, and the public key associated with this user is used by the CR to encrypt a message which informs the user that he or she is not deemed to be a registered voter in good standing, and all residual session data is flushed and zeroized. In addition, if there are e-mail addresses associated with this session known to the CR, e-mail to the same effect is generated and sent by the CR.

Figure 25C:
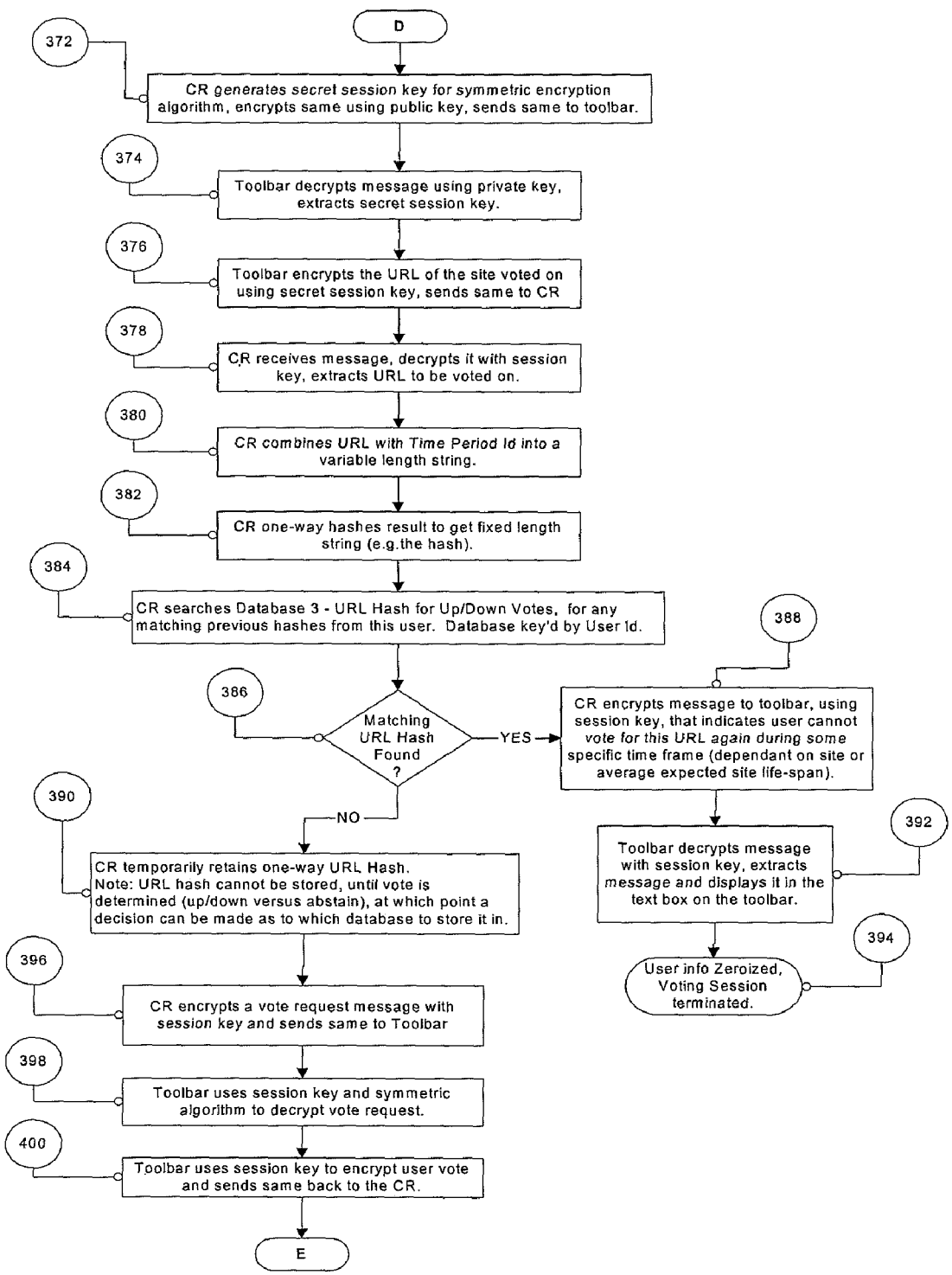

In FIG. 25C, at step 372, the CR generates a secret session key for use with a symmetric encryption algorithm for the duration of this voting session. The CR encrypts the session key using the public key associated with this user and sends the resulting message to the user's toolbar. In step 374, the toolbar receives the message and uses the private key from the CR to decrypt the message and extract the secret session key. In step 376, the toolbar encrypts the URL for the site the vote was cast for, using the secret session key, and sends the resulting message to the CR. In step 378, the CR receives the message and uses the session key and symmetric algorithm to decrypt it, extracting the URL being voted on. In step 380 the CR combines the URL with the current time period ID into a variable length string. In step 382 the CR one-way hashes the variable length string to get a fixed length string (e.g. the hash). In step 384, the CR conducts a search of the URL hashes for up/down votes (using database 306 of FIG. 24) checking for a match with the hash.

Figure 26F:
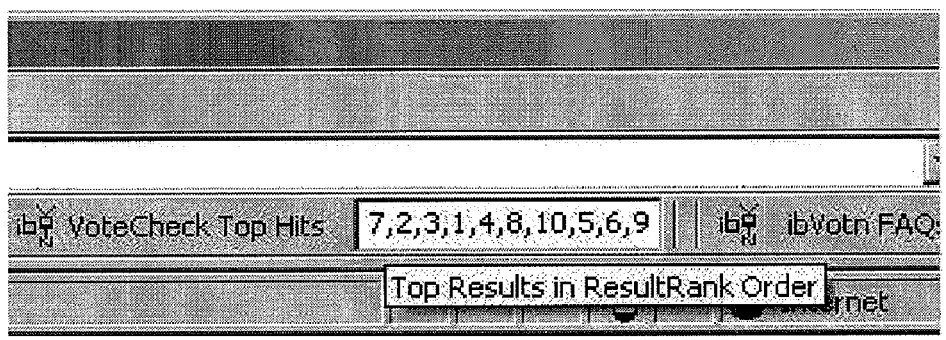

In step 386, a determination is made as to whether or not a match is found with an existing stored hash. In the event of a positive determination, step 388 is invoked, wherein the CR encrypts a message using the session key, indicating that the user is not allowed to vote for this URL again until the current time period ID is incremented. In step 392, the toolbar decrypts the message from the CR using the session key and extracts and displays the plain text message from the CR, in the text box of the toolbar (shown in toolbar region 512 of FIG. 26F). In step 394, any residual user information is flushed, deleted, and zeroized by the CR and the voting session is terminated. In the event that a negative determination is made at step 386, then step 390 is invoked. In step 390, the CR retains the one-way URL and time period ID hash until the actual vote is determined, at which point a decision can be made as to a database (either database 306 or 308 of FIG. 24) in which to store the hash. In step 396, the CR encrypts a vote request message with the session key and sends same to the toolbar. In step 398, the toolbar receives the message and decrypts it with the session key to extract the vote request message. In step 400 the toolbar uses the session key to encrypt the user vote and sends same back to the CR.

Figure 25D:
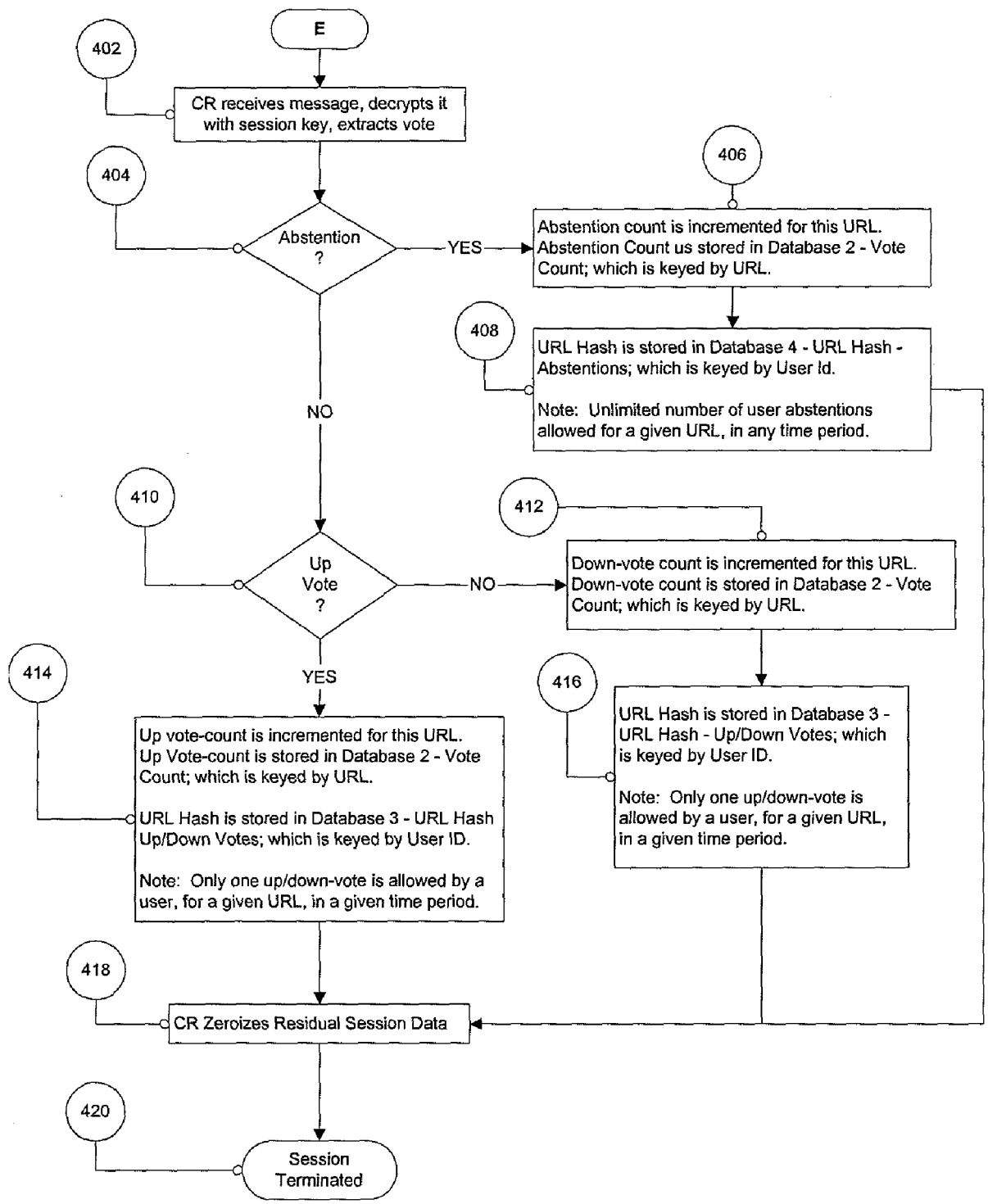

In FIG. 25D, at step 402, the CR receives the message from the toolbar, decrypts it using the session key, and extracts the user's vote for the URL. In step 404, a determination is made as to whether or not the vote is an abstention. If a positive determination is made, then step 406 is invoked, wherein the abstention count is incremented for this URL and the Vote Count database is updated (database 304 of FIG. 24). In step 408, the URL hash generated at step 382 and retained at step 390 is stored in the URL Hash—Abstentions database (database 308 of FIG. 24). If a negative determination is made at step 404, then a subsequent determination is made at step 410 as to whether or not the vote is an "up-vote." If a positive determination is made, then step 414 is invoked, in which case the up-vote count is incremented for this URL and stored in the Vote Count database (database 302 of FIG. 24). In addition, the URL hash is stored in the URL Hash—Up/Down Votes database (database 306 of FIG. 24). Note that only one up/down-vote is allowed by a user for a given URL, in a given time period. In step 418, the CR flushes, deletes, and zeroizes any residual user and/or session data. In step 420 the voting session is terminated by the CR. In step 412, the down-vote is incremented for this URL and used to update the Vote Count database (database 304 of FIG. 24). In step 416, the URL hash generated at step 382 and retained from step 390, is stored in the URL Hash—Up/Down Votes database (database 306 of FIG. 24).

Figure 25E:
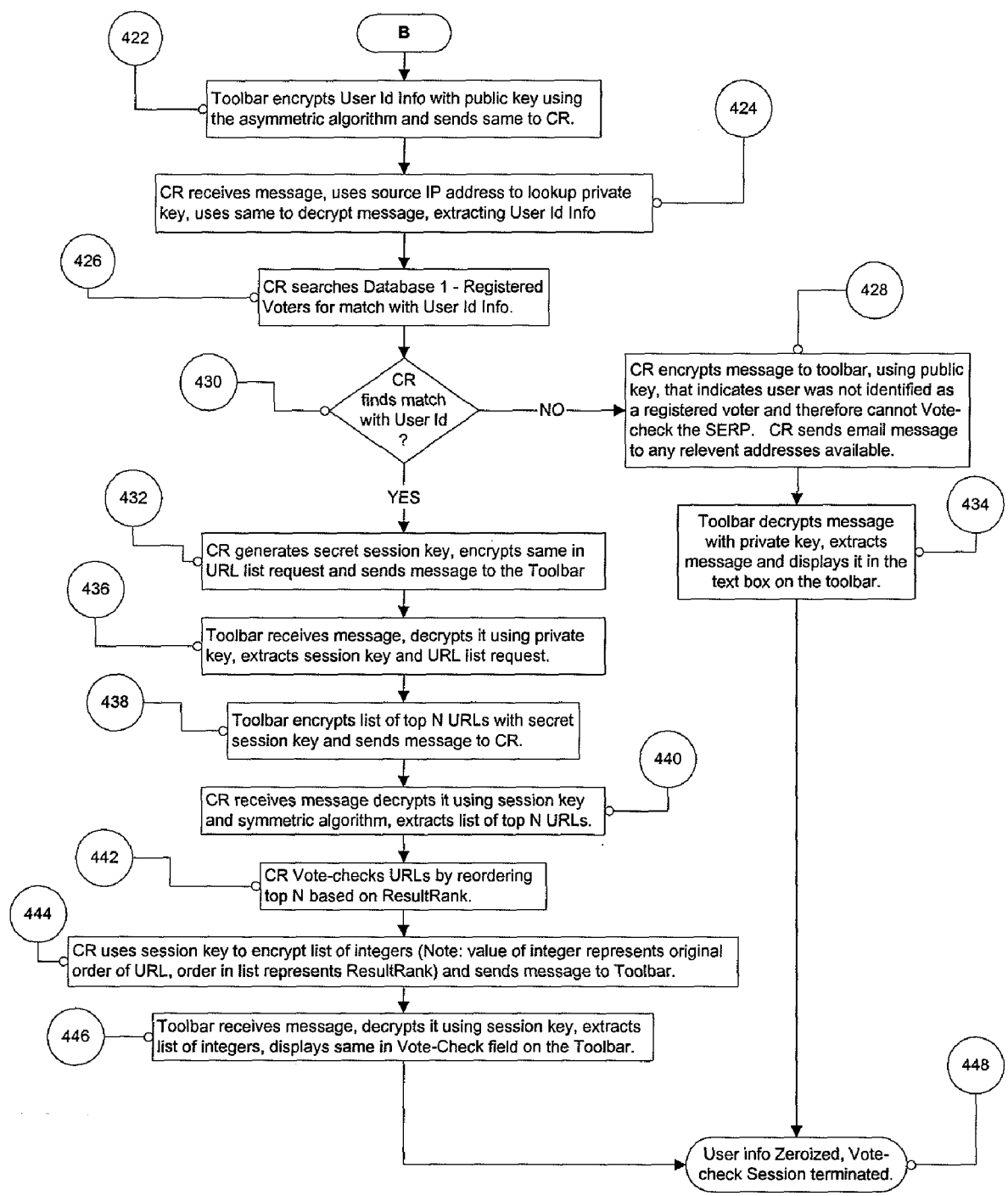

In FIG. 25E, at step 422, the toolbar encrypts the user ID information using the public key from the and the asymmetric algorithm and sends the resulting message to the CR. In step 424, the CR receives the message from the toolbar, and extracts the source IP address. The CR then uses the source IP address to look up an associated private key. The CR then uses the private key to decrypt the message and extract the user ID information. In step 426, the CR then searches the registered voter database (database 302 of FIG. 24) for a match with the user ID information. In step 430, a determination is made as to whether or not a match was found for this user. In the event that a negative determination is made, then step 428 is invoked, wherein the CR encrypts a message to the toolbar, using the public key associated with this IP address, indicating that the user was not identified as a registered voter in good standing and therefore cannot Vote-check the SERP. The CR also sends e-mail messages to any relevant addresses available. In step 434, the toolbar decrypts the message from the CR using the private key, extracts the message, and displays the message in the text box on the toolbar (see toolbar region 504 in FIG. 26B). In step 448, all residual session and/or user data is flushed, deleted, and zeroized, and the Vote-check session is terminated by the CR. In the event of a positive determination at step 430, execution proceeds to step 432.

At step 432, the CR generates a secret session key, encrypts same in the message also containing a URL list request, and sends the message to the toolbar. In step 436, the toolbar receives the message, and decrypts it with the private key, extracting the session key and the URL list request. In step 438, the Toolbar encrypts the list of the top N URL's (screen scraped at step 336) using the session key and sends the resulting message to the CR. In step 440, the CR receives the message and decrypts it using the session key and the symmetric algorithm, and extracts the list of top N URLs. In step 442, the CR Vote-checks the URLs by reordering the top N results based on their relative ResultRank. In step 444, the CR uses the session key to encrypt a list of integers. The value of the integers represents the original order of the URLs as determined by the SE. The order of the integers represents their relative ResultRank. The CR sends the resulting message to the toolbar. At step 446, the toolbar receives the message, and uses the session key to decrypt the message, extracting the list of N integers. The toolbar then displays the integers in the text box (e.g., Vote-Check field in toolbar region 504 shown in FIG. 26B).

FIGS. 26A-26F are a collection of screen "shots" illustrating the functionality of the toolbar of the present invention, which can be implemented using any suitable web browser. The main toolbar at region 502 (FIG. 26A) shows the pull-down pick list of currently supported Search Engines. The portion of the toolbar show at region 504 (FIG. 26B) illustrates the Vote-check field, or text box, which is used to communicate relative ResultRank of the top N results returned by a supported Search Engine, and in addition is used to communicate a variety of messages to the user from the CR. Also shown at region 504 (FIG. 26B) is the message that can be seen when a mouse-over of the "VoteCheckTop Hits" section of the Toolbar occurs. The toolbar shown in region 506 (FIG. 26C) shows both the "Good Site" and "Bad Site" emoticons which frame the URL window. In addition, in region 506 (FIG. 26C) the temporary message can be seen, which is displayed when a mouse-over of the adjacent area of the toolbar occurs. The toolbar excerpt shown at region 508 (FIG. 26D) shows the pull-down pick-list of frequently-asked questions (FAQs) for the toolbar, which is used to market the toolbar and educate users and potential users as to the benefits of the toolbar. The toolbar shown at region 510 (FIG. 26E) illustrates the same Good Site/Bad Site emoticons, this time in a pull-down, pick-list form. In addition, at region 510 (FIG. 26E), the message associated with the Good Site emoticon can be seen in the browser's status bar at the bottom of the screen shot. At region 512 (FIG. 26F) can be seen the message displayed to the user when a mouse-over of the Vote-check field occurs.

Importantly, the present invention achieves the following objectives:

1) improves coordination between web "robots" and web sites;
2) improves content access by the general public without navigating to a website;
3) improves relevancy ranking of search results;
4) allows browsing of non-HTML networked content;
5) improves browsing of HTML networked content;
6) reduces traffic load on site servers;
7) facilitates decentralized crawling of content;
8) improves access to local content only after a user arrives at the site;
9) allows decentralized content indexing;
10) utilizes local user queries to characterize local site content;
11) uses interaction with search results to generate additional information about content relevancy;

12) better integrates peer-to-peer searches with standard HTML-based web searches;
13) detects and utilizes query language progression;
14) eliminates single points of failure; and
15) improves scalability.

The foregoing objectives can be achieved by the present invention by selectively implementing: (1) extended versions of known robot configuration files ("robots.txt") that are stored on website hosts; (2) browser plug-ins provided in accordance with the present invention; (3) web scrapers enhanced in accordance with the present invention; (4) meta sites provided in accordance with the present invention; (5) enhanced versions of web browsers; and (6) web crawlers enhanced in accordance with the present invention. Various combinations of the foregoing components achieve specific objectives, as summarized in Table 1 below. The combinations are presented as "use cases," a notation commonly implemented in software engineering for denoting the requirements of a given system:

(e.g., meta servers 20a-20c of FIG. 1), with infrequent and only temporary "dives" into deep web content. Therefore, given the existence of a meta site, use of an enhanced browser is possible and may be beneficial, but is not required.

Further features of each of the use cases summarized in Table 1 are provided below:

Use Case 1

The Robots.txt file is enhanced to include additional directives for alerting a robot to the fact that a particular web site is a deep web site (e.g., contains data in non-HTML format), and to direct a visiting robot to an optional browser plug-in and associated configuration file. This saves robot time as well as local site resources.

Use Cases 2 and 3

To the extent that a standard, locally-based crawler is able to crawl a site and make this information available to the user through a local search engine interface, there can be improved access to content. This improvement can be provided by

TABLE 1

| Use Case | Robots.txt | Configured Plug-In(s) | Scraper | META Site | Browser | Crawler | Objectives |
|---|---|---|---|---|---|---|---|
| 1 | Extended | Not Used | Standard | None | Standard | Standard | 1 |
| 2 | Extended | Not Used | N/A | None | Standard | Local Standard | 8 |
| 3 | Extended | Used | N/A | None | Standard | Central Standard | 2 |
| 4 | Extended | Used | N/A | None | Standard | Local Enhanced | 3, 7, 8 |
| 5 | Extended | Used | N/A | None | Standard | Central Enhanced | 2, 3 |
| 6 | Extended | Used | N/A | None | Enhanced | Local Standard | 4, 5, 8 |
| 7 | Extended | Used | N/A | None | Enhanced | Central Standard | 2, 4, 5 |
| 8 | Extended | Used | N/A | None | Enhanced | Local Enhanced | 3, 4, 5, 7, 8 |
| 9 | Extended | Used | N/A | None | Enhanced | Central Enhanced | 2, 3, 4, 5 |
| 10 | Extended | Used | Enhanced | Yes | Standard | Local Standard | 3, 4, 5, 6, 7, 8 |
| 11 | Extended | Used | Enhanced | Yes | Standard | Central Standard | 2, 3, 4, 5, 6 |
| 12 | Extended | Used | Enhanced | Yes | Standard | Local NodeRank | 3, 4, 5, 6, 7, 8, 9 |

In Table 1 above, web browser plug-ins are tailored for a specific robot type (i.e., browser, crawler, scraper) and/or brand. Additionally, a crawler is assumed to be associated with a particular centralized or a local search engine. The Robots.txt files and Configuration.txt files are specific to a particular web site or sites. When the user's web browser is loaded with a plug-in, a standard robot is considered to be "enhanced." To be useful, a plug-in must first be configured for use on a particular website or page. This is achieved with the Configuration.txt file. It should be noted web browsers, although driven by human users, are also considered herein as robots. A toolbar-enhanced web browser is a special plug-in use case shown in the table above, but discussed elsewhere herein.

If a meta site exists, then a crawl is assumed to utilize it, and can be done with a standard crawler. If a meta site exists, it can be utilized by a standard browser to traverse formerly non-HTML networks. However, once a link is taken by a web user into the companion deep web database, subsequent navigation is limited to the HTML network without enhancing the browser. It is assumed that most standard browsing will take place on the meta servers (or sites) of the present invention applying the PageRank sorting algorithm to link map data, or other equivalent search engine sorting algorithm.

Use Case 4

An enhanced local crawler will be able to crawl a site to the extent dictated by the Robots.txt and Configuration.txt files. This will typically be more comprehensive and more effective than a standard crawl. It is assumed that non-HTML networks in the site's content will be converted to HTML (via the URI Generator) and indexed for subsequent retrieval by a locally-based search engine. Thus, search results will have the benefit of PageRank, or equivalent analysis being done on the non-HTML based networks, which will work to improve hit relevancy ranking. The local crawling can be done without centralized knowledge or coordination. Once a user visits the site, then they can benefit from use of the local search engine, over what was offered previously (likely non-PageRank based result presentation and/or a user query form).

Use Case 5

A centralized crawl of a site allows much improved access to that site by the general public, as opposed to those who are perhaps experts in the content matter and through experience have learned about the site. In addition, users can benefit from improved relevancy rankings since non-HTML networks have been exposed to PageRank, or equivalent analysis.

Use Case 6

The addition of an enhanced browser allows site visitors to better browse the search results returned by the local search engine. While browsing, a user can navigate both HTML and non-HTML network structures.

Use Case 7

The addition of an enhanced browser allows the general public to better browse the search results returned by the popular search engine. While browsing, a user can navigate both HTML and non-HTML network structures.

Use Case 8

The addition of an enhanced browser allows the local visitors to better browse the search results returned by the local search engine. While browsing, a user can navigate both HTML and non-HTML network structures.

Use Case 9

The addition of an enhanced browser allows the general public to better browse the search results returned by the popular search engine. While browsing, a user can navigate both HTML and non-HTML network structures.

Use Case 10

The Robots.txt and Configuration.txt files used by the enhanced scraper of the present invention to crawl the target site will determine the quality of the companion meta site. It is assumed that dynamically-generated, non-HTML networks in the site's content will be converted to static HTML (via the URI Generator) anchor links during the generation of the meta site. The meta site may then be crawled comprehensively and efficiently by a standard local crawler. Subsequent retrieval of indexed matching text by a locally based search engine will be useable by a standard browser. Search results will have the benefit of PageRank, or equivalent analysis being done on the non-HTML networks, which will work to improve hit relevancy ranking. The local crawling can be done without centralized knowledge or coordination. Once a user visits the site, then they can benefit from use of the local search engine, over what was offered previously (likely non-PageRank based result presentation and/or a user query form). The presence of the meta site allows a standard browser to better browse the search results returned by the local search engine. While browsing, a user can navigate both HTML and non-HTML network structures with only a standard Browser. Recurring, incremental, enhanced scraping of the target site is done to maintain the meta site and keep it current as new data is added to the target site. Scraping and crawling can be synchronized via the Robots.txt file to the rate new data is being added to the target site. The presence and use of the companion meta site will off-load traffic from the target site and reduce the reliance on any user query forms present. Any bulky and non-networked content can be left in the target site and be linked to from the meta site. The local scraping and crawling can occur without the need for coordination from a centralized search engine.

Use Case 11

This allows a popular, centralized search engine to coordinate the crawling. This has the advantage of making the target site (via the meta site) much more visible to the general public. This has the disadvantage of requiring centralized scheduling of new crawls by a likely very busy search engine. Scraping is coordinated locally to keep the meta site current.

Use Case 12

The local NodeRank-based search engine's associated crawler has the ability to forward the link map data, as discussed herein to a central repository for global NodeRank analysis. The central repository is constantly integrating and processing incoming link map data and continuously updates remote local search engines. It is not necessary for the central repository of the present invention to parse and index incoming content (as is done by the Google search engine), since only the presorted network connectivity data is received from each remote site. This saves on communication costs as the link map is a fraction of the full HTML content transferred to central servers by Google. The central repository is able to specialize and focus on calculation of NodeRank and in redistributing this and other data to remote sites for local use in ranking local search result data; as well as for use in selecting search scope. This approach is advantageous since newly added links are more immediately visible, locally, where searches are conducted. New links are less discriminated against in terms of their ability to obtain increased NodeRank due to decentralization of the search.

It should be noted that the following types of user actions can optionally be tracked and utilized by the present invention as contextual validation of user votes to produce ResultRank values for query-node pairs:

1) What the user chooses to "mouse-over;"
2) Where the user scrolls on the result page;
3) What search result selections are made;
4) The order (if any) in which search results are selected, assuming the user comes back to the presentation page after reviewing result pages;
5) Whether or not, the user refines their search to a similar search string and issues another query;
6) If the user goes beyond the first presentation page;
7) What is linked to (in real time);
8) What is bookmarked (in real time);
9) What is selected, copied;
10) What is printed; and
11) Time between each of the above events.
12) The User's IP address.

These types of user interactions with search results can be used to infer the usefulness of the results to the user. This human judgment concerning the relationship between the search string and the search result is captured and exploited. This collection of individual user judgment on individual nodes for different queries or sets of similar queries is then used as a second opinion, to validate user votes. Use of an independent supporting context surrounding user votes serves as an added check against spamming. This makes attempts to game the system more difficult. It should be noted that the present invention captures this type of personal information only when the user has not enhanced his or her web browser with the toolbar plug-in of the present invention. Toolbar installation offers the user the ability to register his or her identity with the Central Repository in a secure manner. Subsequently, the toolbar offers the ability to vote in a secure and private manner. Votes collected from users who are not using the toolbar for privacy are stored with the user's IP address and/or email address if available, to assist in authentication. Separate processing and storage of votes collected without the toolbar, from those collected with the toolbar, affords the ability to authenticate one against the other, as well as to selectively utilize the data in either an independent or integrated manner. Voting without the toolbar in some ways offers less privacy for the user, as more potentially personally identifiable information is collected and openly communicated between the user's browser and the Meta Site without the benefit of encryption security. This extra contextual information surrounding, and leading up to the user casting a vote is used to validate user votes, infer user authenticity, and inhibit unethical behavior and/or fraud (i.e., voting for the same site too frequently, denial of service attacks, voting with a false identity, etc.). However, users voting without the toolbar do not need to download and install the toolbar, and any personally identifiable information that must be retained to preclude fraud is one-way hashed prior to storage and isolated to the extent possible from the balance of any statistics that have been collected and/or stored.

In another variation of the present invention, a standard web scraper may generate a companion meta web site. Then, an enhanced web scraper can be utilized to operate on the meta site content in order to achieve the same effect as an enhanced web scraper would have achieved, if used in the first instance. The local meta representation of the content can be augmented by automated replacement of selected non-HTML links with actual HTML links. It may also be advantageous to first utilize a web scraper enhanced with a configuration file, then later run it again on the resulting meta site for example, after having improved the Configuration file to better divulge latent network content.

A robot, in the absence of appropriate Robots.txt and/or Configuration.txt files, given the appropriate user interface, may be manually configured with this same information. This might take place through a variety of mechanisms including but not limited to:

1) The use of SNMP (Simple Network Management Protocol) SET(s) of appropriate MIB (Management Information Base) items by a local or remotely located MIB Browser; and
2) Through semi-automatic "learning" mode in which certain uniquely identifying character string sequences, and keystrokes combinations, are entered or otherwise identified manually by the user during the "teaching" phase, and stored by the Robot for future fully automatic use. This may be better suited for web sites that discourage or inadvertently, but effectively prohibit crawling by standard robots.

The configuration file can be used to do selective replacement of certain strings. It facilitates uniquely identifying a certain character string combination and sending it or a portion of it to a remote site where a replacement is found and sent back. Many uses of this technique are possible.

An anchor link text generator could be used in place of the URI generator of the present invention. This is beneficial since some popular search Engines, such as Google, make special use of anchor link text. The links that point into a companion site, for example, could benefit from extra attention in this manner. Other uses of the generic functionality, offered by the Configuratin.txt file and remote "translators," are possible. For example, selected portions or entire pages might be translated in this manner from one language to another language.

In some cases, it may be advantageous for the meta sites of the present invention to become the target site and to be scraped in order to produce an additional meta site. This might be the case, for example, if a new configuration file has become available which can be used to extract additional latent network structure and convert it to HTML.

The scraper for the meta site may be a separate entity from the local search engine and operated independently without loss of benefit. Further, the local search engine can route local user search queries to remote servers for wider coverage. This calls for communication between multiple local search engines. This communication is TCP/IP based and encrypted. Each search result returned from a remote server is annotated with its global NodeRank.

Another variation of the present invention related to the central repository's calculation of global NodeRank is for the central repository to periodically send the entire NodeRank vector back to each individual search engine. This information can then be used in selection of local search results as well as in selection of alternate search engines to route local user queries to.

In another variation, the central repository can distill information received from each remote, distributed search engine and can generate a meta link map at the search engine level, similar to an annotated map of all known remote search engines. The map includes their connections to other search engines, their NodeRank, as well as a brief summary of the local content. Note that this requires each distributed search engine to prepare and forward an abstract describing their local content. A word limit is applied and key words are carefully selected. The local search engine thus will have the ability, based on its crawl of the local data to summarize a description of local content for forwarding to the central repository. It is presumed that sites misrepresenting their local content or otherwise attempting to game the local search engine, will collect fewer incoming links, over time, and will have lower NodeRank, and thus "wither on the vine."

In another variation, each distributed search engine, when attempting to initiate a more global search (either decided on automatically or by the local user), will forward the query to the central repository, where it will be evaluated. Then, based on information maintained at the central repository, it will be forwarded back out to selected alternate distributed search engines. Results from the alternate search engines are then forwarded directly to the site from which the user query originated. This will require the central repository to maintain content summary knowledge of each distributed site and for content summaries to be forwarded from each independent distributed search engine.

In another variation, to minimize communications, only changes to the local link map would be forwarded to the central repository periodically or as they occur. Still further, to minimize communications, updates could be forwarded from the central repository to the local search engines, only when a change in NodeRank has occurred that impacts the local content's relative ranking.

In another variation of the present invention, the meta-site search engines return SERPs to the user based not only on NodeRank and ResultRank, but also on the freshness of the page/content. Freshness is a measure of how recently the content was made Internet-accessible, and includes content that has not yet received any votes or only a small number of votes. The user does work for a typical popular search engine company when the user clicks on a sponsored link, in the sense that the search engine company gets paid advertising dollars for user clicks when sponsored links are clicked on. Popular search engines (Google, Yahoo, MSN, Ask, etc) typically offer sponsored links in the upper left quadrant, as well as in the right half of the user's web browser window. Organic links (those selected based on relevance rather than by the top bidder) are typically displayed in the lower left quadrant of the user's browser. About one third of a browser window is typically used to present organic links. Another one third is used for presentation of sponsored links, while the balance is used by the Search Engine company and/or the browser provider for branding, spacing and other administrative functions. Web searchers thus expect certain types of results in certain areas of the browser window. In this variation of the invention, space on the user's browser window that is typically used to present sponsored links is instead used to present randomly selected fresh links, and is clearly labeled as such. In this variation of the invention, the user does work by reviewing fresh content and voting on it for the benefit of future users In another variation of the present invention, to securely and accurately accumulate user votes for use in ResultRanking websites, a toolbar-enhanced web browser is used in combination with the Central Repository (CR). The toolbar is designed to achieve the following main functions:

1) To protect the user/voter's privacy;
2) To allow a user to securely register as a voter and subsequently securely and uniquely identify users;
3) To actively present the user with a ballot immediately following the user's click-through on a search result and at the conclusion of that results review by the user;
4) To securely collect and count votes;
5) To provide vote-based ResultRank feedback to the user, upon request, by re-ordering a portion of the SERP from any supported search engine;
6) To communicate with the user during the course of a voting session or for other reasons;
7) To sense and facilitate the utilization of any other search engine; and
8) To "Vote-Check" some number of top results returned by any search engine A plurality of web browsers are supported, including Microsoft Internet Explorer, Mozilla, and Firefox. Similar support for additional browsers can be added to the toolbar in the future. When the user downloads and installs the toolbar in his or her favorite browser, the user necessarily registers his or her identity, location (mailing address of permanent residence), Personal Computer Ethernet MAC address (if available), email address, IP address, and citizenship. The toolbar has the ability to sense the use of a plurality of different search engines such as, but not limited to: Google, Yahoo, MSN Search, AOL, Ask, Clusty, Dogpile, Jux2, SurfWax, DigForIt, Vivisimo, Alexa, WebCrawler, Mamma. Support can be added to toolbars after installation, for any other new search engine that may in the future become popular, or for any other reason, via remote, dynamic, automatic software download. The toolbar-enhanced web browser offers direct access to any of these search engines from a pull-down pick-list menu built into the toolbar and/or by automatically sensing when the user issues a search to another supported search engine, either through the web browser or via a "foreign" toolbar (e.g. one belonging to another SE) also installed in the web browser.

The toolbar has the ability to sense when a user clicks-through on a returned search result and then begins to monitor user activity so as to be able to sense when the user begins to leave, leaves, or closes the result window. The user may change the focus away from the result window by moving the mouse, or by key strokes, or by voice, or by other means. In some cases, there may be an opportunity to present the ballot before the user closes the window or changing the focus to a different window. The conclusion of the user's review of a search result is the trigger for the toolbar-enhanced web browser to actively present the user with a ballot as a reminder to vote on the site just reviewed. The ballot, and active presentation, can take a plurality of forms. The user can customize the toolbar during installation or subsequently for selective use of these different forms and ballot presentation choices. In a preferred form the ballot is two or more flashing, reverse-Turing test emoticons located either on the toolbar, or at random locations on the screen(s), mobile or fixed. The emoticons optionally, may follow the user's focus from one window to another, for example. The user can either click on the emoticon to go back to the previous page while simultaneously casting a vote, or merely mouse-over the emoticon, in order to cast a vote—whether actually leaving the result window or not. In another form, for example, the ballot can be fixed voting bars located around the edge of the result window; which can be either clicked-on, or moused-over to cast a vote.

In addition, the toolbar will continuously offer more passive ballots in a plurality of forms including a pull-down voting menu, and multiple/variable reverse-Turing test emoticons continuously visible on the toolbar itself. A user configurable time limit will be placed on the offering of any ballot. Should this time limit be exceeded prior to the user casting a vote, then an abstention will automatically be recorded for the user for the site in question. The toolbar will present a field (small window area) that lists the URL of the result page being voted on for easy reference and positive identification. The user is able to manually edit this URL field and/or select from a pull-down pick-list history of sites recently visited, in order to select the site to be voted on. The toolbar also has the ability to automatically track user navigation by other means and reflect it in this toolbar field in real time.

The toolbar of the present invention has the ability to sense the use of any known search engine, either by the user's toolbar selection or by the user independently surfing to any known search engine. Selections of other SE is automatically reflected in the corresponding toolbar field. User queries in other Search Engine query forms and/or toolbars are also automatically tracked and entered in this invention's toolbar in a corresponding area for ease of user reference. When results are returned from a user query, sent to any known search engine, the user has the option of "Vote-Checking" these results. Vote-checking amounts to re-ordering, if and as required, a portion of the results based on votes. The user must initiate Vote-check process via toolbar selection. The toolbar has the ability, in conjunction with the central repository, to provide a list of integers representing some number of results (say, the top 10) returned by the search engine. The list is presented to the user in an additional text field built into the toolbar. If a Vote-Check session is initiated by the user via the toolbar, then the toolbar uses a public key (previously received from the CR, for a previously agreed-upon asymmetric encryption algorithm) and its own private key to securely and positively identify themselves as registered voters and simultaneously request and a freshly-generated secret session key for this Vote-Check operation.

A symmetric encryption algorithm is then used, in combination with the session key, by the toolbar to encrypt the list of URLs. The toolbar then sends this list to the CR. The CR uses the secret session key (associated with the public key) to decrypt the message (using the agreed upon asymmetric algorithm) and extracts the list of URLs. The CR then uses ResultRank to re-order the list of URLs, as required. The representation of the order determined by ResultRank is encrypted by the CR using the agreed-upon symmetric encryption algorithm and sent back to the toolbar. The toolbar uses the secret session key to decrypt the message and extract the order information. The text box in the toolbar displays the potentially new order. The result order is represented as a list of comma-separated integers ranging from one to the upper limit (i.e., 10). The integer values indicate the order of the results originally returned by the search engine, while the order of the integers in the list indicates their relative ResultRank, as determined by the CR. Thus, the user has the option of using the toolbar-enhanced browser to "Vote-Check" the top 10 results returned by any other supported search engine. In some variations of the invention the number of results to be Vote-Checked can vary upward or downward from the top 10 discussed above. This feature is designed to allow the user to make an improved selection from the SERP received from their favorite search engine, and thus reward and motivate the user for installing the toolbar and using the toolbar for voting. In a variant of the invention, use of the Vote-check option and associated ResultRank algorithm can be made dependent on the user maintaining some minimum ratio of up/down votes cast, to abstentions cast, for URLs visited.

In accordance with the present invention, the user may interact with the toolbar-enhanced web browser in a plurality of ways, including use of a standard mouse (mouse-over, left-click, right-click, etc), the keyboard (keystrokes), voice recognition software, etc. In other variations of the invention, the user could control the PC, browser, and toolbar with any sort of physical movement of any portion of the user's body to indicate his or her intentions. For example, blinking the eye, eye movements, heart rate, blood pressure, electromagnetic fields produced by the body and/or user's brain (e.g., brain reading software and mechanisms), including any sort of electro/chemical reactions in the body which can be sensed, could be utilized. The sensors and transducers could be internal or external to the body, in contact with the user's body, in close proximity to the user's body, or remotely located and operated at a distance.

The present invention allows the user to operate the toolbar-enhanced web browser to register, cast votes for web sites primarily represented as printed text (as returned by a Search Engine), and vote-check the same search engine returns. However, in other variations of the invention, the user might operate the toolbar to vote and/or check rank of a plurality of forms of medium and content including, but not limited to, images, audio, and video. In addition, the SE returns might be a list of opinions, motions for consideration, resolutions, propositions, or a choice of candidates for an elected or appointed office—which could be for an association, corporate or other business entity, or a city, county, state, federal, or foreign entity, for example.

In the present invention, the ballot is presented to the user in a variety of forms including multi-function, reverse-Turing test emoticons. However, in other variations of present invention, the ballot could take additional forms. For example, the user could select a number from a range of numbers, or choose from several phrases, or move a slider on a bar, or drag and drop something to a identifying location, or drag and drop an identifying item to a location, or move a pointer/needle, or use a variety of graphical mechanisms to indicate different choices. Choice in the present invention is simple "up, down, or abstain." In general, other forms of the invention could include any number of more graduated user choices between these extremes.

It is noted that authentication of the user and his or her vote could be accomplished with or without the toolbar-enhanced web browser of the present invention. In such circumstances, a variety of supporting contextual activities are tracked, and a user's source IP address is recorded to authenticate votes cast without the toolbar. In addition, the form of the ballot is designed to reduce the possibility of automated computer voting/spamming/fraud. Additionally, with the toolbar, secret passwords, encryption, unique serials, IP address, e-mail addresses, and Ethernet MAC addresses are relied on. In other forms of the invention, the user could positively identify himself or herself with a plurality of means. For example, personal RFID tagging and/or any sort of biometric method that uniquely identifies the user could be used, such as retinal scans, brain scans, fingerprints, speaker identification software, face recognition, etc.

In variations of the present invention, to increase user privacy, the public/private keys and/or symmetric and asymmetric algorithms chosen can be updated/changed/exchanged upon user demand, periodically, and/or at the end of each voting session, using the existing symmetric algorithm session keys and in preparation for the next voting session. In a similar variant of the present invention, which involves communication between the CR and toolbar and/or any other two remotely located entities, the next encryption algorithm to be used and an associated session key can be randomly chosen from several available algorithms by the transmitting entity. The transmitting entity then encrypts the next algorithm choice and new key and adds it to the next outgoing message. The transmitting entity transmits same and waits for the next incoming message which it will attempt to decrypt using the just transmitted algorithm and session key. Thus, each transmitting entity tells the receiving entity what new algorithm and key to use when next the receiving entity needs to transmit. In this manner, communications between two entities (perhaps the CR and toolbar) are made more secure since each message is encrypted with a different algorithm (perhaps unknown to an enemy attacker) and new session key is used for each transmission.

In the present invention, the time period ID used by the Central Repository to hash URLs voted on by users is incremented as a fixed period of time elapses, where the period of time is based on the life expectancy of a web site as determined by the Central Repository.

In other variations of the present invention, the CR will actively and periodically monitor and interrogate available data to determine if a particular Website has undergone significant renovation, and/or been out-dated by other web developments, and increment the time period ID accordingly, so as to allow freshening of the vote database.

In another variation of the present invention, the Central Repository ceases to act as a CR but is otherwise functional, while concurrently the process whereby the individual Meta Servers nominate a new Central Repository (CR) is turned off. Also, each meta server and the former CR (if any) assumes a portion of the responsibilities of the former CR, while continuing their local duties. In this mode of operation, the Internet becomes the center of the resulting overall system (e.g. "net-centric"). In this variation of the present invention, each node incrementally broadcasts to all other nodes what would otherwise have been sent only to the CR. These update broadcasts are directed, routed, and forwarded to all other nodes in the system by a plurality of means, including, but not limited to: 1) standard network multicast routing; and 2) through the use of bit torrent technology. Since each node receives updates from all other nodes, there is no need to return globalized data to any other node in the system, and this is not done. Update broadcasts include but are not limited to the following types of data: link map updates, local site characterizations, ResultRank data, Query Language Progressions, updates to the voting related database, etc. In this mode of operation, Enhanced Browsers interact with a single nearby node as if it were the CR.

FIG. 27 is a flowchart showing processing steps according to the present invention, indicated generally at 520, for providing improved search results in response to a user's query while reducing advertisements provided to users with search results. The steps shown in FIG. 27 can be used in conjunction with the search system of the present invention (referred to in FIG. 27 as a "native" search system), or with any other search engine and/or system (referred to in FIG. 27 as a "foreign" search system). The processing of FIG. 27 reduces unwanted advertisements which are typically provided to users of conventional search engines/systems, and allows the user to "preview" search engine results by reviewing a single search result before reviewing an entire set of results. This allows the user to conveniently determine whether the search results are likely to be accurate, without having to read through an entire set of results.

Beginning in step 522, a search query is entered by a user to initiate a search session. In step 524, the search query is sent to a search engine/system. In step 526, a determination is made as to whether the search engine is a foreign search system which is being used in conjunction with the toolbar of the present invention. If a positive determination is made, step 528 is invoked, wherein the toolbar processes the latest user actions and displays, populates, and/or updates the query form of the present invention (i.e., shown in FIG. 21 and discussed above) in accordance with the user's action.

In step 530, the toolbar displays a single search result which represents the best result returned by the foreign search engine, such as a result which is not sponsored by a paid advertisement, and suppresses search results sponsored by paid advertisements (which would ordinarily be displayed in a search engine results page (SERP)). In step 532, the user reviews the single search result. If, in step 526, a determination is made that the search engine is not a foreign search engine, step 534 occurs, wherein a determination is made as to whether a native search system is in use. If a negative determination is made, step 550 occurs, wherein normal operation of the search engine is resumed. Otherwise, if a positive determination is made, step 536 occurs, wherein the native search system processes the latest user action and displays, populates, and/or updates the query form in accordance with the user's action. As mentioned above, the query form could include the form shown in FIG. 21 and described above. In step 538, the search system returns a single search result which represents the best result, such as a result which is not sponsored by a paid advertisement. Then, step 532 occurs, wherein the user reviews the single search engine result (SER).

In step 540, after the user reviews the single SER, a vote is cast by the user and a determination is made as to whether the user rejected the SER (by casting a "down" vote). Voting could be accomplished using the toolbar of the present invention, in conjunction with a web browser. If a positive determination is made, processing returns back to steps 526 and 534. If a negative determination is made, step 542 occurs, wherein a determination is made as to whether the user makes a query selection from the query form. If a positive determination is made, processing returns back to step 524. If a negative determination is made, step 544 occurs, wherein a determination is made as to whether the user wishes to manually change the search query. If a positive determination is made, processing returns back to step 524. Otherwise, if a negative determination is made, step 546 occurs, wherein a determination is made as to whether the user accepts the SER (by casting an "up" vote). If a negative determination is made, processing returns back to step 524. Otherwise, step 548 occurs, wherein multiple related SERs (e.g., an entire SERP) are displayed to the user, along with paid advertisements. Normal operation of the search engine/system then proceeds in step 550.

Having thus described the present invention in detail, it is to be understood that the foregoing Detailed Description of the invention is not intended to limit the spirit or scope thereof. What is desired to be protected by Letters Patent is set forth in the appended claims.

What is claimed is:

1. A system for searching for and organizing content on a plurality of computer networks, comprising:
   a plurality of processors;
   a central repository to collect, process, store, and disseminate information from and to a plurality of dedicated local meta servers, and a plurality of standard web browsers, and a plurality of enhanced web browsers;
   a toolbar plug-in for the standard web browsers in order to enhance the operation of the standard web browsers, with the toolbar plug-in maintaining communication with the central repository over the plurality of computer networks;
   a plurality of distributed local meta sites, with each of the local meta sites storing processed content provided by a plurality of host web sites, and with each of the meta sites hosting the dedicated local meta servers, and a dedicated local search engine, with each of the dedicated local search engines having an associated local spider and an associated local scraper, with each of the distributed local meta sites maintaining communication with the central repository over the plurality of computer networks;
   a plurality of plug-ins for the standard web browsers, and for the local scrapers, and for the local spiders, wherein the installation of the plug-in allows the functionality of the standard web browsers and the local scrapers and the local spiders, to be directed and reconfigured, such that the directing is accomplished by reading a plurality of extended robots.txt files, each containing a plurality of extended directives, with each of the extended directives being understood by the corresponding plug-in, and allowing the functionality of the standard web browser, the local spider, and the local scraper, to be reconfigured by a plurality of configuration files, which are understood by the corresponding plug-ins;
   one or more of the plurality of standard web browsers enhanced with one or more of the plug-ins to allow a plurality of users to display and navigate a standard HTML network so as to view content stored on the plurality of host web sites, accessible from the plurality of computer networks, to allow users to display and navigate and view content on a plurality of non-HTML networks on the plurality of host web sites, accessible from the plurality of computer networks, and to allow a plurality of users to select from a list of supported search engines, which search engine to submit a query to and to interact with during a search session, with the list of supported search engines is provided by the toolbar plug-in used to enhance a standard web browser comprising the analysis of a plurality of user interactions with the plurality of supported search engines, using a standard web browser enhanced with the toolbar plug-in for authenticated and secure communication with the central repository, to monitor the plurality of user interactions during a search session, with storage of the results of the monitoring and with analysis of the plurality of user interactions done at the central repository, wherein the central repository stores a global set of Query Language Progressions (QLPs) generated by a plurality of users, with one QLP being generated per user, and one QLP being generated per search session, wherein the sequence of query entries made by the user over a predetermined period of time is deemed to constitute a QLP, the QLPs having been harvested by the toolbar enhanced standard web browsers, and by the dedicated local search engines hosted on the plurality of dedicated local meta servers; with the QLPs being transmitted to the central repository, where each set of QLPs received from the meta-servers is merged into the global set of Query Language Progressions, with the global set being periodically transmitted to each of the distributed local meta servers;

the local spiders to navigate and index standard HTML networks as well as the plurality of non-HTML networks stored on the plurality of host web sites, accessible from a plurality of computer networks;

the local scrapers to gather content from the standard HTML networks and to gather and process content from the plurality of the non-HTML networks, and to translate and merge the non-HTML networks into the standard HTML networks and to process the gathered and newly generated HTML networks into link map data, and to store the link map data and associated scraped content on their respective distributed local meta-sites;

the storage of content by the local scrapers on the local meta sites, and indexing of content by the local spiders, wherein a local index data structure is produced by each of the local meta servers, and stored at each of the corresponding distributed local meta sites, and used by each of the associated local search engines when conducting local searches, which are limited in scope to the associated local meta server and host web site, with each set of the link map data and index data structure periodically transmitted to the central repository, with the central repository integrating all received sets of local link map data into the global link map, and the central repository periodically integrating all received sets of local index data structures into a global index data structure, each of the dedicated local meta servers periodically processing the local set of link map data, with the NodeRank algorithm, to form a local NodeRanked list of HTML links, and periodically transmitting over the computer networks the local NodeRanked list of HTML links to the central repository, with the central repository then merge-sorting the pre-sorted local NodeRanked list of HTML links into a global NodeRanked list of HTML links, the global NodeRanked list of HTML links having resulted from all previous such merge-sorts and based on periodic application of the NodeRank algorithm at the central repository on a global link map;

a URL server at each of the distributed local meta sites, with each of the URL servers providing a sequence of URLs which are used to guide the standard web browsers and control the navigation of the local spiders and the local scrapers in order to index, and scrape content from the associated host web site to the shadowing distributed local meta site;

a URI generator at each of the distributed local meta sites being in communication with the standard web browsers which have been enhanced by the plug-ins, the local spiders, and the local scrapers, in order to convert the non-HTML network links into new standard HTML network links during operations, with the new standard HTML network links being displayed on the plug-in enhanced standard web browsers, and being navigated for purposes of indexing by the local spiders, and being navigated for purposes of scraping content by the local scrapers, with the index and content being stored on each of the corresponding distributed local meta sites;

the plurality of extended robots.txt files, each of which is stored at an associated host web site, wherein the extended directives contained in each of the extended robots.txt files are read by and used to direct the plug-in enhanced standard web browsers, the local spiders and the local scrapers, wherein one of the extended directives is able to direct the reader to the location of each of the associated configuration files and the other extended directives are able to direct the reader in how to conduct the browsing, spidering, and the scraping, for compatibility and compliance with the plurality of host web sites;

the configuration files which are tailored to the format of each of the particular host web sites and are read and incorporated by the plug-in enhanced standard web browsers, and by the local spiders, and by the local scrapers, so as to customize their functionalities for operation on each of the particular host web sites in order to convert dynamically generated HTML network links into the static standard HTML network links and to convert the non-HTML network links into the standard HTML network links, with the resulting standard HTML network links and associated content being displayed on the plug-in enhanced standard web browsers, and being indexed by the local spiders, and being stored by the local scrapers on the corresponding distributed local meta site dedicated to each of the associated host web sites;

the plurality of dedicated local meta servers which taken in combination function as an always-up ultra-peer back bone for a plurality of peer-to-peer networks, by supporting the transfer and caching of peer-to-peer network content at each of the distributed local meta sites and by incorporating peer-to-peer search capability at each of the distributed local meta sites.

2. The system of claim 1, wherein the dedicated local meta sites, each having the dedicated local meta server, are optionally dedicated to a plurality of sets Of host web sites, wherein each of the sets of hosts web sites contains content of a similar theme.

3. A method executed by one or more processors for searching for and organizing content on a plurality of computer networks, comprising the steps of:

executing software on a central repository to collect, process, store, and disseminate information from and to a plurality of dedicated local meta servers, and a plurality of standard web browsers, and a plurality of enhanced web browsers;

executing a toolbar plug-in for the standard web browsers in order to enhance the operation of the standard web browsers, with the toolbar plug-in maintaining communication with the central repository over the plurality of computer networks;

executing software on a plurality of distributed local meta sites, with each of the local meta sites storing processed content provided by a plurality of host web sites, and with each of the meta sites hosting the dedicated local meta servers, and a dedicated local search engine, with each of the dedicated local search engines having an associated local spider and an associated local scraper, with each of the distributed local meta sites maintaining communication with the central repository over the plurality of computer networks;

executing a plurality of plug-ins for the standard web browsers, and for the local scrapers, and for the local spiders, wherein the installation of the plug-in allows the functionality of the standard web browsers and the local scrapers and the local spiders, to be directed and reconfigured, such that the directing is accomplished by reading a plurality of extended robots.txt files, each containing a plurality of extended directives, with each of the extended directives being understood by the corresponding plug-in, and allowing the functionality of the standard web browser, the local spider, and the local scraper, to be reconfigured by a plurality of configuration files, which are understood by the corresponding plug-ins;

executing one or more of the plurality of standard web browsers enhanced with one or more of the plug-ins to allow a plurality of users to display and navigate a standard HTML network so as to view content stored on the plurality of host web sites, accessible from the plurality of computer networks, to allow users to display and navigate and view content on a plurality of non-HTML networks on the plurality of host web sites, accessible from the plurality of computer networks, and to allow a plurality of users to select from a list of supported search engines, which search engine to submit a query to and to interact with during a search session, with the list of supported search engines is provided by the toolbar plug-in used to enhance a standard web browser comprising the analysis of a plurality of user interactions with the plurality of supported search engines, using a standard web browser enhanced with the toolbar plug-in for authenticated and secure communication with the central repository, to monitor the plurality of user interactions during a search session, with storage of the results of the monitoring and with analysis of the plurality of user interactions done at the central repository, wherein the central repository stores a global set of Query Language Progressions (QLPs) generated by a plurality of users, with one QLP being generated per user, and one QLP being generated per search session, wherein the sequence of query entries made by the user over a predetermined period of time is deemed to constitute a QLP, the QLPs having been harvested by the toolbar enhanced standard web browsers, and by the dedicated local search engines hosted on the plurality of dedicated local meta servers; with the QLPs being transmitted to the central repository, where each set of QLPs received from the meta-servers is merged into the global set of Query Language Progressions, with the global set being periodically transmitted to each of the distributed local meta servers;

executing the local spiders to navigate and index standard HTML networks as well as the plurality of non-HTML networks stored on the plurality of host web sites, accessible from a plurality of computer networks;

executing the local scrapers to gather content from the standard HTML networks and to gather and process content from the plurality of the non-HTML networks, and to translate and merge the non-HTML networks into the standard HTML networks and to process the gathered and newly generated HTML networks into link map data, and to store the link map data and associated scraped content on their respective distributed local meta-sites;

executing a URL generator at each of the distributed local meta sites, with each of the URL generators providing a sequence of URLs which are used to guide the standard web browsers and control the navigation of the local spiders and the local scrapers in order to index, and scrape content from the associated host web site to the distributed local meta site, the storage of content by the local scrapers on the local meta sites, and indexing of content by the local spiders, wherein a local index data structure is produced by each of the local meta servers, and stored at each of the corresponding distributed local meta sites, and used by each of the associated local search engines when conducting local searches, which are limited in scope to the associated local meta server and host web site, with each set of the link map data and index data structure periodically transmitted to the central repository, with the central repository integrating all received sets of local link map data into the global link map, and the central repository periodically integrating all received sets of local index data structures into a global index data structure, each of the dedicated local meta servers periodically processing the local set of link map data, with the NodeRank algorithm, to form a local NodeRanked list of HTML links, and periodically transmitting over the computer networks the local NodeRanked list of HTML links to the central repository, with the central repository then merge-sorting the pre-sorted local NodeRanked list of HTML links into a global NodeRanked list of HTML links, the global NodeRanked list of HTML links having resulted from all previous such merge-sorts and based on periodic application of the NodeRank algorithm at the central repository on a global link map;

executing a URL server at each of the distributed local meta sites, with each of the URL generators providing a sequence of URLs which are used to guide the standard web browsers and control the navigation of the local spiders and the local scrapers in order to index, and scrape content from the associated host web site to the shadowing distributed local meta site;

executing a URI generator at each of the distributed local meta sites being in communication with the standard web browsers which have been enhanced by the plug-ins, the local spiders, and the local scrapers, in order to convert the non-HTML network links into new standard HTML network links during operations, with the new standard HTML network links being displayed on the plug-in enhanced standard web browsers, and being navigated for purposes of indexing by the local spiders, and being navigated for purposes of scraping content by the local scrapers, with the index and content being stored on each of the corresponding shadowing distributed local meta sites;

executing the plurality of extended robots.txt files, each of which is stored at an associated host web site, wherein the extended directives contained in each of the extended robots.txt files are read by and used to direct the plug-in enhanced standard web browsers, the local spiders and the local scrapers, wherein one of the extended directives is able to direct the reader to the location of each of the associated configuration files and the other extended directives are able to direct the reader in how to conduct the browsing, spidering, and the scraping, for compatibility and compliance with the plurality of host web sites;

executing the configuration files which are tailored to the format of each of the particular host web sites and are read and incorporated by the plug-in enhanced standard web browsers, and by the local spiders, and by the local scrapers, so as to customize their functionalities for operation on each of the particular host web sites in order to convert dynamically generated HTML network links into the static standard HTML network links and to convert the non-HTML network links into the standard HTML network links, with the resulting standard HTML network links and associated content being displayed on the plug-in enhanced standard web browsers, and being indexed by the local spiders, and being stored by the local scrapers on the corresponding distributed local meta site dedicated to each of the associated host web sites;

executing the plurality of dedicated local meta servers which taken in combination function as an always-up ultra-peer back bone for a plurality of peer-to-peer networks, by supporting the transfer and caching of peer-to-peer network content at each of the distributed local meta sites and by incorporating peer-to-peer search capability at each of the distributed local meta sites.

4. The method of claim 3, further comprising allowing users to vote on returned search results.

5. The method of claim 4, further comprising transmitting user votes from the standard web browser enhanced with the toolbar plug-in, and from the local search engine, to the central repository and storing the votes at the central repository, such that a user identifier and a uniform resource identifier (URI) associated with the result that the user voted for are stored in a first database at the central repository using a one-way hash, while the number of votes associated with the URI are stored in a second database at the central repository.

6. The method of claim 5, further comprising processing the user votes and the associated URIs, ranking the HTML links associated with each URI using the ResultRank algorithm, wherein the highest ranked link has the highest number of positive votes, and all other links are thus ranked based on their received number of positive votes, with the ranking done at the central repository to create the global ResultRanked list of HTML links which is periodically transmitted to each local meta server for use in ranking search results.

7. The method of claim 6, further comprising periodically transmitting the globally ranked list of nodes from the central repository to the plurality of meta servers, for the meta server use in ranking local search results.

8. The method of claim 5 further comprising periodic incrementing of a time period ID used to time stamp entries made in the first database and entries made in the second database.

9. The method of claim 8 further comprising the active and periodic monitoring and interrogating of host web sites by the local meta servers to determine if particular host web sites and local meta sites associated with the URIs stored in the first database have undergone changes in content or network structure deemed significant enough to justify the incrementing of the time period ID used to time stamp records made in the first and second database, even though the normal incrementing time period has not yet expired.

10. The methods of claim 8 or 9 further comprising periodically purging records in the first database and the second database, when those records are deemed to have expired, based on the current time period ID in comparison with the time period ID used to time stamp said records when they were entered in the first and second databases.

11. The methods of claim 8 or 9 wherein the first database record time period ID's are compared with the current time period ID's in order to decide if a particular user vote, for the particular URI-query combination will be used to update the count stored in the second database, such that if sufficient time has not elapsed between a particular user's current vote, and that same user's previous vote on the same URI-query combination, then the new vote will not be counted or stored in the second database and the user will be notified of this along with the time period required before new votes will be recognized for this user.

12. The method of claim 4, wherein the step of allowing users to vote further comprises allowing users to vote by clicking on or otherwise selecting an appropriate emoticon, with the emoticon containing reverse-Turing test CAPT-CHAs, displayed to the user in randomized locations following review of a result, with some movement of the emoticon to attract user attention, and eventual fading after timeout.

13. The method of claim 3, further comprising filtering the search results based upon lengths of time during which content represented in the search results has been accessible on the computer network.

14. The method of claim 3, further comprising using the toolbar plug-in to authenticate the user's identity during all communications between the toolbar and the central repository.

15. The method of claim 3, further comprising a standard web browser enhanced with the plug-ins, and a local spider and a local scraper's use of the plurality of configuration files to detect non-HTML links in the non-HTML network and to formulate text to be sent to the URI generator for use by the URI generator to generate a corresponding HTML link and storing the new HTML link at the meta server.

16. The method of claim 15, further comprising use of the configuration file to instruct the standard web browser enhanced with the plug-ins, and a local spider and a local scraper on the manner in which to convert dynamically generated HTML links and associated content on the computer network to static HTML links and associated content, and storing the resulting static HTML links and content on the corresponding distributed local meta site.

17. The methods of claim 15 or 16 wherein the standard web browsers have plug-ins installed which make them compatible with the extended robots.txt files and the configuration files and where the local spider and the local scraper are compatible with the extended robots.txt files and configuration files without the need for plug-ins.

18. The method of claim 15 wherein the configuration file is used to detect the existing non-HTML links and to formulate text to be sent to the URI generator for use by the URI generator to generate and or modify the anchor link text to be inserted into the content for storage on the meta site and for immediate display on a toolbar plug-in enhanced standard web browser, and further the anchor link text is also modified for the benefit of search engines that use the anchor link text to rank search results.

19. The method of claim 15 wherein the configuration file is used to detect specific characters, words and phrases in one language and then to formulate text to be sent to the URI generator for use by the URI generator in translating the characters, words and phrases into a different language for storage on the meta site and for immediate display on a toolbar plug-in enhanced standard web browser, and for indexing by the local spiders and for storage by the local scrapers to corresponding the distributed local meta site.

20. The method of claim 3, wherein all communication between the toolbar plug-in, the central repository, the meta servers, the local spiders, and the local scrapers, the URL generators, and the URI generators is conducted during an encrypted session.

21. The method of claim 3, further comprising allowing the user to view a re-ordering of a portion of the highest ranked returned search results, based on the use of a plurality of supported search engine, and as displayed by the standard web browser as enhanced by the toolbar plug-in, wherein the choice of search engines is selectable, thus allowing the user to simultaneously compare two or more search result rankings obtained from two or more of the plurality of supported search engines.

22. The method of claim 3, further comprising establishing the encrypted session between the toolbar plug-in enhanced standard web browser and the central repository for securely transmitting user search queries from the toolbar plug-in enhanced standard web browser to the central repository; for securely transmitting user search queries.

23. The method of claim 3, wherein the central repository, periodically receives sets of link map data from each of the dedicated local meta servers and upon receipt of each of the sets of link map data, integrates each of the newly received sets of link map data, into the global link map, with the global link map being constituted based on the culmination of all previous such integration.

24. The method of claim 23, further comprising periodically transmitting the global NodeRanked list of HTML links from the central repository to a plurality of dedicated local meta servers where the global NodeRanked list of HTML links is stored for future use by the local meta server in ranking the local search results.

25. The method of claim 3, further comprising allowing the user to select the type of search to conduct at the dedicated local search engine associated with each of the dedicated local meta server's, wherein the search type choices are a local search, a global search, a peer-to-peer search and a best effort search.

26. The method of claim 25, wherein the user selects the local search option and in response the local meta server provides search results and further, forwards the local query to the central repository, and meanwhile, the local meta server continues to monitor user interactions with the resulting search results and user interaction with the search engine in general, in order make a determination of the user's satisfaction with the relevance of the search results to that query, and upon making the determination, forwarding the determination to the central repository where the combination of the query and the determination of the user's satisfaction are analyzed and stored.

27. The method of claim 26, wherein the central repository creates and stores a characterization of content associated with the local meta server, the characterization of content taking the form of a query lexicon, the query lexicon being based upon local search queries received from that meta server, and upon user satisfaction with the search results associated with each query, such that popular queries with associated positive user satisfaction have prominence in the query lexicon and thus have prominence in the characterization of the local meta server's content.

28. The method of claim 27, wherein the characterization of the meta server's content is used by the central repository to route queries received from the other meta servers and the plurality of toolbars plug-in enhanced standard web browsers, when the users at those other local meta servers and toolbars plug-in enhanced standard web browsers initiate the global search option.

29. The method of claim 27, further comprising the central repository periodically distributing the query lexicons associated with the local meta servers to all other local meta servers, wherein the meta servers use the query lexicons to route the peer-to-peer search queries directly to other meta servers and make these query lexicons known and available to associated, supported peer-to-peer networks for their use in routing queries.

30. The method of claim 3, wherein the user that is operating the toolbar enhanced standard web browser, selects the native search engine option, for access to dedicated local search engine at the dedicated local meta servers through communications with the central repository, further choosing between either the global search, the P2P search, and the best effort search.

31. The methods of claim 25 or 30, wherein the user selects the global search option and the local meta server routes the query to the central repository and the toolbar plug-in routes the query to the central repository for the standard web browser, and the central processor, in turn, selectively routes the query to one or more of the other local meta servers for processing the search query.

32. The method of claim 31, wherein a meta server receiving a global search query from the central repository, performs a proxy local search by processing the query as if it were a local search query, except that the search results are routed directly back to the toolbar plug-in enhanced standard web browser and to the dedicated local meta server from which the global query was originated.

33. The method of claim 32 wherein the toolbar plug-in enhanced standard web browser and the dedicated local meta server that originated the query receives search results from multiple local meta servers and fuses the search results prior to, during, and after display of the search engine results page to the user, updating the display as new results arrive at the local meta server.

34. The method of claim 33 further comprising the use of global rank for each individual search result, taken from the globally ranked list of nodes, to conduct the ordered fusion of results arriving from different local meta servers, with the global absolute rank number for each result, passed from the local meta server which performs the proxy local search, to the toolbar plug-in enhanced standard web browser and passed to the local meta server from which the query originated.

35. The method of claim 3, further comprising the central repository detecting that the user has entered a query that corresponds to an early query in the previously stored QLP, and in response, the central repository transmits the last query in the stored QLP as a suggested alternative query to the user.

36. The method of claim 35, wherein the detection occurs through use of a toolbar plug-in's connection to the QLP database at the central repository or by use of a meta server search engine's locally stored QLP database.

37. The method of claim 35, further comprising allowing the user to continue the search session by selecting and submitting the suggested alternative query language as presented by the toolbar plug-in enhanced standard web browser.

38. The method of claim 35, further comprising allowing the user to continue a search session by selecting the suggested alternative query language, that is presented by the local meta server's dedicated local search engine.

39. The method of claim 3, further comprising allowing the dedicated local search engine to generate a search engine results page and displaying a single search result from the search engine results page.

40. The method of claim 39, further comprising allowing a user to accept or reject the single search result.

41. The method of claim 40, further comprising displaying the single next highest ranked remaining search result of the search engine results page, after a user rejects the single search result.

42. The method of claim 41, further comprising displaying advertisements associated with the search result after a user accepts the single search result.

43. The method of claim 40, wherein the step of allowing a user to accept or reject the single search result comprises allowing the user to vote on the single search result.

44. The method of claim 40, further comprising allowing a user to generate a new query, as a means of rejecting a single search result, prior to displaying a new single search result.

45. The method of claim 40, further comprising allowing a user to select the suggested alternate query, as a means of rejecting a single search result, prior to displaying a new single search result.

46. The method of claim 3 wherein the local scrapers scrape content from the host web sites and store that content on the distributed meta sites, selectively leaving bulky content which requires large amounts of storage space and leaving content that does not contain any supported non-html networks and does not contain any html network content, residing at the host web sites, such that content containing no further HTML and no further non-HTML network links in it, is left at the host site, one html link away from the content scraped to, and indexed on, and stored on, the dedicated local meta site.

47. The method of claim 3 wherein storage at the local meta servers includes: meta content scraped from the host web sites, the local NodeRanked list of HTML links generated from the local set of link map data, using the NodeRank algorithm, the global NodeRanked list of HTML links received from the central repository, a global ResultRanked list of HTML links received from the central repository, and the global set of Query Language Progressions periodically received from the central repository, the local and remote site lexicons received from the central repository which characterize the content of the respective distributed local meta sites and their target host web sites content, and cached peer-to-peer files.

48. The method of claim 3 further comprising local meta servers automatically arbitrating, nominating and selecting a new replacement central repository, chosen from existing local meta servers in communication with each other, in the case that the existing central repository is found by the local meta servers to be non-operational, for a predetermined period of time.

49. The method of claim 48 wherein the central repository (CR) upon command ceases to act as the CR, while concurrently no new CR is nominated, and each local meta server and the former CR assume a portion of the duties of the CR, while continuing their local duties such that the plurality of computer networks becomes the center of the resulting system, with each local meta server in the network periodically broadcasting to all other local meta servers) what would otherwise have been sent to the CR, and with each local meta server processing and storing data as would otherwise have been processed and stored by the CR, except that no subsequent transmission of the global link map, the global NodeRanked list of HTML links, the global ResultRanked list of HTML links, the global set of Query Language Progressions, or the query lexicons is required, and toolbar plug-in enhanced standard web browsers make use of the local meta server that is the fewest hops away over the plurality of computer networks, as if that local meta server were the CR, with each local meta server maintaining the first database and the second database associated with user voting, and which were formerly maintained only by the CR.

50. The method of claim 3 wherein communications between the central repository and the meta servers is minimized, in both directions, by only transmitting deltas to previously transmitted information, such that only new or changed information is transmitting.

\* \* \* \* \*